US010189507B2

(12) United States Patent
Watanabe et al.

(10) Patent No.: US 10,189,507 B2
(45) Date of Patent: Jan. 29, 2019

(54) VEHICLE BODY FRONT STRUCTURE

(71) Applicant: HONDA MOTOR CO., LTD., Tokyo (JP)

(72) Inventors: Yasunori Watanabe, Wako (JP); Satoshi Saito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 65 days.

(21) Appl. No.: 15/651,142

(22) Filed: Jul. 17, 2017

(65) Prior Publication Data

US 2017/0313361 A1 Nov. 2, 2017

Related U.S. Application Data

(63) Continuation of application No. PCT/JP2015/085366, filed on Dec. 17, 2015.

(30) Foreign Application Priority Data

Jan. 20, 2015 (JP) .................................. 2015-008814
Jan. 20, 2015 (JP) .................................. 2015-008867
Jan. 20, 2015 (JP) .................................. 2015-008891

(51) Int. Cl.
  *B60J 7/00* (2006.01)
  *B62D 25/08* (2006.01)
  *B62D 29/00* (2006.01)

(52) U.S. Cl.
  CPC ......... *B62D 25/084* (2013.01); *B62D 29/001* (2013.01); *B62D 25/08* (2013.01)

(58) Field of Classification Search
  CPC ... B62J 6/02; B62J 17/02; B62J 17/00; B60Q 1/0041; F21S 41/147; B60G 2206/60; B60G 7/001; A43B 5/0456; A43B 5/0452; A43B 5/0474
  USPC .................................................... 296/193.09
  See application file for complete search history.

(56) References Cited

U.S. PATENT DOCUMENTS

| 7,419,208 | B2 | 9/2008 | Sub | |
|---|---|---|---|---|
| 8,636,396 | B2 | 1/2014 | Tanaka | |
| 9,855,970 | B2 * | 1/2018 | Kitakata | B62D 21/152 |
| 2001/0054831 | A1 * | 12/2001 | Akasaka | B60K 13/04 |
| | | | | 180/309 |

(Continued)

FOREIGN PATENT DOCUMENTS

| EP | 1 209 069 | 5/2005 |
|---|---|---|
| JP | 2002-160670 | 6/2002 |

(Continued)

OTHER PUBLICATIONS

International Search Report, dated Mar. 8, 2016 (dated Mar. 8, 2016), 2 pages.

*Primary Examiner* — Kiran B Patel
(74) *Attorney, Agent, or Firm* — Rankin, Hill & Clark LLP

(57) ABSTRACT

A vehicle body front structure includes a front bulkhead. The front bulkhead includes a right side stay made of a resin and connected to a right front side frame, a right upper side beam made of a metal and extending from the right side stay to a right upper member, an upper beam made of a metal and detachably connected to the right upper side beam, and a hood lock device provided on the upper beam. The right end of the upper beam is connected in a state in which it clamps the right side stay in a vehicle body longitudinal direction.

4 Claims, 37 Drawing Sheets

(56) References Cited

U.S. PATENT DOCUMENTS

| | | | |
|---|---|---|---|
| 2006/0064845 A1 | 3/2006 | Fujii et al. | |
| 2008/0067838 A1* | 3/2008 | Nakamae | B62D 21/152 |
| | | | 296/203.02 |
| 2013/0021814 A1* | 1/2013 | Tanaka | B62D 25/084 |
| | | | 362/496 |
| 2014/0246260 A1* | 9/2014 | Awano | B62D 3/12 |
| | | | 180/271 |
| 2015/0166117 A1* | 6/2015 | Ohoka | B23K 11/24 |
| | | | 296/193.09 |
| 2015/0314811 A1* | 11/2015 | Shibata | B62D 25/082 |
| | | | 296/193.09 |
| 2016/0107696 A1* | 4/2016 | Suzumori | B62D 25/082 |
| | | | 296/187.09 |
| 2017/0313361 A1* | 11/2017 | Watanabe | B62D 25/084 |
| 2018/0162452 A1* | 6/2018 | Hirota | B62D 25/082 |

FOREIGN PATENT DOCUMENTS

| | | |
|---|---|---|
| JP | 2006-096281 | 4/2006 |
| JP | 2010-247716 | 11/2010 |
| JP | 2012-183851 | 9/2012 |
| JP | 2013-023058 | 2/2013 |
| JP | 2014-051140 | 3/2014 |
| JP | 2014-151736 | 8/2014 |
| WO | 2008/053874 | 5/2008 |
| WO | 2013/018401 | 2/2013 |

* cited by examiner

FIG. 16
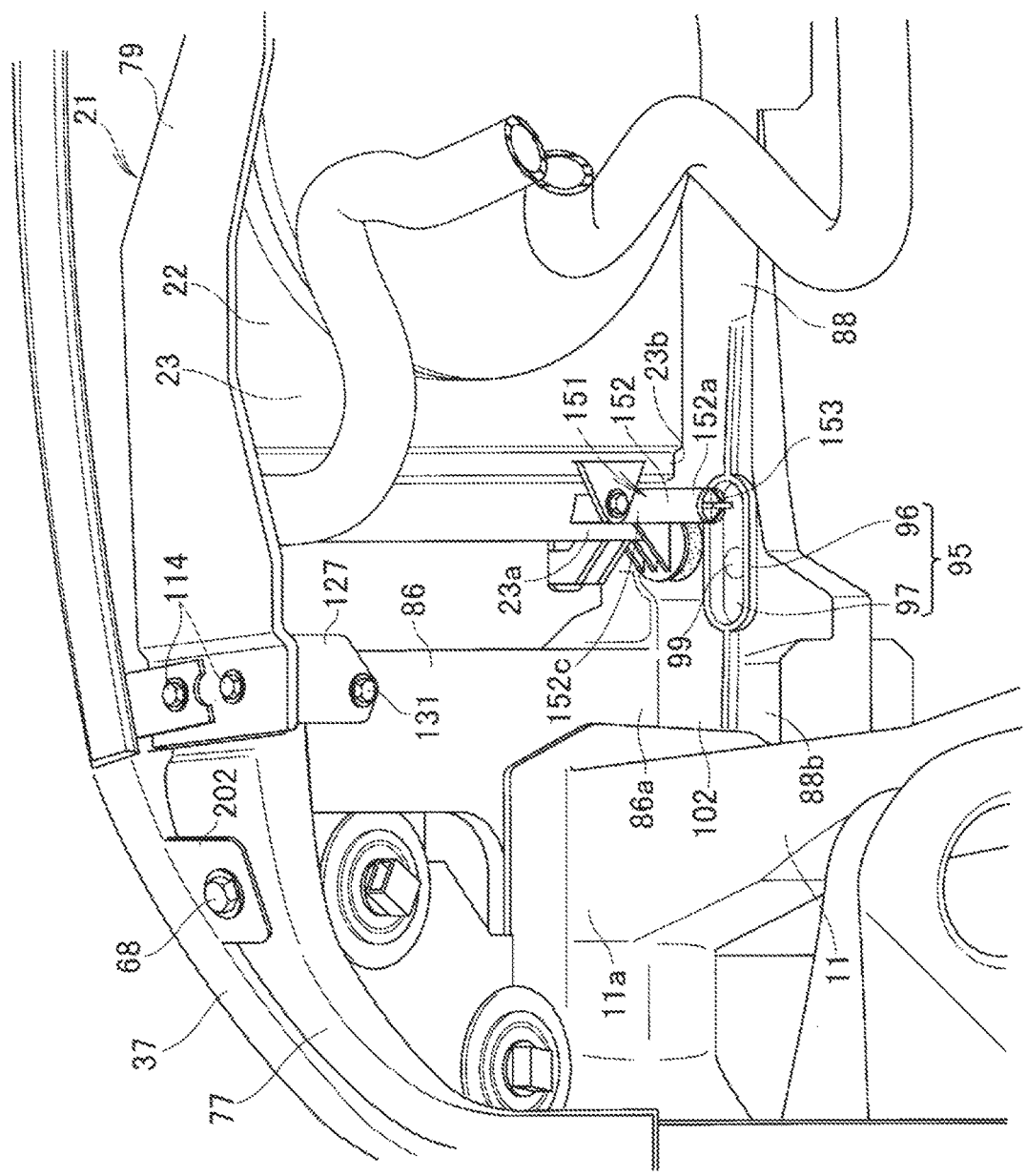
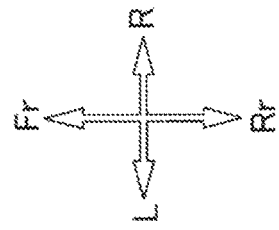

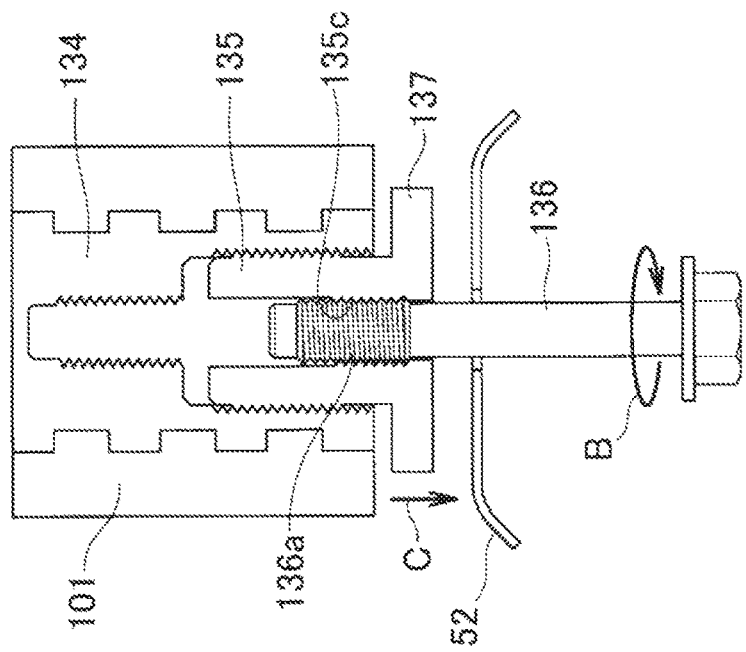
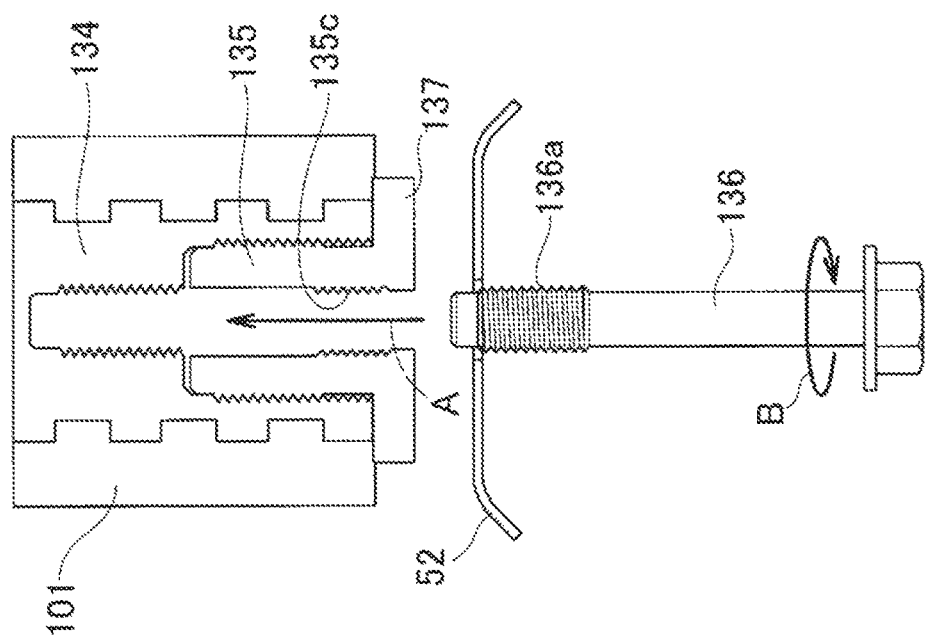
FIG. 20A
FIG. 20B

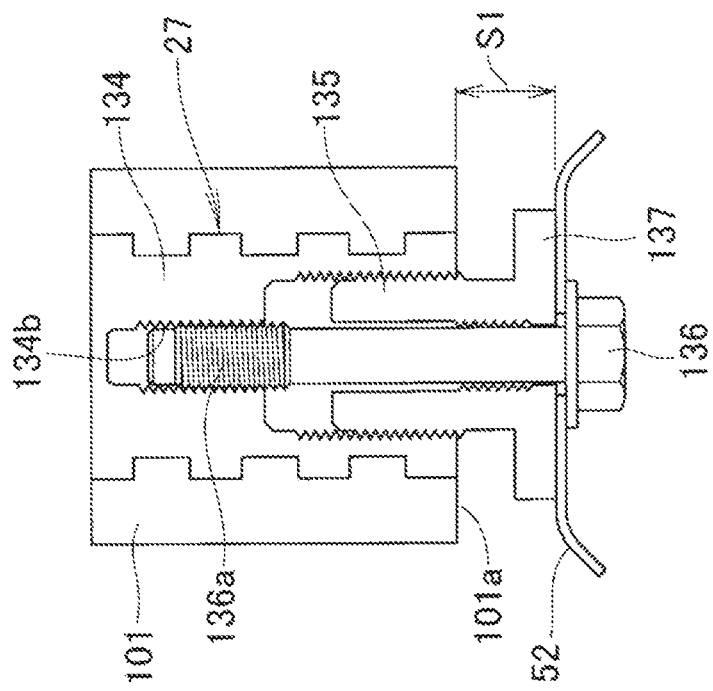
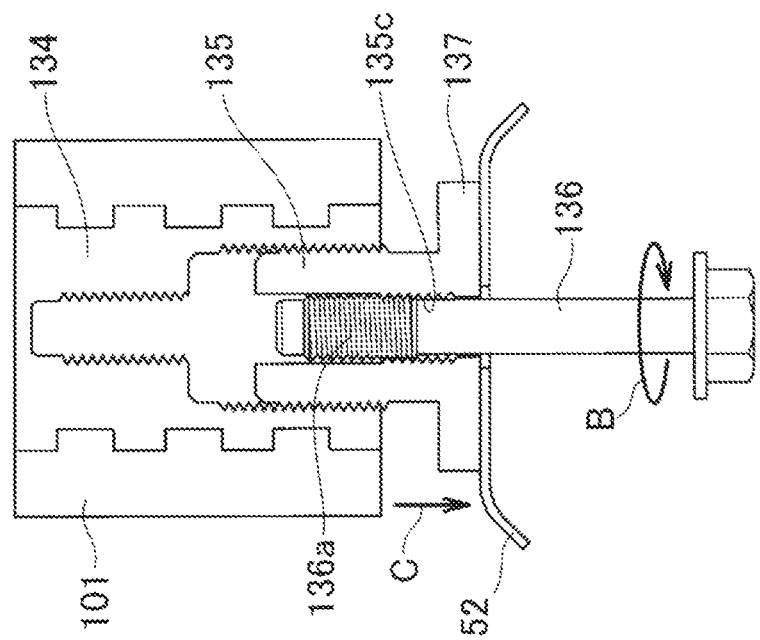
FIG. 21A
FIG. 21B

F I G. 37
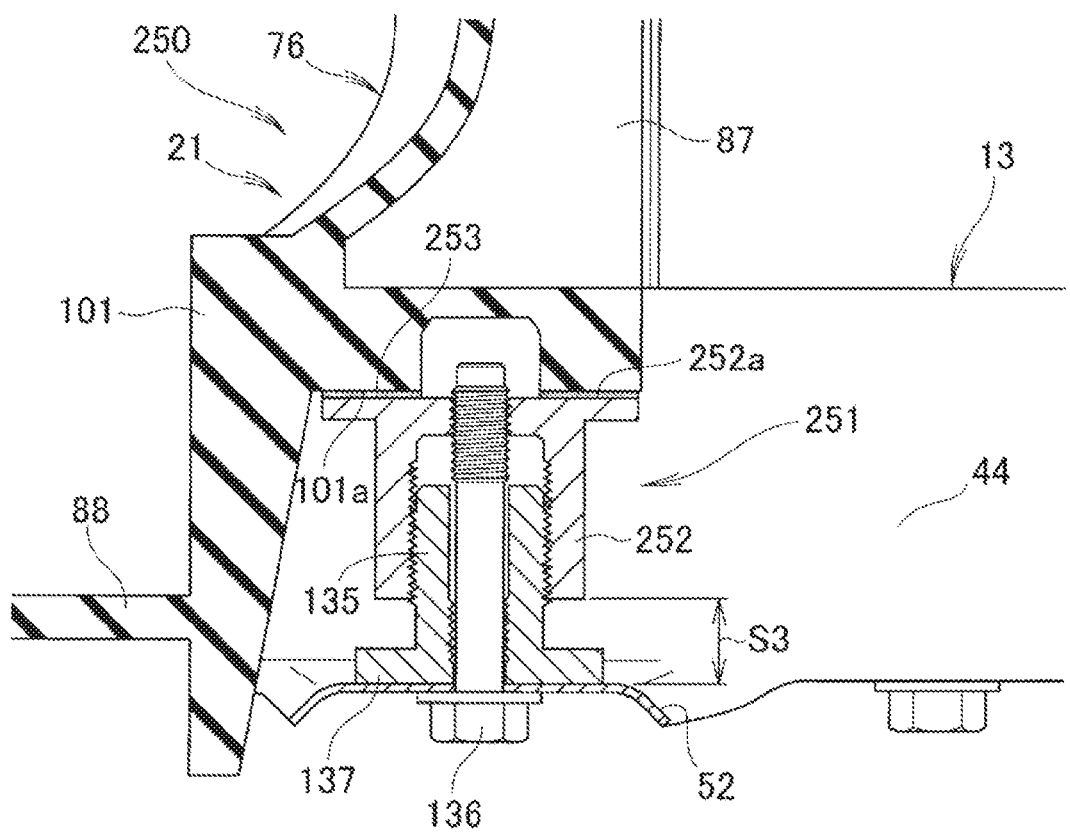

VEHICLE BODY FRONT STRUCTURE

This application is a continuation of International Patent Application No. PCT/JP2015/085366 filed on Dec. 17, 2015, and claims priority to Japanese Patent Application Nos. 2015-008814 filed on Jan. 20, 2015, 2015-008867 filed on Jan. 20, 2015, and 2015-008891 filed on Jan. 20, 2015, the entire contents of which are incorporated herein by reference.

BACKGROUND OF THE INVENTION

Field of the Invention

The present invention relates to a vehicle body front structure including a front side frame, an upper member, a front bulkhead, and the like provided around an engine room as framework members of a vehicle body.

Description of the Related Art

A vehicle body front structure in which the left side stay, the right side stay, the lower beam, the left upper side beam, and the left upper side beam of a front bulkhead are made of a resin is known. An upper beam made of a metal is detachably connected to the upper ends of the left side stay and the right side stay.

A hood lock device is attached to the center of the metal upper beam. The striker of a hood is locked on the hood lock device, thereby holding the hood at the closing position.

The front end of the left upper side beam is connected to the upper end of the left side stay, and the rear end of the left upper side beam is connected to a left upper member. Similarly, the front end of the right upper side beam is connected to the upper end of the right side stay, and the rear end of the right upper side beam is connected to a right upper member (for example, U.S. Pat. No. 7,419,208).

According to the vehicle body front structure of U.S. Pat. No. 7,419,208, the left side stay, the right side stay, the lower beam, the left upper side beam, and the left upper side beam are made of a resin, thereby reducing the weight of the front bulkhead (that is, the vehicle body).

In addition, when the upper beam is detached from the upper ends of the left side stay and the right side stay, the maintenance checkup of a cooling unit (a radiator, a condenser, and the like) can easily be done.

In the front bulkhead according to U.S. Pat. No. 7,419,208, however, the left upper side beam and the right upper side beam are made of a resin. For this reason, if an impact load is input to the front bulkhead, the left upper side beam and the right upper side beam may be ruptured by the impact load, and the upper beam may be displaced. When the upper beam is displaced, the striker may be unlocked from the hood lock device, and the hood may open.

The present invention provides a vehicle body front structure capable of reducing the weight of a front bulkhead, facilitating the maintenance checkup of a cooling unit (a radiator, a condenser, and the like), and suppressing opening of a hood by an impact load.

SUMMARY OF THE INVENTION

According to one aspect of the present invention, there is provided a vehicle body front structure in which a pair of front side frames are provided on left and right sides of a vehicle, an upper member is provided on an upper outer side of each front side frame, and a front bulkhead is connected to the pair of front side frames and a pair of upper members, wherein the front bulkhead comprises: a side stay made of a resin and connected to a front end of the front side frame; an upper side beam made of a metal, extending from the side stay to the upper member, and having a rear end connected to the upper member; an upper beam made of a metal and detachably connected to the side stay in a state in which an end is overlaid on a front end of the front side frame above the side stay; and a hood lock device provided on the upper beam and configured to lock a striker of a hood, wherein on the upper beam, the upper member extends from an upper side of the front side frame to a front side of a vehicle body so as to be curved downward, and a front end of the hood is arranged above the front bulkhead, wherein the vehicle body front structure further comprises: a headlight provided under the hood and on the front side of the front bulkhead in the vehicle body; and a fender with a front end provided under a rear end of the headlight, wherein the positioning bracket is provided on a convex curved portion extending to be curved downward of the upper beam, wherein the positioning bracket comprises: a reference surface arranged substantially horizontally above the curved portion and including the front bulkhead attachment reference hole, the headlight attachment reference hole, the hood attachment reference hole, and the fender attachment reference hole; a front leg portion extending from a front end of the reference surface downward to the curved portion and joined to the curved portion; and a rear leg portion formed to be shorter than a leg length of the front leg portion and joined to the curved portion in a state in which the rear leg portion extends from a rear end of the reference surface downward to the curved portion, and wherein the reference surface is supported above the curved portion by the front leg portion and the rear leg portion.

According to another aspect of the present invention, there is provided the vehicle body front structure, further comprising hood hinges arranged to a rear end of the hood and rear ends of the pair of upper members so as to pivotally connecting the rear end of the hood to the rear ends of the pair of upper members, wherein another hood attachment reference hole is formed between the hood hinge and the hood attachment reference hole of the upper member, and four points corresponding to the pair of hood attachment reference holes and the pair of other hood attachment reference holes serve as references to position the hood.

According to still another aspect of the present invention, there is provided the vehicle body front structure, further comprising a hood cushion intervening between the upper side beam and the hood and configured to define a height of the hood, wherein a headlight attachment hole is formed in the upper side beam on an inner side of the headlight attachment reference hole in a vehicle width direction, wherein the headlight comprises: an upper outer attachment piece extending from an upper portion of the rear end of the headlight up to the headlight attachment reference hole and positioned by the headlight attachment reference hole; and an upper inner attachment piece extending from an upper portion on an inner side of the rear end of the headlight in the vehicle width direction up to the headlight attachment hole, placed on the upper side beam, and configured to be adjustable with respect to the headlight attachment hole.

According to yet another aspect of the present invention, there is provided a vehicle body front structure in which a pair of front side frames are provided on left and right sides of a vehicle, an upper member is provided on an upper outer side of each front side frame, and a front bulkhead is connected to the pair of front side frames and a pair of upper members, wherein the front bulkhead comprises: a side stay made of a resin and connected to a front end of the front side frame; an upper side beam made of a metal, extending from the side stay to the upper member, and having a rear end connected to the upper member; an upper beam made of a metal and detachably connected to the side stay in a state in which an end is overlaid on a front end of the front side frame above the side stay; and a hood lock device provided on the upper beam and configured to lock a striker of a hood, wherein the vehicle body front structure comprises: a positioning bracket provided on the upper member and capable of positioning the front bulkhead in a vertical direction, the subframe being attached to the front side frame from below, and the upper member extending from an upper portion of the front side frame to a front side of a vehicle body so as to be curved downward; and a connecting mechanism capable of connecting a lower end of the front bulkhead to a front end of the subframe and capable of extending and contracting, wherein the vehicle body front structure further comprises: a support portion extending downward from the front end of the front side frame to support the side stay; and a floor frame arranged on a rear side of the subframe in the vehicle body and extending in a vehicle body longitudinal direction, wherein a rear end, a central portion, and a front portion of the subframe are connected to a front end of the floor frame, the front side frame, and the support portion, respectively, such that the subframe is arranged on a front side of the floor frame in the vehicle body, wherein the subframe comprises: an extended portion extending from the front portion of the subframe to the front side of the vehicle body; and a projecting piece projecting from the extended portion in a vehicle width direction, and wherein a lower end of the front bulkhead is connected to the projecting piece by the connecting mechanism.

According to still yet another aspect of the present invention, there is provided the vehicle body front structure, wherein the front bulkhead comprises a lower beam made of a resin, the lower beam being connected to a lower end of the side stay and extending in the vehicle width direction, and wherein the lower beam and the side stay cross to form a lower corner portion at a lower end of the front bulkhead, the projecting piece projects to an inner side of the extended portion in the vehicle width direction such that the projecting piece is located under the lower corner portion, and the lower corner portion is connected to the projecting piece via the connecting mechanism.

According to yet still another aspect of the present invention, there is provided the vehicle body front structure, further comprising a hood cushion intervening between the upper side beam and the hood and configured to define a height of the hood, wherein a headlight attachment hole is formed in the upper side beam on an inner side of the headlight attachment reference hole in a vehicle width direction, wherein the headlight comprises: an upper outer attachment piece extending from an upper portion of the rear end of the headlight up to the headlight attachment reference hole and positioned by the headlight attachment reference hole; and an upper inner attachment piece extending from an upper portion on an inner side of the rear end of the headlight in the vehicle width direction up to the headlight attachment hole, placed on the upper side beam, and configured to be adjustable with respect to the headlight attachment hole.

In the invention according to claim 1, the side stay of the front bulkhead is made of a resin. The weight of the front bulkhead can thus be reduced. The end of the upper beam made of a metal is detachably connected to the front end of the upper side beam. When the upper beam is detached from the front end of the upper side beam, the maintenance checkup of a cooling unit (a radiator, a condenser, and the like) can easily be done.

Here, the upper beam and the upper side beam are made of a metal. Hence, the rigidity of the beams can be ensured. In addition, the end of the upper beam is connected to the side stay in a state in which the end of the upper beam clamps the side stay in the vehicle body longitudinal direction. Hence, the upper beam can firmly be supported by the side stay.

In this state, if an impact load is input to the front bulkhead (in particular, the upper beam), the upper beam or the upper side beam can be prevented from being ruptured by the input impact load.

Hence, the impact load input to the upper beam can be transmitted to the upper member via the upper beam and the upper side beam. That is, the impact load input to the upper beam can be supported by the upper member. Hence, by preventing the upper beam from being ruptured, the striker of the hood can be kept in a state in which it is locked in the hood lock device. It is therefore possible to suppress opening of the hood by the impact load input to the front bulkhead.

In addition, when the upper beam and the upper side beam are made of a metal, a high heat component such as an exhaust system catalyst can be arranged near the beams. It is therefore possible to increase the degree of freedom of design in determining the arrangement of a high heat component such as an exhaust system catalyst.

In the invention according to claim 1, the upper member includes the positioning bracket. In addition, the rear end of the front bulkhead is positioned by the front bulkhead attachment reference hole of the positioning bracket. Furthermore, the rear end of the headlight is positioned by the headlight attachment reference hole of the positioning bracket. Additionally, the fender is positioned by the fender attachment reference hole of the positioning bracket.

It is therefore possible to extend the rear end of the headlight long backward in the vehicle body up to the rear end of the front bulkhead and also up to the fender. In this state, the rear end of the headlight is arranged between the fender and the hood. By making the headlight long, the degree of freedom of design can be increased.

Additionally, the headlight attachment reference hole, the hood attachment reference hole, and the fender attachment reference hole are formed in the positioning bracket that is a single member. Hence, the gap between the hood and the headlight can be kept constant, and the gap between the fender and the rear end of the headlight can be kept constant.

This makes it possible to satisfactorily ensure so-called fitting between the hood, the headlight, and the fender and improve the outer appearance of the vehicle.

In the invention according to claim 1, the reference surface is supported above the curved portion by the front leg portion and the rear leg portion. Hence, the reference surface can firmly be supported above the curved portion. In other words, the support rigidity of the reference surface can be increased. Accordingly, a plurality of members (that is, the rear end of the front bulkhead, the rear end of the headlight, and the fender) can firmly be supported by the reference surface.

The front leg portion is formed by being extended from the front end of the reference surface, and the rear leg portion is formed by being extended from the rear end of the reference surface. Hence, the leg length of the front leg portion or the rear leg portion can easily be adjusted by changing the extension amount of the front leg portion or the rear leg portion.

This makes it possible to easily adjust the height of the reference surface and satisfactorily ensure the fitting between the hood, the headlight, and the fender.

In the invention according to claim 2, the hood can be positioned based on four points corresponding to the pair of hood attachment reference holes and the pair of other hood attachment reference holes. It is therefore possible to, for example, attach the hood hinges to the rear end of the hood, position the hood in this state, and attach the hood hinges to the rear ends of the pair of upper members.

Accordingly, the hood hinge can accurately be attached to the attachment position, and the hood can be connected to the upper members in an accurately positioned state.

In the invention according to claim 3 or 6, the upper outer attachment piece is provided on the upper portion of the rear end of the headlight. The upper outer attachment piece is positioned by the headlight attachment reference hole. In addition, the upper inner attachment piece is provided on the upper portion on the inner side of the rear end of the headlight. The upper inner attachment piece can be adjusted with respect to the headlight attachment hole.

It is therefore possible to attach the headlight in a state in which the upper outer attachment piece is positioned by the headlight attachment reference hole. Accordingly, the headlight can be attached in a state in which the rear end of the headlight is accurately positioned.

By accurately positioning the rear end of the headlight, the fitting between the hood, the headlight, and the fender can satisfactorily be ensured.

In addition, the upper inner attachment piece is placed on the upper side beam, and the height of the hood with respect to the upper side beam is defined by the hood cushion. Hence, the height of the hood or headlight can be determined based on the upper side beam serving as a reference. Accordingly, the gap between the front end of the hood and the outer appearance design line of the headlight can be made constant, and the outer appearance of the vehicle can be improved.

In the invention according to claim 4, the connecting mechanism is provided, and the lower end of the front bulkhead is connected to the front end of the subframe by the connecting mechanism. In addition, the connecting mechanism can extend and contract. Hence, in a state in which the front bulkhead is positioned in the vertical direction by the positioning bracket, if a gap is formed between the lower end of the front bulkhead and the front end of the subframe, the connecting mechanism can be extended in correspondence with the gap. The lower end of the front bulkhead can reliably be connected to the front end of the subframe without taking much time using the connecting mechanism.

In the invention according to claim 4, the support portion is extended downward from the front end of the front side frame, and the side stay made of a resin is supported by the support portion. Hence, the side stay made of a resin can be reinforced by the support portion. The rigidity/strength of the front bulkhead can thus be improved.

In addition, when the side stay made of a resin is supported by the support portion, the side stay (that is, the front bulkhead) made of a resin can be supported by the support portion in a stable state. This can increase the workability when connecting the lower end of the front bulkhead to the projecting piece by the connecting mechanism.

In the invention according to claim 5, the lower corner portion of the front bulkhead is connected to the projecting piece via the connecting mechanism. Hence, the lower corner portion of the front bulkhead can be reinforced by the projecting piece. The rigidity/strength of the front bulkhead can thus be improved.

BRIEF DESCRIPTION OF THE DRAWINGS

FIG. 16 is a view viewed from the direction of an arrow 16 in FIG. 4;

FIGS. 20A and 20B are views for explaining an example in which the right connecting mechanism is extended to connect the right lower corner portion according to the first embodiment to the projecting piece;

FIGS. 21A and 21B are views for explaining an example in which the right lower corner portion is connected to the projecting piece by extending the right connecting mechanism according to the first embodiment;

FIG. 37 is a sectional view showing a right connecting mechanism according to the third embodiment of the present invention.

DESCRIPTION OF THE EMBODIMENTS

The best mode for carrying out the present invention will now be described with reference to the accompanying drawings. Note that "front (Fr)", "rear (Rr)", "left (L)", and "right (R)" comply with directions viewed from a driver.

First Embodiment

A vehicle body front structure 10 according to the first embodiment will be described.

Figure 1:
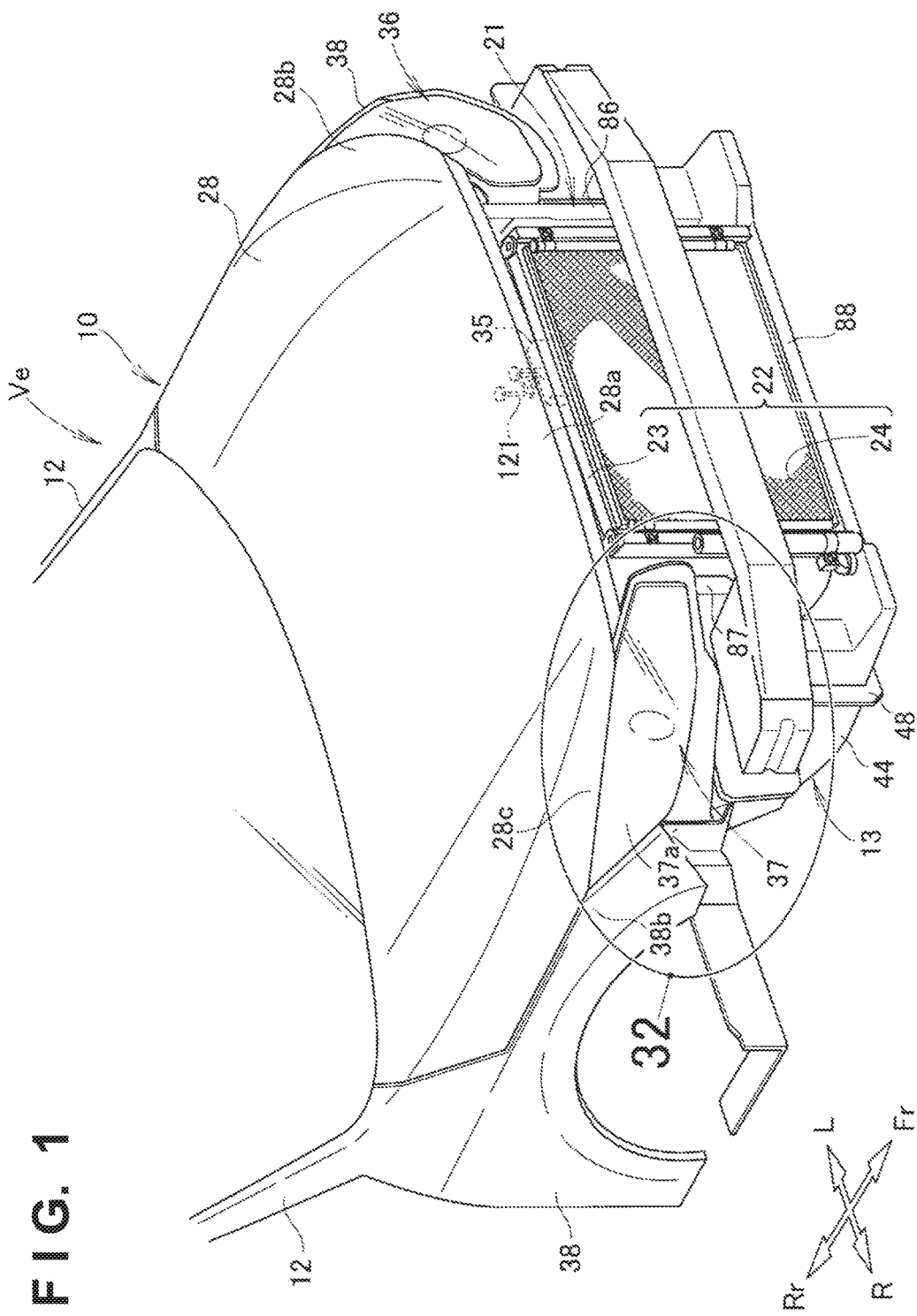
FIG. 1 is a perspective view showing a vehicle body front structure according to the first embodiment of the present invention.
Figure 2:
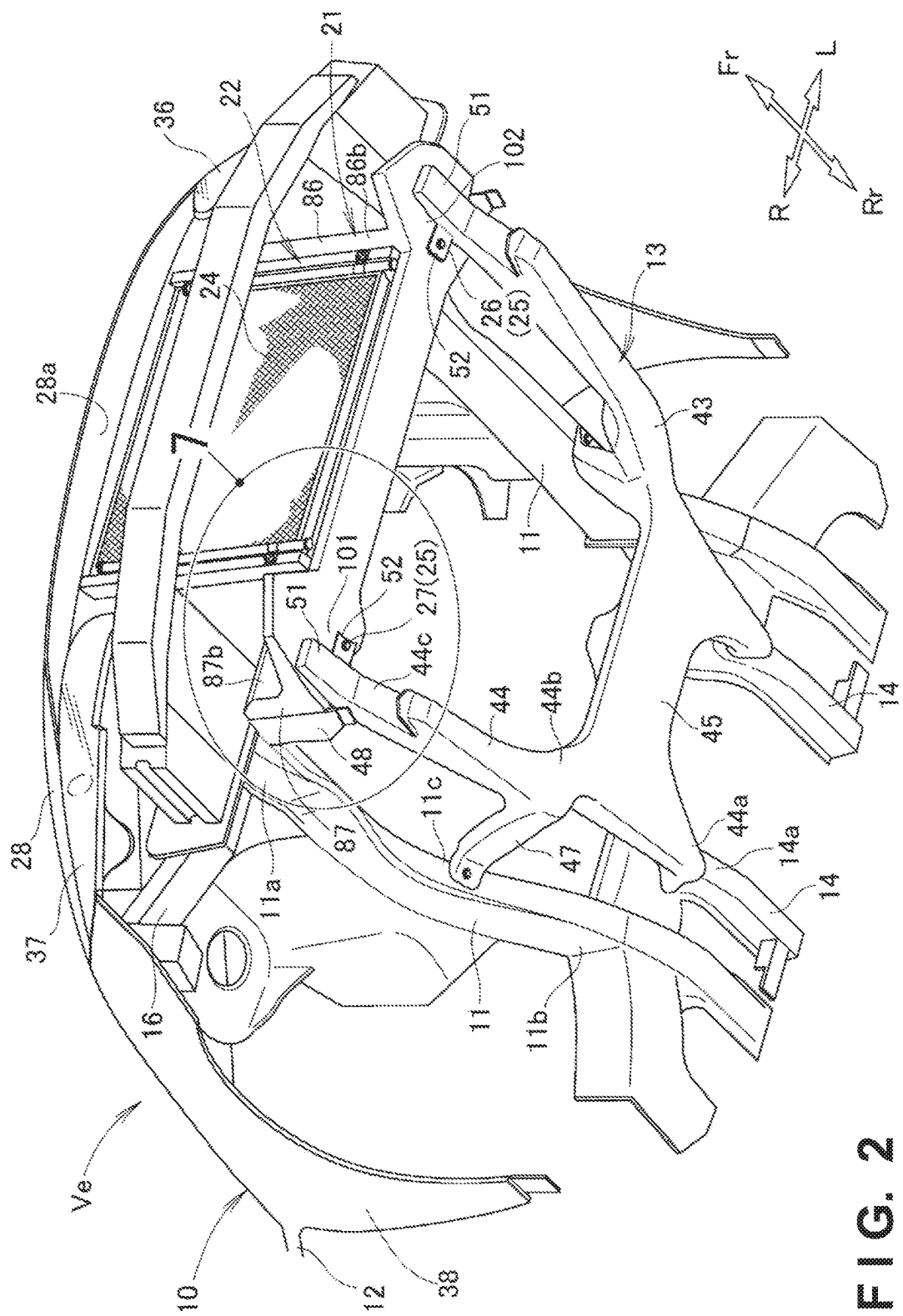
FIG. 2 is a perspective view showing a state in which the vehicle body front structure in FIG. 1 is viewed from the lower front side of the vehicle body.

As shown in FIGS. 1 and 2, the vehicle body front structure 10 includes left and right front side frames 11 provided on the left and right sides of a vehicle Ve, a left front pillar 12 provided at the rear end of the left front side frame 11, a right front pillar 12 provided at the rear end of the right front side frame 11, a subframe 13 attached to the left front side frame 11 and the right front side frame 11 from the lower side, and left and right floor frames 14 arranged on the rear side of the subframe 13 in the vehicle body.

Figure 3:
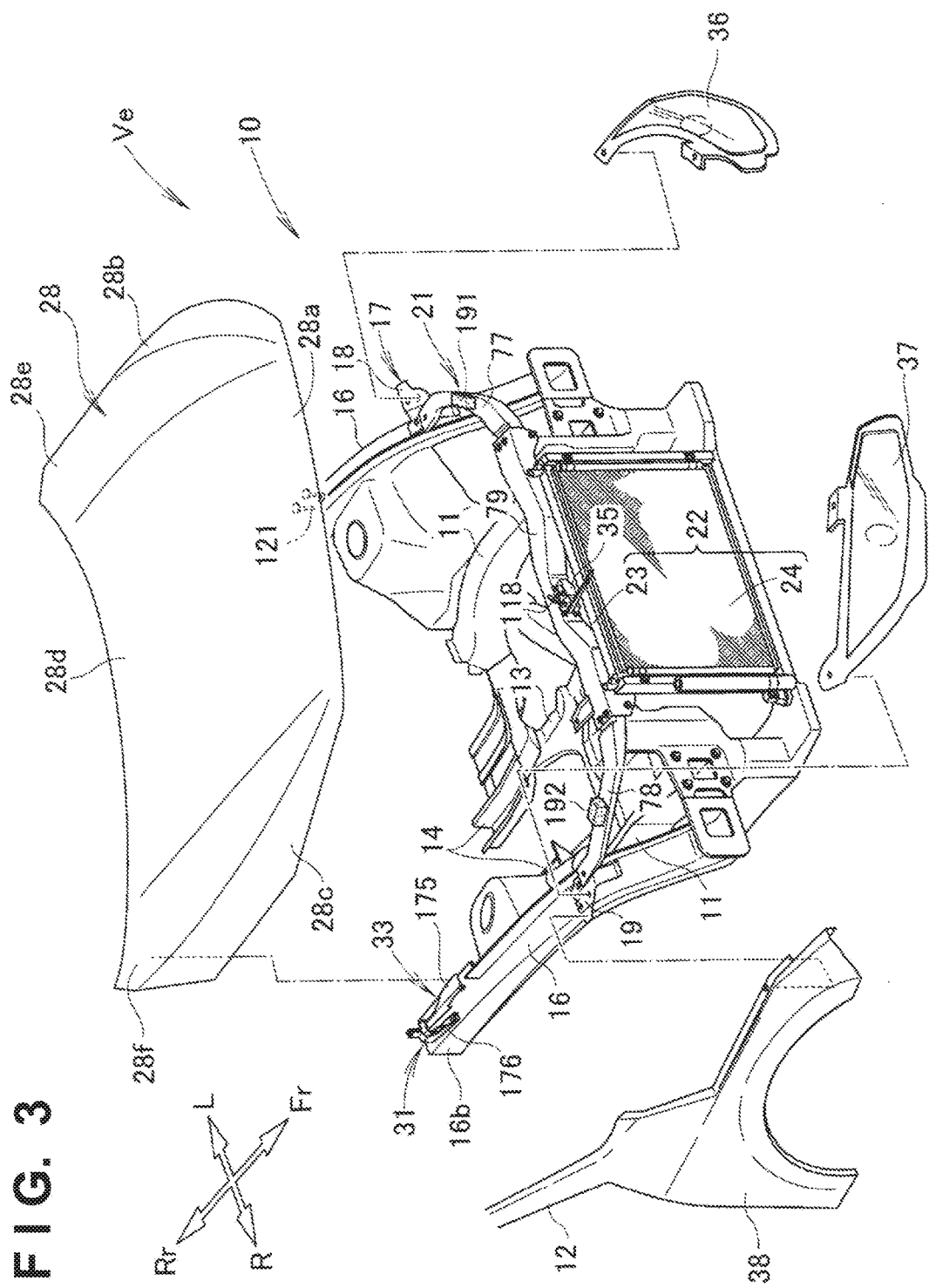
FIG. 3 is an exploded perspective view showing the vehicle body front structure in FIG. 1.
Figure 4:
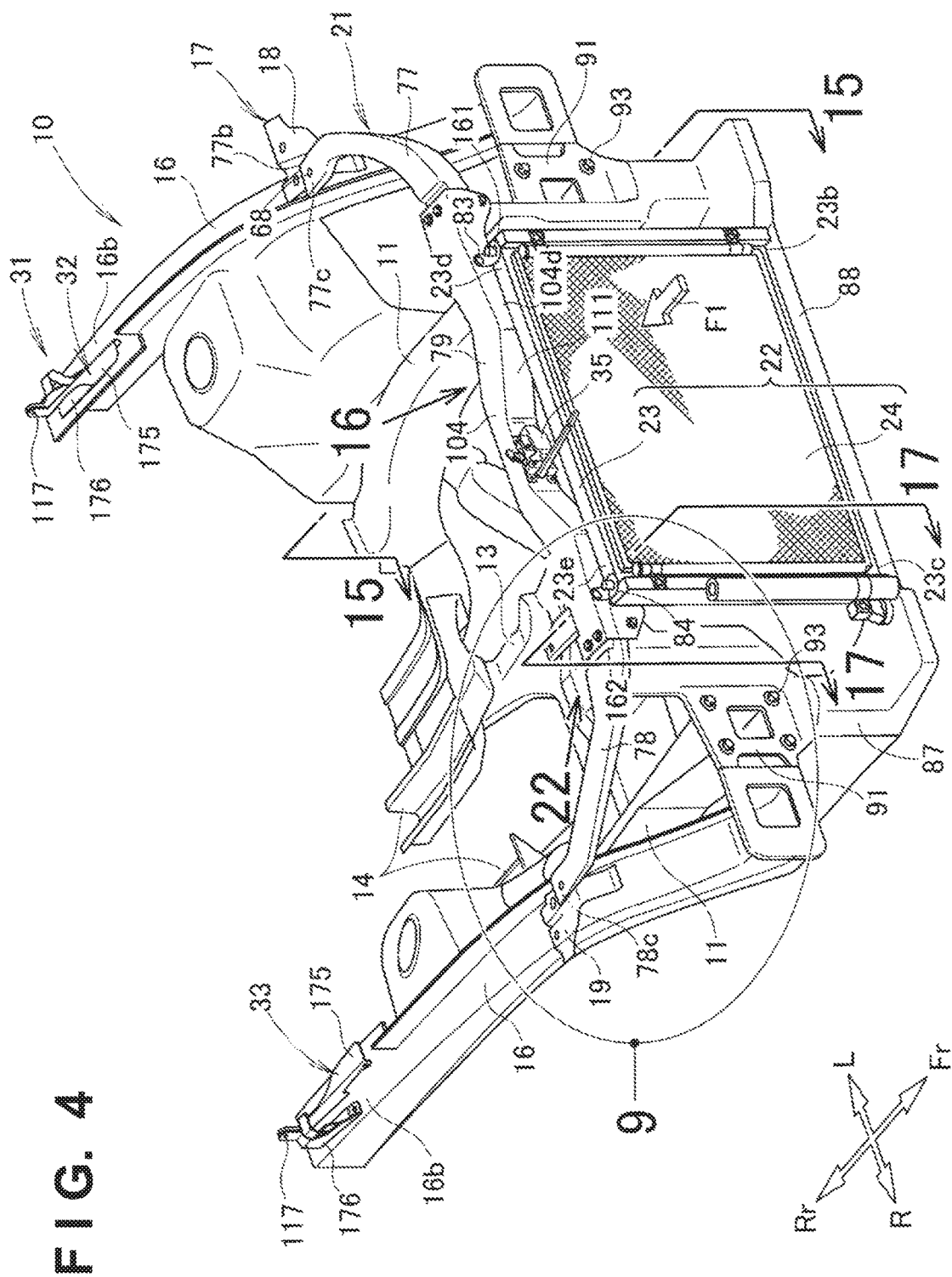
FIG. 4 is a perspective view showing the main part of the vehicle body front structure in FIG. 3.

Additionally, as shown in FIGS. 3 and 4, the vehicle body front structure 10 includes a left upper member 16 extending from the left front pillar 12 (see FIG. 1) to the front side of the vehicle body, a right upper member 16 extending from the right front pillar 12 to the front side of the vehicle body, a positioning means 17 provided on each of the left and right upper members 16, a front bulkhead 21 connected to the left and right front side frames 11 and the left and right upper members 16, and a cooling unit 22 supported by the front bulkhead 21.

The vehicle body front structure 10 further includes a connecting means 25 (see FIG. 2) for connecting the front bulkhead 21 to the subframe 13, a hood 28 with a hood front end 28a arranged above the front bulkhead 21, and hinge means 31 for connecting the hood 28 to the left upper member 16 and the right upper member 16 such that the hood 28 can be opened/closed.

Additionally, referring back to FIG. 1, the vehicle body front structure 10 includes a hood lock device 35 capable of being locked in the hood 28, a left headlight 36 and a right headlight 37 arranged under the hood 28, a left fender 38 arranged under a hood left side portion 28b of the hood 28, and a right fender 38 arranged under a hood right side portion 28c of the hood 28.

The vehicle body front structure 10 has a substantially bilaterally symmetrical structure. The constituent members on the right side will be described below in detail, and a detailed description of the constituent members on the left side will be omitted.

Figure 5:
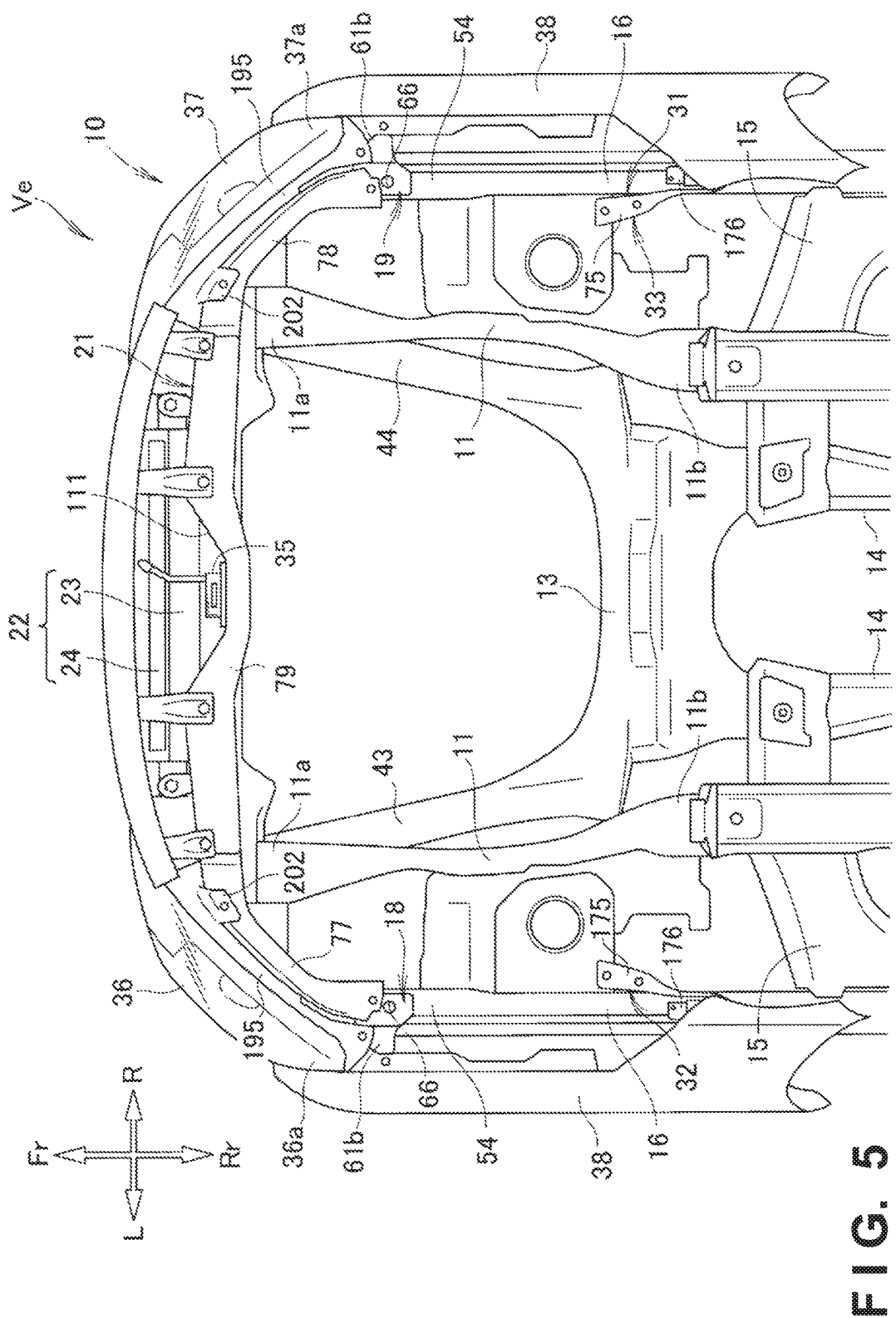
FIG. 5 is a plan view showing a state in which a hood is detached from the vehicle body front structure in FIG. 1.
Figure 6:
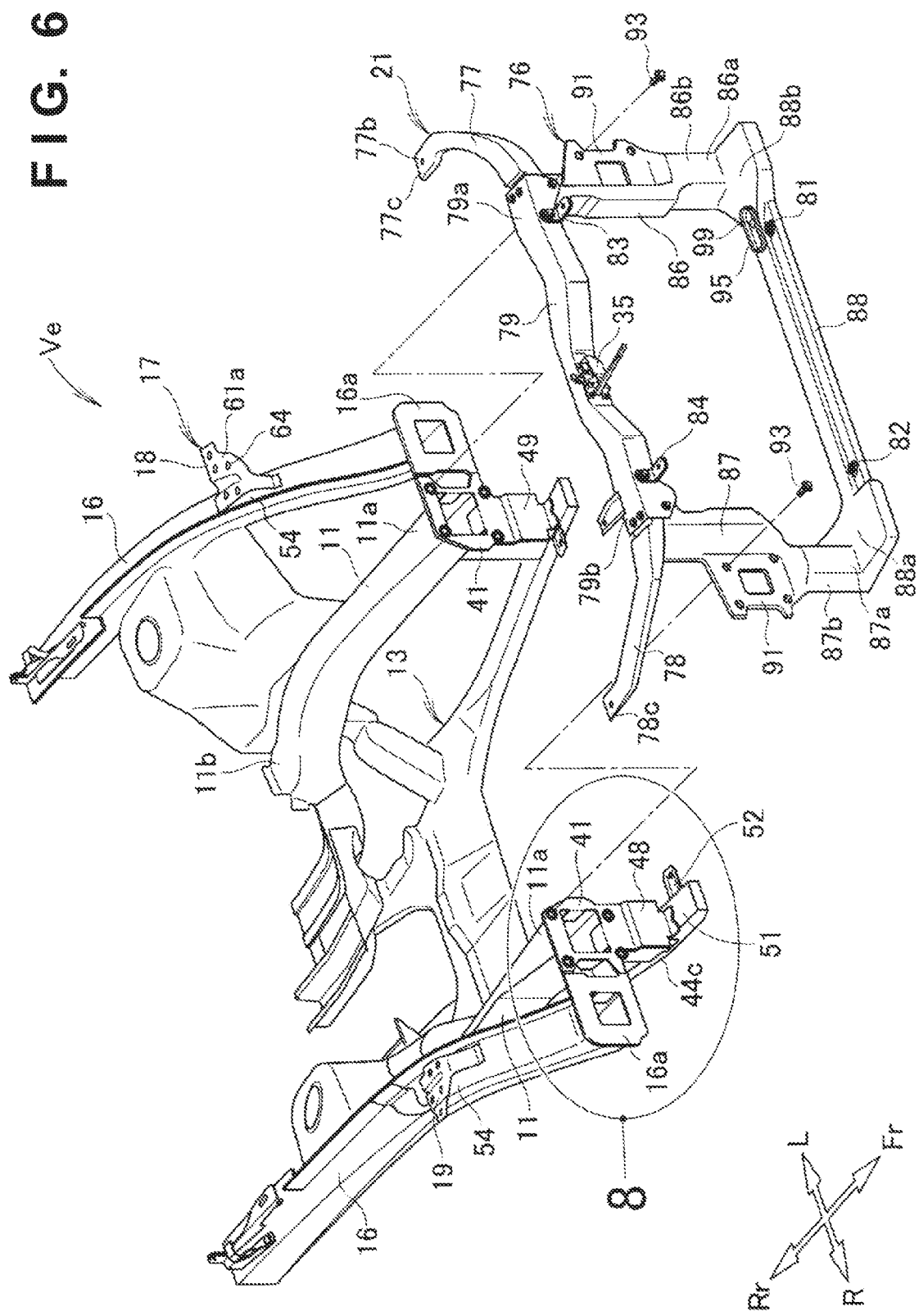
FIG. 6 is an exploded perspective view showing the main part of the vehicle body front structure in FIG. 4.

As shown in FIGS. 5 and 6, the right front side frame 11 is provided on the right side of the vehicle Ve and, in this state, extended in the vehicle body longitudinal direction. A frame attachment portion 41 is provided at a front end 11a.

The right front side frame 11 is formed into a substantially rectangular closed section. The frame attachment portion 41 is formed into a substantially rectangular frame body on the front edge of the front end 11a.

A rear end 11b of the right front side frame 11 is joined to the right front pillar 12 (see FIG. 1) via a right outrigger 15.

The left front side frame 11 is formed to be substantially bilaterally symmetrical to the right front side frame 11. Hence, the components of the left front side frame 11 are denoted by the same reference numerals as in the right front side frame 11, and a detailed description thereof will be omitted.

As shown in FIG. 2, the subframe 13 is attached to the left front side frame 11, the right front side frame 11, the left floor frame 14, and the right floor frame 14 from the lower side.

The subframe 13 includes a left subframe 43 arranged on the left side of the vehicle Ve, a right subframe 44 arranged on the right side of the vehicle Ve, and a sub-cross member 45 bridged between the left subframe 43 and the right subframe 44.

The subframe 13 is formed by the left subframe 43, the right subframe 44, and the sub-cross member 45 into a substantially H shape in a planar view. The subframe 13 is a substantially bilaterally symmetrical member. The right portion (in particular, the right subframe 44) will be described below, and a description of the left portion will be omitted.

The right subframe 44 of the subframe 13 is connected to the right floor frame 14 and the right front side frame 11.

More specifically, a rear end 44a of the right subframe 44 is connected to a front end 14a of the right floor frame 14 from the lower side. In addition, a central portion 44b of the right subframe 44 is connected to a central portion 11c of the right front side frame 11 from the lower side via a right rear support portion 47.

In addition, a front portion 44c of the right subframe 44 is connected to the front end 11a of the right front side frame 11 from the lower side via a right front support portion 48.

Like the right subframe 44, the left subframe 43 of the subframe 13 is connected to the left floor frame 14 and the left front side frame 11. The subframe 13 is thus arranged on the front side of the right floor frame 14 and left floor frame 14 in the vehicle body.

The right front support portion 48 extends downward from the lower portion of the front end 11a of the right front side frame 11. A right side stay 87 of the front bulkhead 21 is held by the right front support portion 48.

Figure 7:
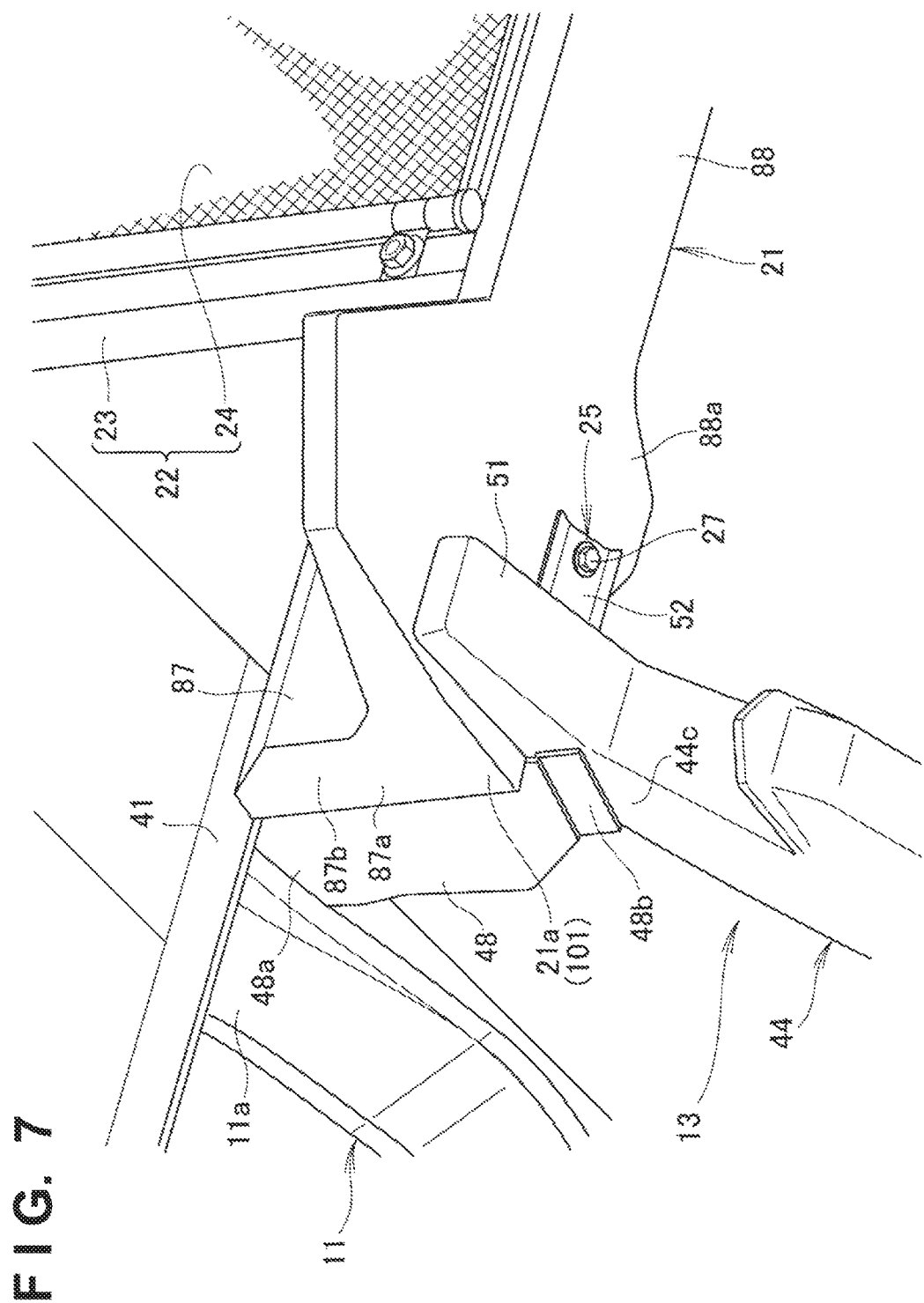
FIG. 7 is an enlarged view of a portion 7 in FIG. 2.
Figure 8:
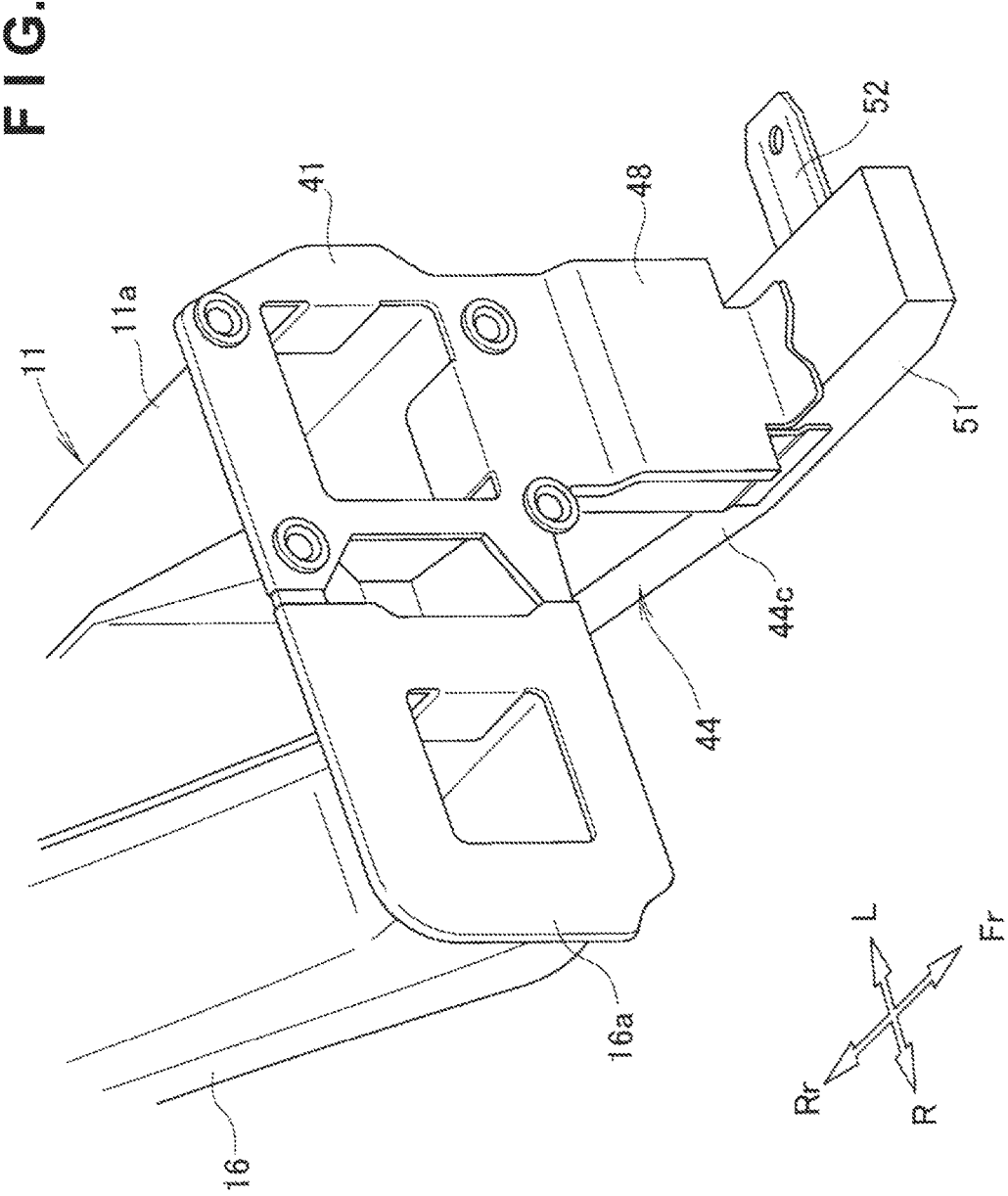
FIG. 8 is an enlarged view of a portion 8 in FIG. 6.

As shown in FIGS. 7 and 8, the right subframe 44 is formed into a substantially rectangular closed section. The right subframe 44 includes an extended portion 51 extending from the front portion 44c of the right subframe 44 to the front side of the vehicle body, and a projecting piece (the front end of the subframe 13) 52 projecting from the extended portion 51 inward in the vehicle width direction.

A right lower end 21a of the front bulkhead 21 is connected to the projecting piece 52 by a right connecting mechanism 27 of the connecting means 25.

Referring back to FIG. 2, the right floor frame 14 is arranged on the rear side of the right subframe 44 in the vehicle body and on the lower side of the floor portion of the cabin and extends in the vehicle body longitudinal direction.

The left floor frame 14 is a member substantially bilaterally symmetrical to the right floor frame 14. The left floor frame 14 is arranged on the rear side of the left subframe 43 in the vehicle body and extends in the vehicle body longitudinal direction.

As shown in FIGS. 5 and 6, the right upper member 16 is provided above the outside of the right front side frame 11. The right upper member 16 extends from the upper side of the right front side frame 11 to the front side of the vehicle body so as to curve downward and includes a convex curved portion 54 substantially at the center.

A front end 16a of the right upper member 16 is connected to the front end 11a of the right front side frame 11 from the outside in the vehicle width direction.

The left upper member 16 is formed to be substantially bilaterally symmetrical to the right upper member 16. Hence, the components of the left upper member 16 are denoted by the same reference numerals as in the right upper member 16, and a detailed description thereof will be omitted.

Each of the curved portion 54 of the right upper member 16 and the curved portion 54 of the left upper member 16 is provided with the positioning means 17. The positioning means 17 includes a left positioning bracket 18 provided on the curved portion 54 of the right upper member 16, and a right positioning bracket 19 provided on the curved portion 54 of the left upper member 16.

The left positioning bracket 18 and the right positioning bracket 19 are substantially bilaterally symmetrical members. The right positioning bracket 19 will be described below, and a detailed description of the left positioning bracket 18 will be omitted.

Figure 9:
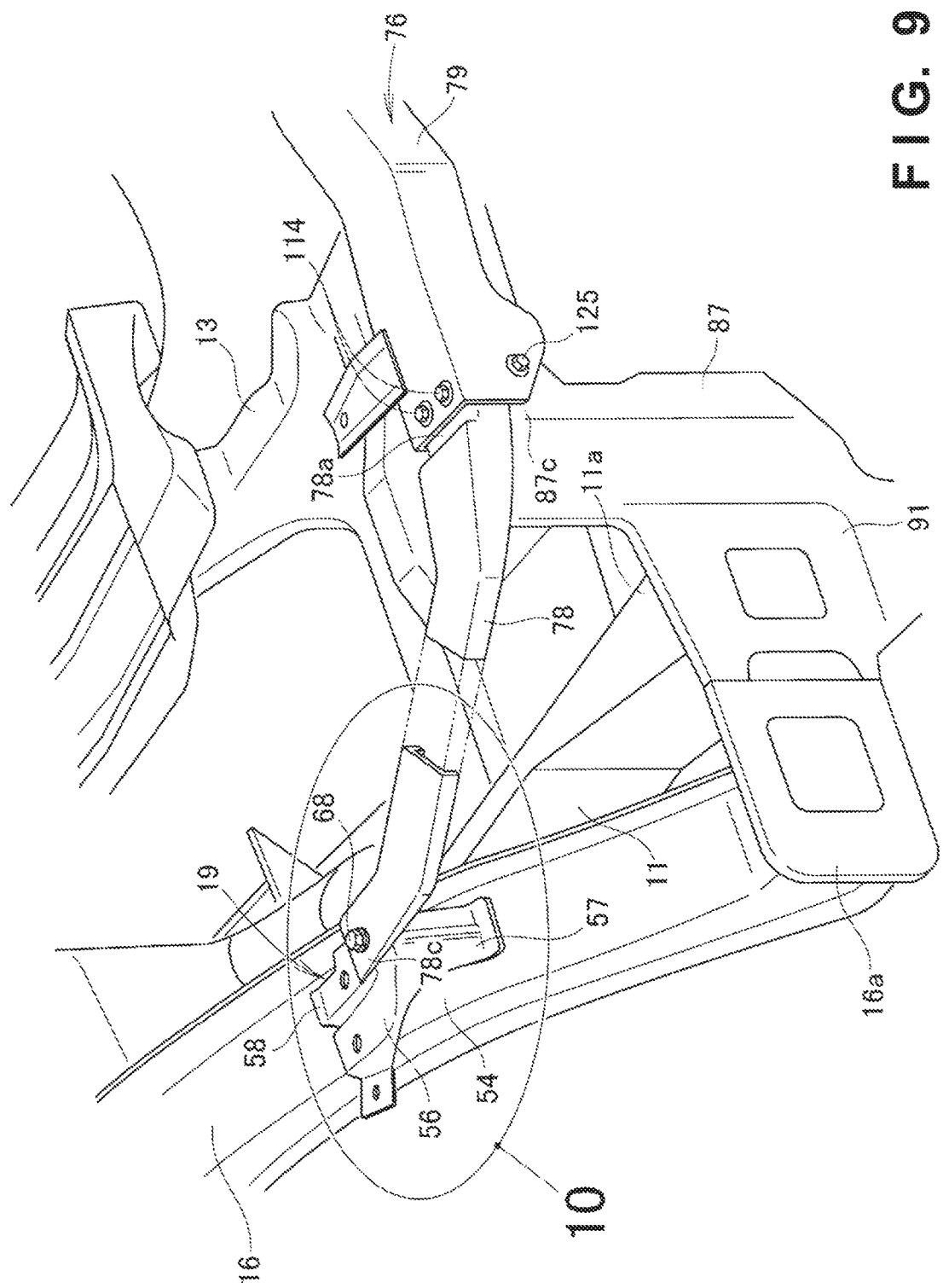
FIG. 9 is an enlarged view of a portion 9 in FIG. 4.
Figure 10:
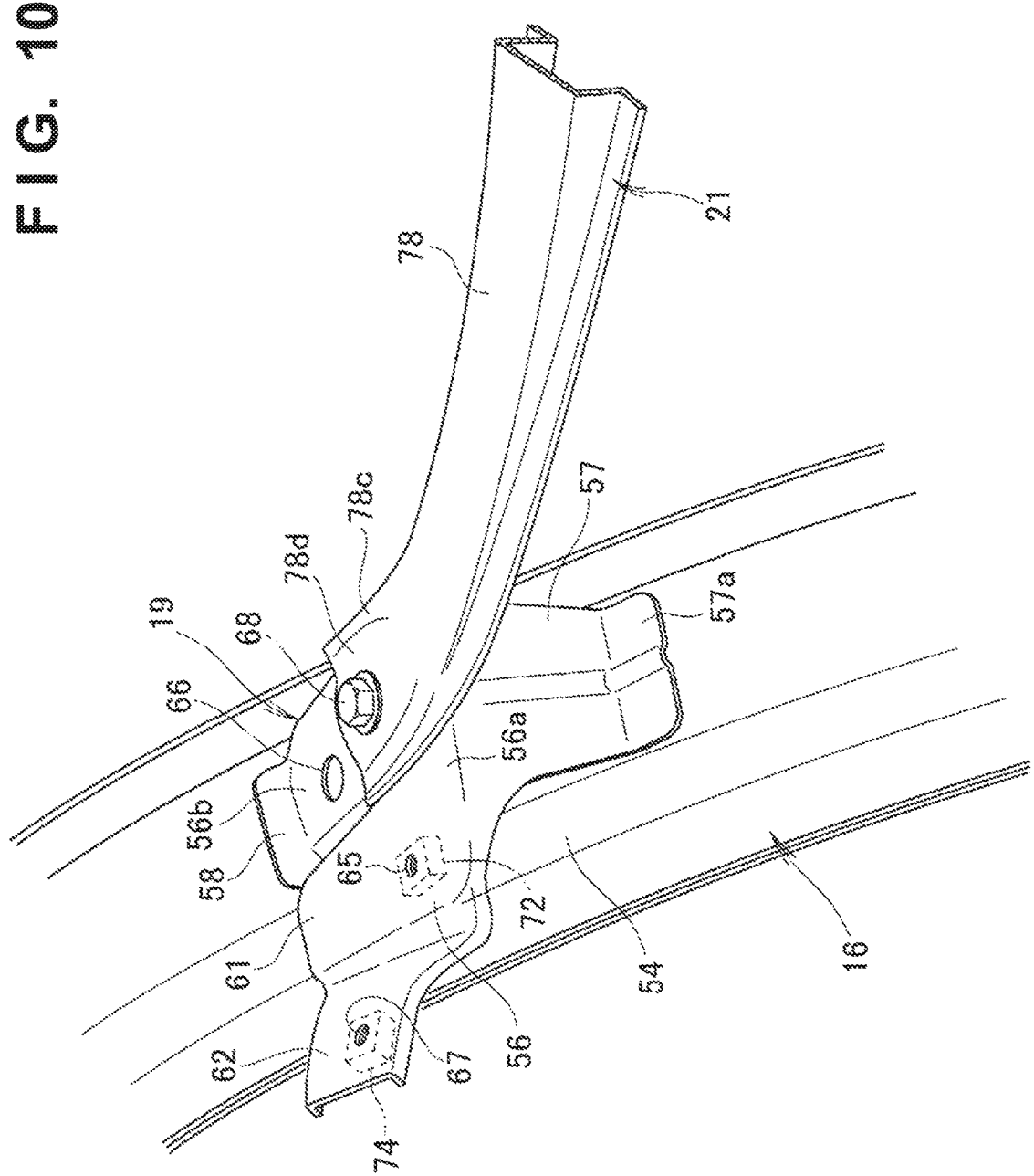
FIG. 10 is an enlarged view of a portion 10 in FIG. 9.

As shown in FIGS. 9 and 10, the right positioning bracket 19 includes a reference surface 56 arranged substantially horizontally above the curved portion 54, a front leg portion 57 extending from a front end 56a of the reference surface 56 downward to the curved portion 54, and a rear leg portion 58 extending from a rear end 56b of the reference surface 56 downward to the curved portion 54.

The reference surface 56 includes a flat surface 61 having a substantially rectangular shape in a planar view and formed to be substantially flat, and a projecting surface 62 projecting from the flat surface 61 outward in the vehicle width direction.

Figure 11:
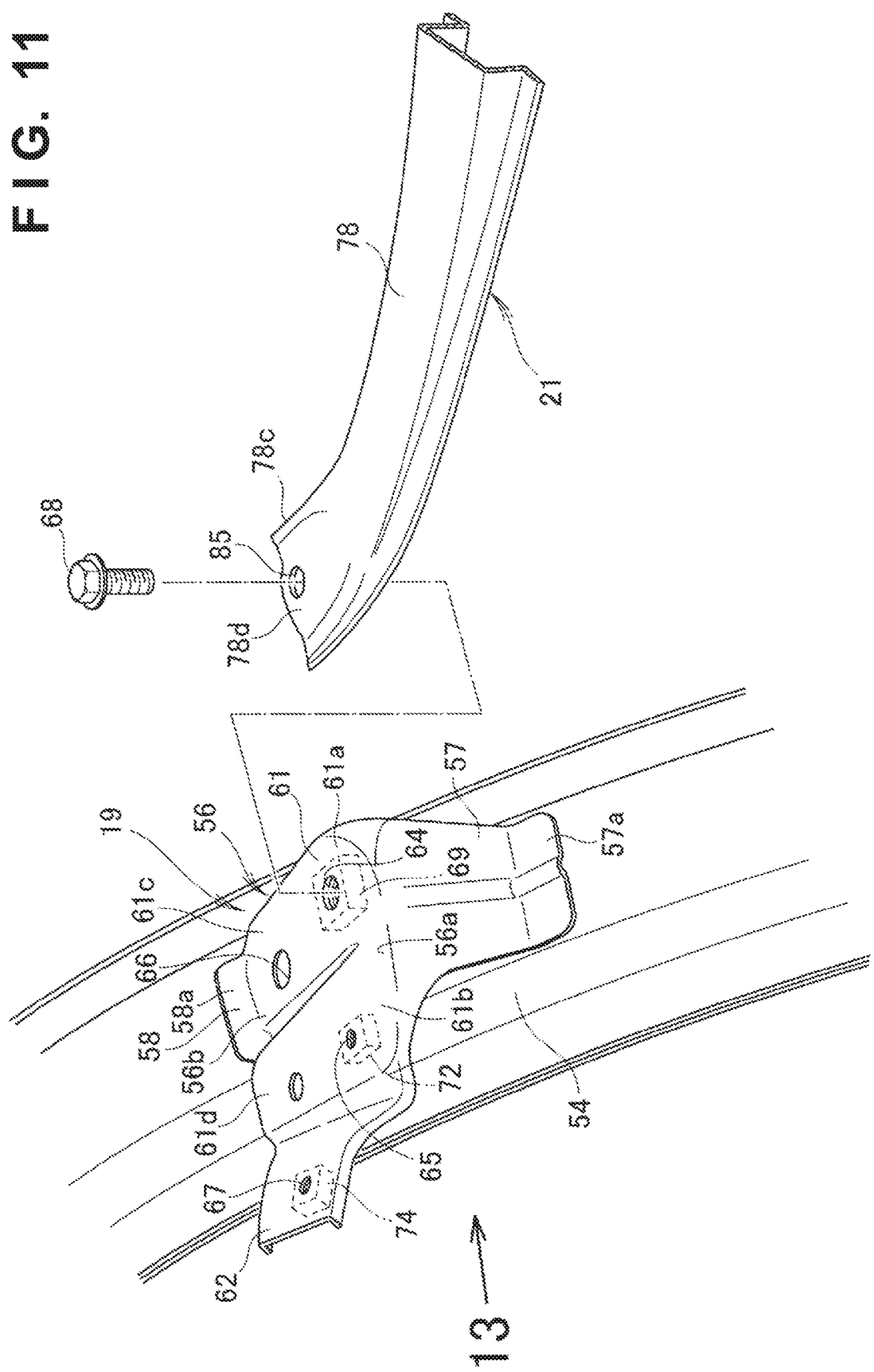
FIG. 11 is an exploded perspective view showing the relationship between a right positioning bracket and a right upper side beam in FIG. 10.

As shown in FIG. 11, the flat surface 61 includes a front inner surface 61a located on the inner side of the front portion of the right positioning bracket 19 in the vehicle width direction, a front outer surface 61b located on the outer side of the front portion in the vehicle width direction, a rear inner surface 61c located on the inner side of the rear portion in the vehicle width direction, and a rear outer surface 61d located on the outer side of the rear portion in the vehicle width direction.

In other words, the front inner surface 61a is formed on the front inner side of the right positioning bracket 19. The front outer surface 61b is formed on the front outer side of the right positioning bracket 19. The rear inner surface 61c is formed on the rear inner side of the right positioning bracket 19.

A front bulkhead attachment reference hole 64 is formed in the front inner surface 61a. A headlight attachment reference hole 65 is formed in the front outer surface 61b. A hood attachment reference hole 66 is formed in the rear inner surface 61c.

The front bulkhead attachment reference hole 64 is a hole to position the right rear end of the front bulkhead 21 (see FIG. 5, too). More specifically, the right rear end of the front bulkhead 21 is a rear end 78c of a right upper side beam 78 that forms part of the front bulkhead 21.

That is, the rear end 78c of the right upper side beam 78 (more specifically, an upper surface 78d of the rear end 78c) is placed on the front inner surface 61a of the flat surface 61 from above, and an attachment hole 85 of the upper surface 78d is overlaid on the front bulkhead attachment reference hole 64. A bolt 68 is inserted into the attachment hole 85 of the upper surface 78d and the front bulkhead attachment reference hole 64. The inserted bolt 68 is threadably coupled with a nut 69.

Accordingly, the rear end 78c of the right upper side beam 78 is positioned in the vertical direction by the front inner surface 61a, and also positioned in the horizontal direction by the front bulkhead attachment reference hole 64.

The right upper side beam 78 will be described later in detail.

Figure 12:
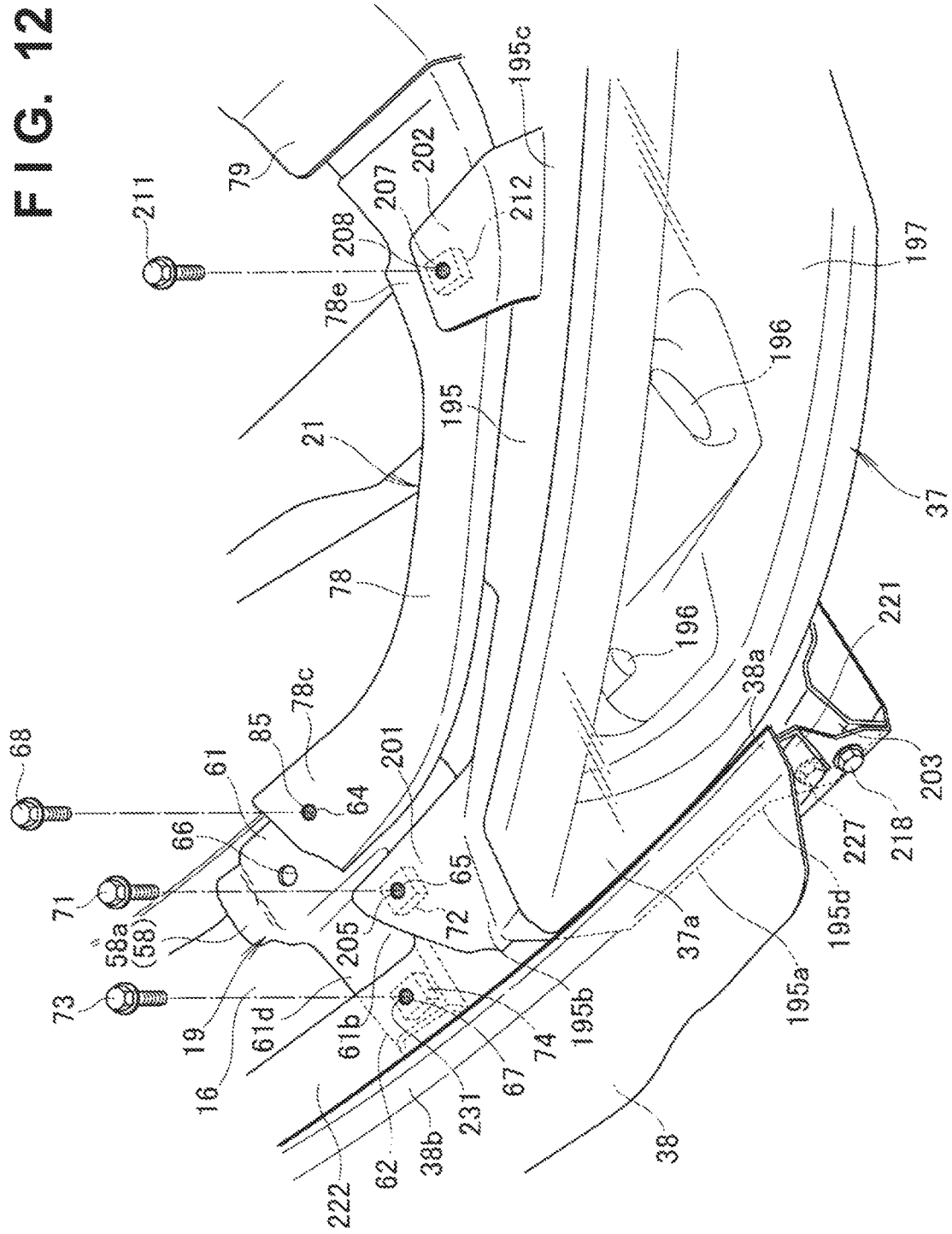
FIG. 12 is a perspective view showing the relationship between the right positioning bracket, the right upper side beam, and a right headlight according to the first embodiment.

As shown in FIG. 12, the headlight attachment reference hole 65 is a hole to position a rear end 37a of the right headlight 37. More specifically, a rear end 195a of a light base 195 that forms part of the right headlight 37 is positioned by the headlight attachment reference hole 65.

That is, the rear end 195a of the light base 195 (more specifically, an upper outer attachment piece 201) is placed on the front outer surface 61b of the flat surface 61 from above. An attachment hole 205 of the upper outer attachment piece 201 is overlaid on the headlight attachment reference hole 65. A bolt 71 is inserted into the attachment hole 205 of the upper outer attachment piece 201 and the headlight attachment reference hole 65. The inserted bolt 71 is threadably coupled with a nut 72.

Accordingly, the rear end 37a of the right headlight 37 is positioned in the vertical direction by the front outer surface 61b, and positioned in the horizontal direction by the headlight attachment reference hole 65.

The right headlight 37 will be described later in detail.

The hood attachment reference hole 66 is a hole to position a hood jig 181 (see FIG. 30) to be described later. The hood jig 181 supports the hood 28. Hence, when the hood jig 181 is positioned by the hood attachment reference hole 66, the hood 28 (see FIG. 3) is positioned in the vertical direction and in the horizontal direction together with the hood jig 181. Accordingly, in a state in which the hood 28 is positioned at a predetermined position in the vertical direction and in the horizontal direction, the hood 28 is attached to the left upper member 16 (see FIG. 3) and the right upper member 16.

The hood 28 and the hood jig 181 will be described later in detail.

Note that the hood attachment reference hole 66 is also used to position the front bulkhead 21, as will be described later.

The projecting surface 62 projects from the outer side of the flat surface 61 outward in the vehicle width direction (see FIG. 10, too). In other words, the projecting surface 62 is formed on the rear outer side of the right positioning bracket 19. A fender attachment reference hole 67 (see FIG. 10, too) is formed in the projecting surface 62. The fender attachment reference hole 67 is a hole to position an upper front portion 38b of the right fender 38.

That is, an upper front attachment piece 222 of the upper front portion 38b of the right fender 38 is placed on the projecting surface 62 from above, and an attachment hole 231 of the upper front attachment piece 222 is overlaid on the fender attachment reference hole 67. A bolt 73 is inserted into the attachment hole 231 of the upper front attachment piece 222 and the fender attachment reference hole 67. The inserted bolt 73 is threadably coupled with a nut 74.

Accordingly, the upper front portion 38b of the right fender 38 is positioned in the vertical direction by the projecting surface 62, and positioned in the horizontal direction by the fender attachment reference hole 67.

The right fender 38 will be described later in detail.

In this way, the rear end 78c of the right upper side beam 78 is positioned by the front bulkhead attachment reference hole 64 of the right positioning bracket 19. In addition, the rear end 37a of the right headlight 37 is positioned by the headlight attachment reference hole 65 of the right positioning bracket 19. Furthermore, the upper front portion 38b of the right fender 38 is positioned by the fender attachment reference hole 67 of the right positioning bracket 19.

It is therefore possible to extend the rear end 37a of the right headlight 37 backward in the vehicle body up to the rear end 78c of the right upper side beam 78 and also extend long backward in the vehicle body up to the upper front portion 38b of the right fender 38.

In this state, the rear end 37a of the right headlight 37 is arranged between the upper front portion 38b of the right fender 38 and the hood right side portion 28c (see FIG. 1) of the hood 28. By making the right headlight 37 extend longer towards the back of the vehicle body, the degree of freedom of design can be increased.

Additionally, the headlight attachment reference hole 65, the hood attachment reference hole 66, and the fender attachment reference hole 67 are formed in the right positioning bracket 19 that is a single member. Hence, the gap between the right headlight 37 and the hood right side portion 28c of the hood 28 is kept constant, and the gap between the rear end 37a of the right headlight 37 and the upper front portion 38b of the right fender 38 is kept constant.

This makes it possible to satisfactorily ensure so-called fitting between the hood 28, the right headlight 37, and the right fender 38, as shown in FIG. 1, and improve the outer appearance of the vehicle.

Figure 13:
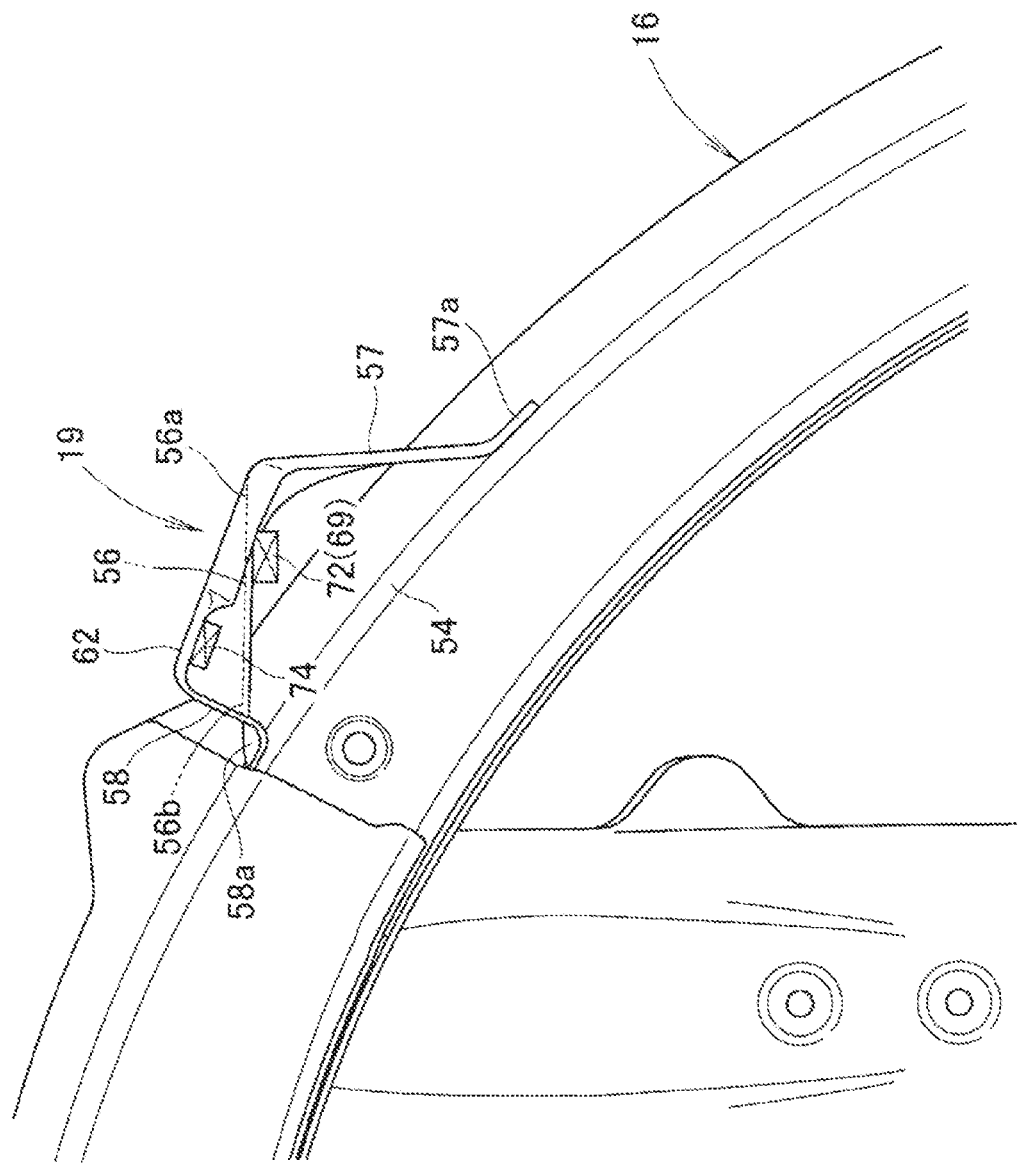
FIG. 13 is a view viewed from the direction of an arrow 13 in FIG. 11.

As shown in FIGS. 10 and 13, the front leg portion 57 and the rear leg portion 58 are formed on the reference surface 56 of the right positioning bracket 19. The front leg portion 57 extends from the front end 56a of the reference surface 56 downward to the curved portion 54. A lower end 57a projects to the front side of the vehicle body along the surface of the curved portion 54. The lower end 57a of the front leg portion 57 is joined to the surface of the curved portion 54. The rear leg portion 58 extends from the rear end 56b of the reference surface 56 downward to the curved portion 54. A lower end 58a projects to the rear side of the vehicle body along the surface of the curved portion 54. The rear leg portion 58 is formed to be shorter than the leg length of the front leg portion 57. The lower end 58a of the rear leg portion 58 is joined to the surface of the curved portion 54.

When the lower end 57a of the front leg portion 57 and the lower end 58a of the rear leg portion 58 are joined to the surface of the curved portion 54, the reference surface 56 is supported substantially in a level state above the curved portion 54 by the front leg portion 57 and the rear leg portion 58.

When the reference surface 56 is supported above the curved portion 54 by the two leg portions, that is, the front leg portion 57 and the rear leg portion 58, the reference surface 56 is firmly supported above the curved portion 54. In other words, the support rigidity of the reference surface 56 is increased. Accordingly, as shown in FIGS. 11 and 12, a plurality of members can firmly be supported by the reference surface 56. More specifically, the plurality of members supported by the reference surface 56 are the rear end 78c of the right upper side beam 78, the rear end 37a of the right headlight 37, and the upper front portion 38b of the right fender 38.

Referring back to FIGS. 10 and 13, the front leg portion 57 is formed by being extended from the front end 56a of the reference surface 56, and the rear leg portion 58 is formed by being extended from the rear end 56b of the reference surface 56. Hence, the leg length of the front leg portion 57 or the rear leg portion 58 can easily be adjusted by changing the extension amount of the front leg portion 57 or the rear leg portion 58.

This makes it possible to easily adjust the height of the reference surface 56 and satisfactorily ensure the fitting between the hood 28, the right headlight 37, and the right fender 38.

As shown in FIG. 6, the front bulkhead 21 is attached to the frame attachment portion 41 of the left front side frame 11 and the frame attachment portion 41 of the right front side frame 11.

In addition, a left upper side beam 77 of the front bulkhead 21 is connected to the left positioning bracket 18. Similarly, the right upper side beam 78 of the front bulkhead 21 is connected to the right positioning bracket 19.

The front bulkhead 21 includes bulkhead portions 76 made of a resin and connected to the frame attachment portions 41 of the left front side frame 11 and right front side frame 11, the left upper side beam 77 made of a metal and configured to connect the bulkhead portion 76 to the left positioning bracket 18, the right upper side beam 78 made of a metal and configured to connect the bulkhead portion 76 to the right positioning bracket 19, and an upper beam 79 made of a metal and configured to connect the left upper side beam 77 and the right upper side beam 78.

Note that the left upper side beam 77, the right upper side beam 78, and the upper beam 79 are more specifically made of steel.

Figure 14:
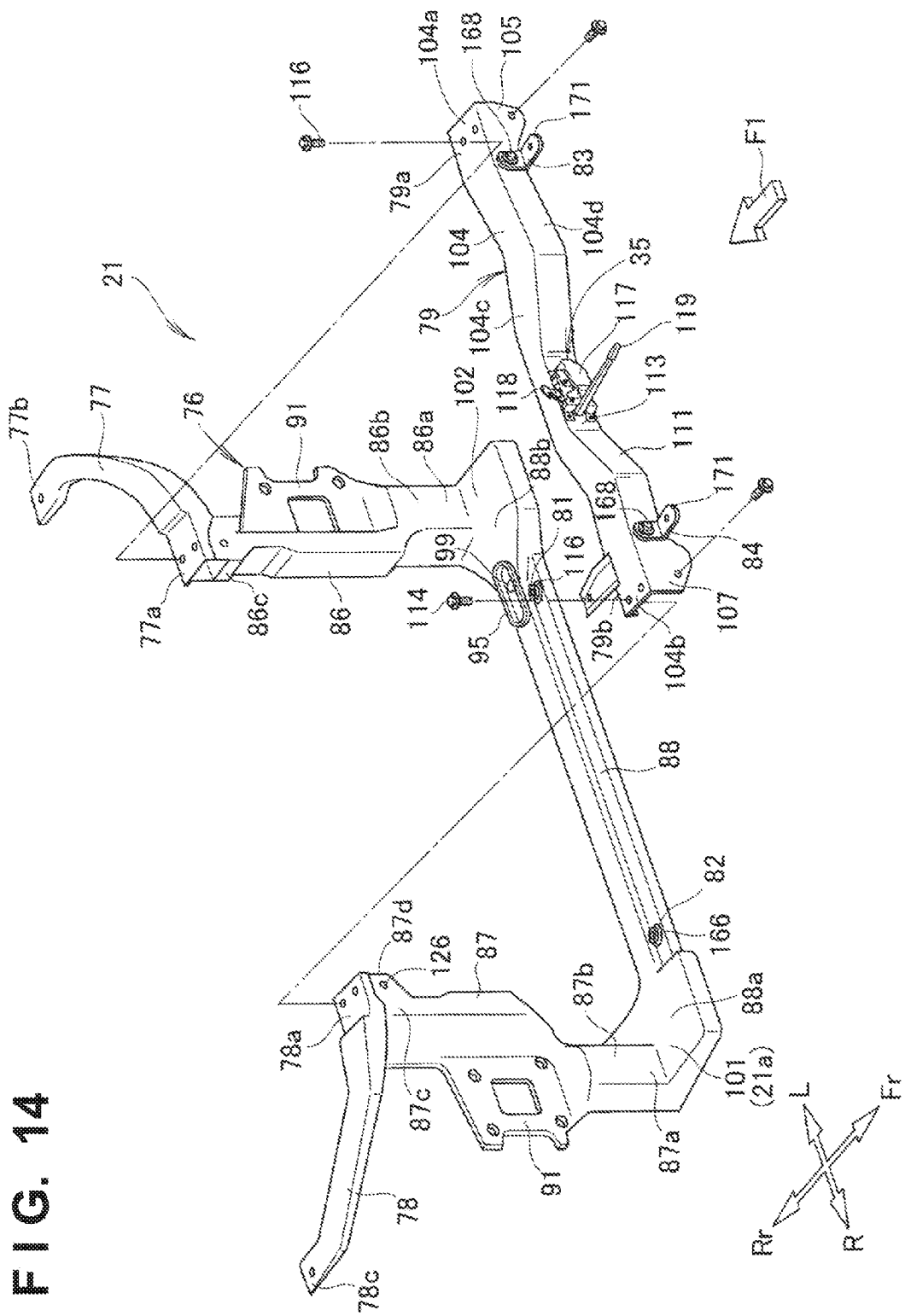
FIG. 14 is an exploded perspective view showing a front bulkhead in FIG. 6.
Figure 15:
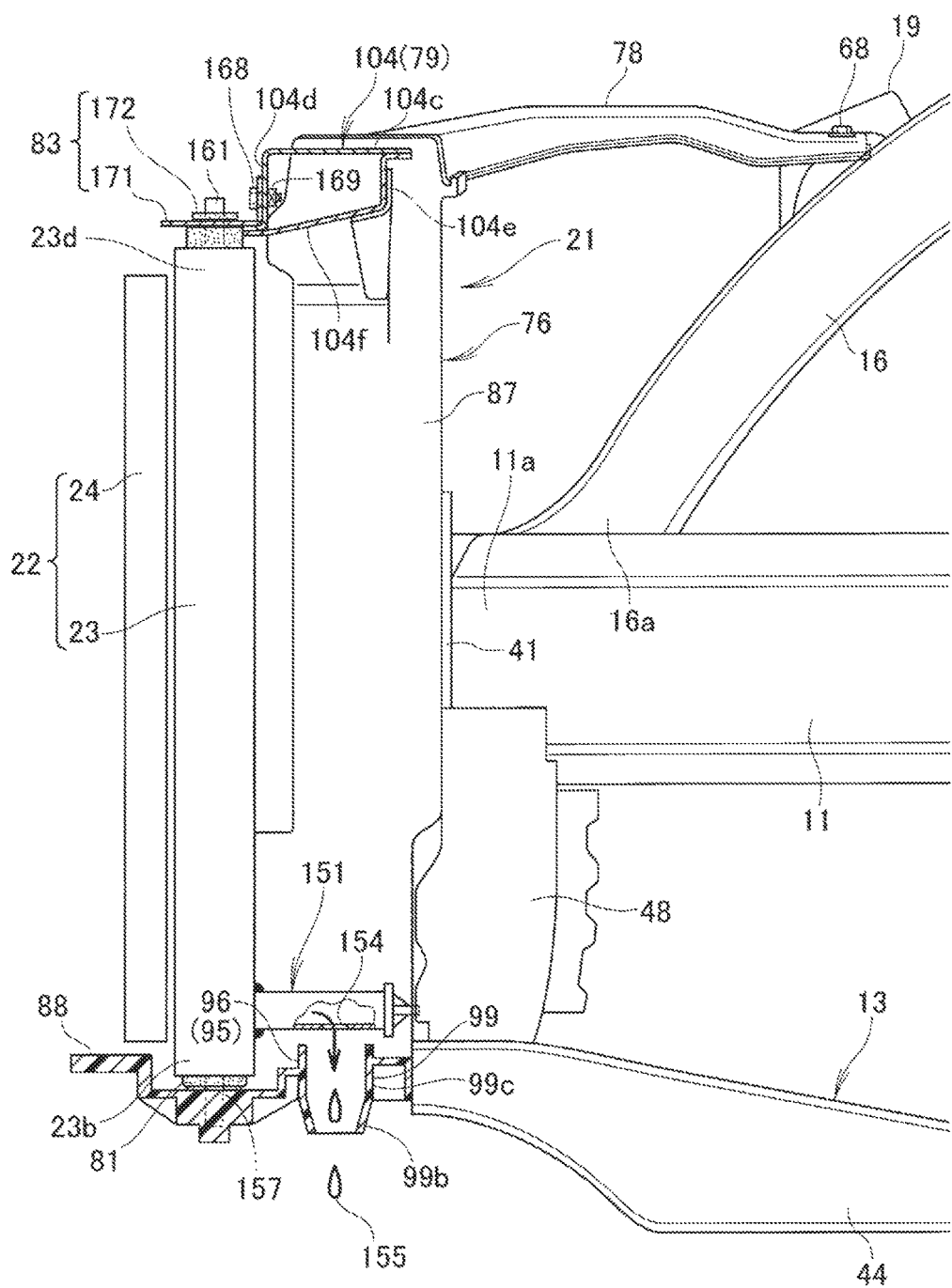
FIG. 15 is a sectional view taken along a line 15-15 in FIG. 4.

Furthermore, as shown in FIGS. 14 and 15, the front bulkhead 21 includes a left lower support portion 81 and a right lower support portion 82 formed integrally with a lower beam 88 of the bulkhead portion 76, and a left upper support portion 83 and a right upper support portion 84 provided on the upper beam 79.

The left upper support portion 83 and the right upper support portion 84 support the upper end of a radiator 23 of the cooling unit 22. The left lower support portion 81 and the right lower support portion 82 support the lower end of the radiator 23.

The constituent members of the front bulkhead 21 are integrated to form a module.

The left upper support portion 83 and the right upper support portion 84 are substantially bilaterally symmetrical members. The right upper support portion 84 will be described below, and a description of the left upper support portion 83 will be omitted.

The left lower support portion 81 and the right lower support portion 82 are substantially bilaterally symmetrical members. The right lower support portion 82 will be described below, and a description of the left lower support portion 81 will be omitted.

The bulkhead portion 76 includes a left side stay 86 made of a resin and connected to the frame attachment portion 41 (see FIG. 6) of the left front side frame 11, the right side stay 87 made of a resin and connected to the frame attachment portion 41 of the right front side frame 11, and the lower beam 88 made of a resin and connected to a lower end 86a of the left side stay 86 and a lower end 87a of the right side stay 87.

The left side stay 86, the right side stay 87, and the lower beam 88 (that is, the bulkhead portion 76) are integrally made of a resin material. By integrally making the bulkhead portion 76 of a resin material, the weight of the front bulkhead 21 can be reduced.

Referring back to FIGS. 6 and 7, the right side stay 87 extends in the vertical direction. A stay attachment portion 91 is integrally formed substantially at the center in the vertical direction. The stay attachment portion 91 is formed into a substantially rectangular frame body in correspondence with the frame attachment portion 41 of the right front side frame 11.

Figure 26:
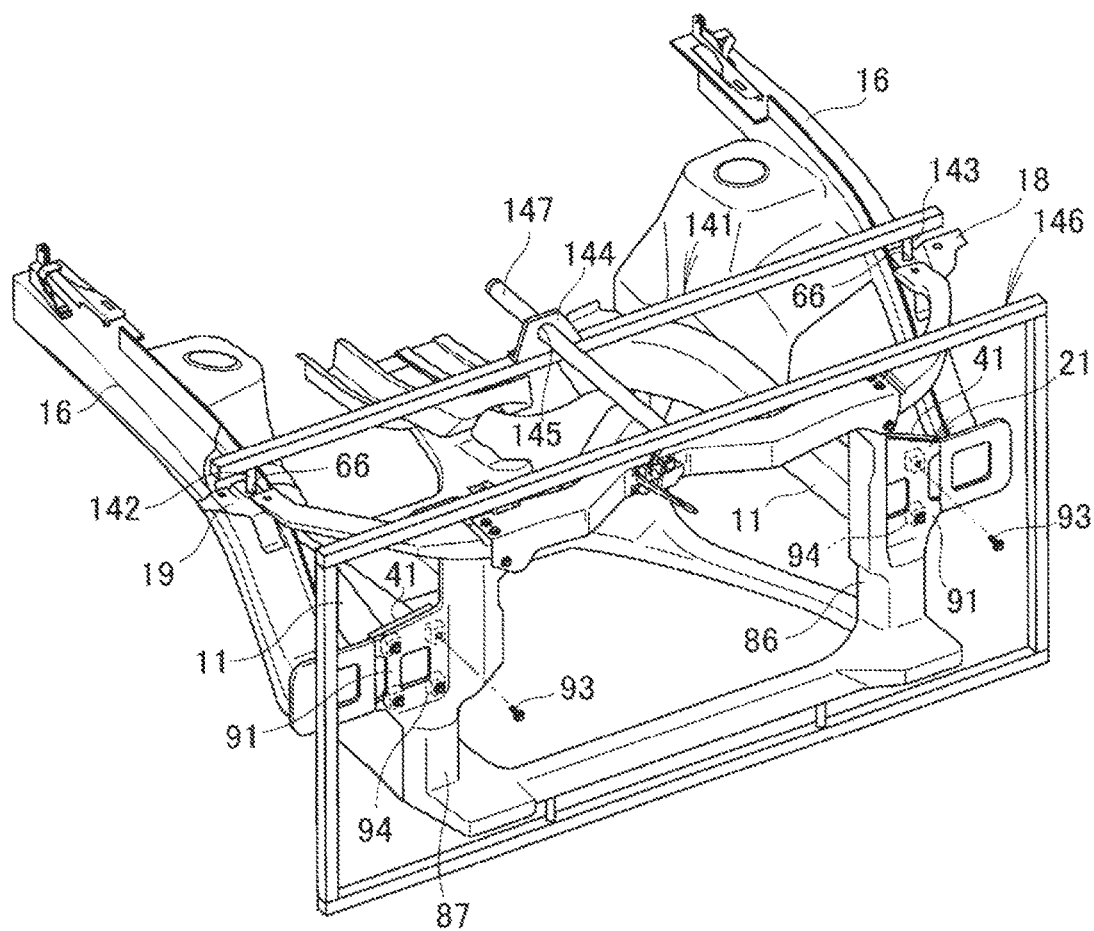
FIG. 26 is a view for explaining an example in which the front bulkhead according to the first embodiment is attached to the left and right front side frames.

The four corners of the stay attachment portion 91 are connected to the four corners of the frame attachment portion 41 by bolts 93 and nuts 94 (see FIG. 26).

Accordingly, substantially the center of the right side stay 87 is connected to the front end 11a of the right front side frame 11 from the front side of the vehicle body, and the right side stay 87 is arranged vertically.

In this state, a lower half portion 87b of the right side stay 87 is supported by the right front support portion 48 from the rear side of the vehicle body. The right side stay 87 is a member made of a resin, and the right front support portion 48 is a member made of a metal (more specifically, steel). An upper end 48a of the right front support portion 48 is connected to the front end 11a of the right front side frame 11, and a lower end 48b is connected to the front portion 44c of the right subframe 44.

That is, the right front support portion 48 is a member of high rigidity. The lower half portion 87b of the right side stay 87 is thus reinforced by the right front support portion 48.

The left side stay 86 is formed to be substantially bilaterally symmetrical to the right side stay 87. Hence, the constituent parts of the left side stay 86 are denoted by the same reference numerals as in the right side stay 87, and a detailed description thereof will be omitted.

As in the right side stay 87, substantially the center of the left side stay 86 is connected to the front end 11a of the right front side frame 11, and in this state, a lower half portion 86b of the left side stay 86 is supported by a left front support portion 49 from the rear side of the vehicle body. The lower half portion 86b of the left side stay 86 is thus reinforced by the left front support portion 49.

In this way, the lower half portion 87b of the right side stay 87 is reinforced by the right front support portion 48, and the lower half portion 86b of the left side stay 86 is reinforced by the left front support portion 49. The rigidity/strength of the bulkhead portion 76 (that is, the front bulkhead 21) can thus be improved.

As shown in FIG. 14, a right end 88a of the lower beam 88 is formed integrally with the lower end 87a of the right side stay 87, and a left end 88b of the lower beam 88 is formed integrally with the lower end 86a of the left side stay 86. In this state, the lower beam 88 is extended in the vehicle width direction and arranged under the cooling unit 22 (see FIGS. 4 and 16).

As shown in FIG. 16, the lower beam 88 includes a guide concave portion 95 formed under a left lower portion 23b of the radiator 23 of the cooling unit 22, and a funnel-shaped guide hole portion 99 opening to a bottom portion 97 of the guide concave portion 95. The guide concave portion 95 and the guide hole portion 99 will be described later in detail.

Referring back to FIG. 14, the right end 88a of the lower beam 88 and the lower end 87a of the right side stay 87 are connected in a crossing state. Accordingly, a right lower corner portion 101 is formed by the right end 88a and the lower end 87a at the right lower end of the bulkhead portion 76 (that is, the right lower end 21a of the front bulkhead 21).

That is, the right lower corner portion 101 is a portion of the front bulkhead 21, which is made of a resin material.

As shown in FIG. 7, the projecting piece 52 of the right front pillar 12 (more specifically, the right subframe 44) is arranged under the right lower corner portion 101. That is, the projecting piece 52 of the right subframe 44 projects from the extended portion 51 inward in the vehicle width direction, and is thus arranged under the right lower corner portion 101. The right lower corner portion 101 is connected to the projecting piece 52 via the right connecting mechanism 27 (see FIG. 19, too) of the connecting means 25.

Additionally, as shown in FIG. 2, a left lower corner portion 102 of the bulkhead portion 76 is connected to the projecting piece 52 of the left subframe 43 via a left connecting mechanism 26 of the connecting means 25, like the right lower corner portion 101.

The left lower corner portion 102 is a portion of the front bulkhead 21, which is made of a resin material, like the right lower corner portion 101.

Here, as described above, the lower half portion 87b of the right side stay 87 is reinforced by the right front support portion 48, and the lower half portion 86b of the left side stay 86 is reinforced by the left front support portion 49 (see FIG. 6). Hence, the right side stay 87 and the left side stay 86 (that is, the front bulkhead 21) made of a resin are supported by the right front support portion 48 and the left front support portion 49, respectively, in a stable state.

This can increase the workability when connecting the right lower corner portion 101 of the front bulkhead 21 to the projecting piece 52 by the right connecting mechanism 27 and connecting the left lower corner portion 102 to the projecting piece 52 by the left connecting mechanism 26.

Figure 17:
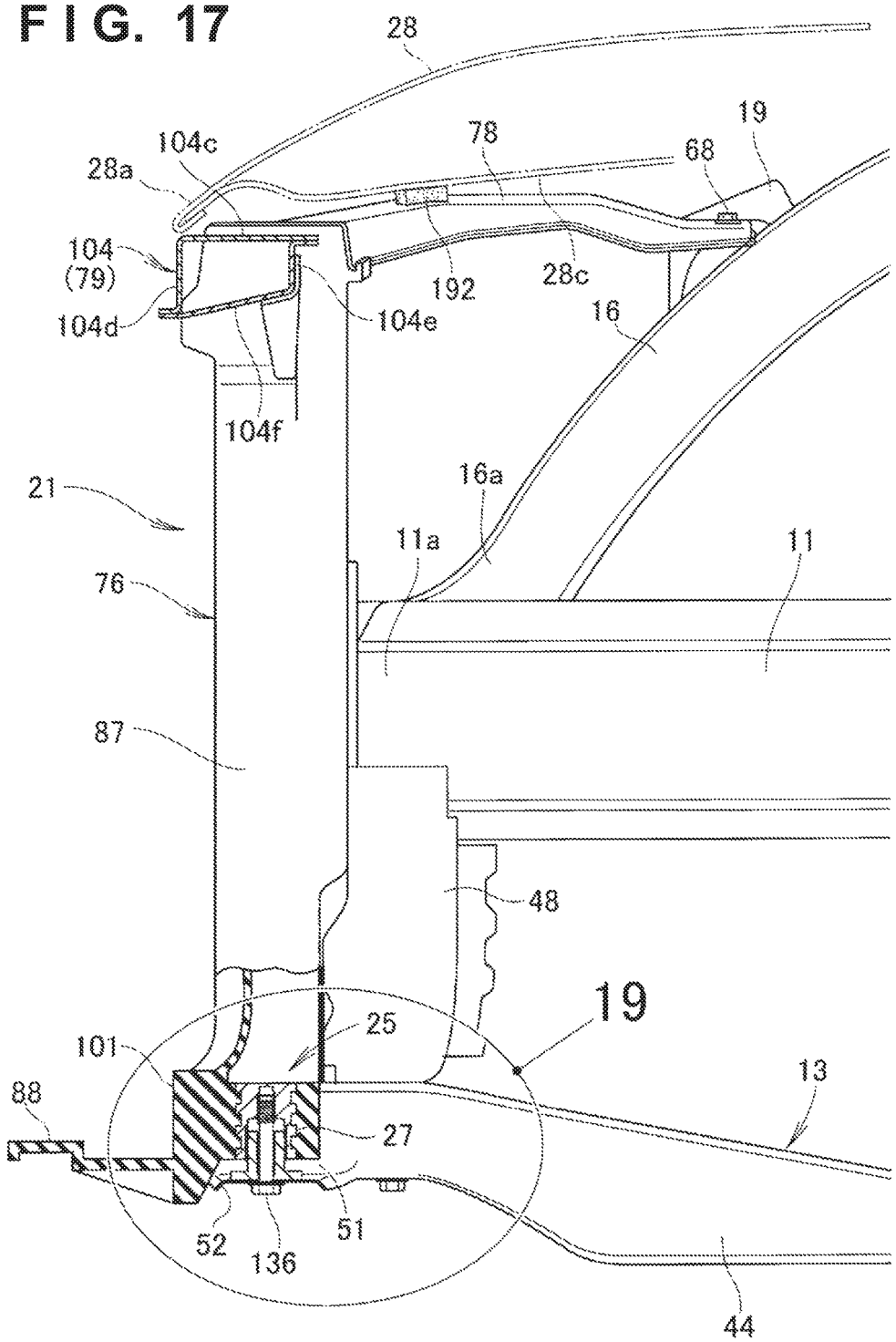
FIG. 17 is a sectional view taken along a line 17-17 in FIG. 4.

As shown in FIGS. 2 and 17, the front bulkhead 21 is connected to the subframe 13 by the connecting means 25. The connecting means 25 includes the left connecting mechanism 26 that connects the left lower corner portion 102 to the projecting piece 52 and the right connecting mechanism 27 that connects the right lower corner portion 101 to the projecting piece 52.

Here, the left connecting mechanism 26 and the right connecting mechanism 27 of the connecting means 25 are substantially bilaterally symmetrical members. The right connecting mechanism 27 will be described below, and a description of the left connecting mechanism 26 will be omitted.

Figure 18:
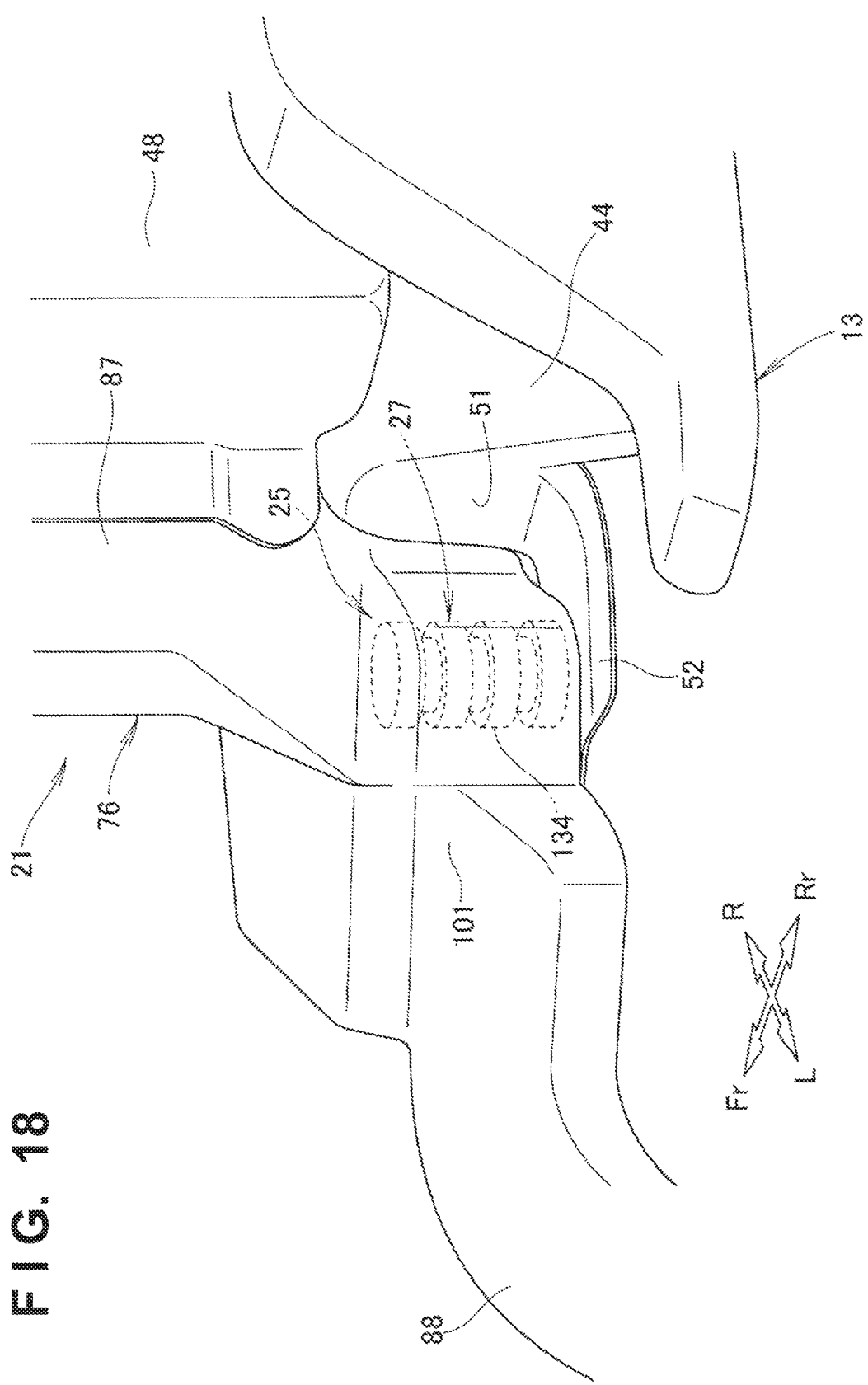
FIG. 18 is a perspective view showing a state in which the right lower corner portion of the front bulkhead according to the first embodiment is connected to a projecting piece by a right connecting mechanism.
Figure 19:
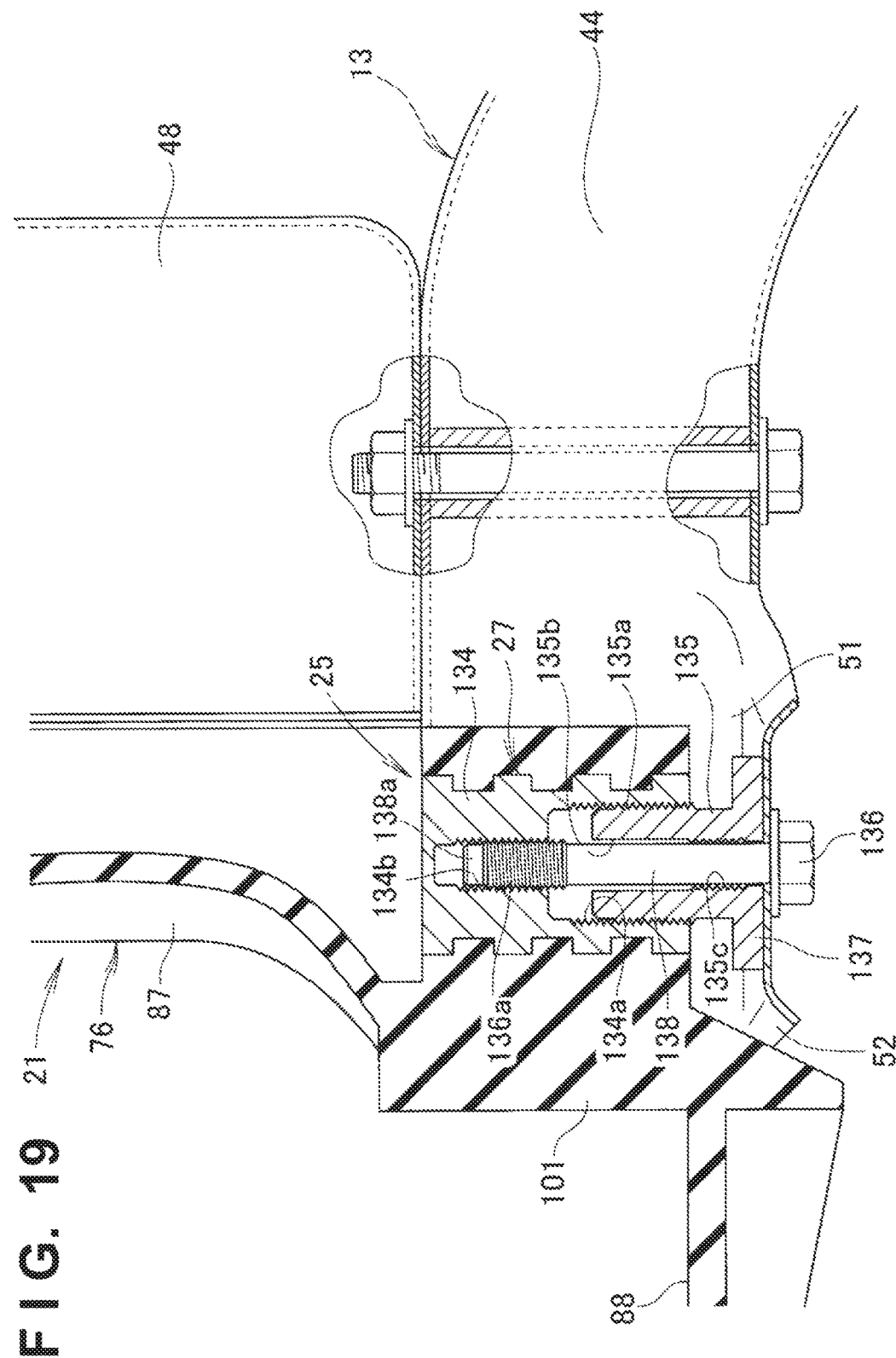
FIG. 19 is an enlarged view of a portion 19 in FIG. 17.

As shown in FIGS. 18 and 19, the right connecting mechanism 27 includes an adjust collar 134 buried in the right lower corner portion 101 by insert molding, an adjust nut 135 engaging with the adjust collar 134 so that it can project/retreat, and an adjust bolt 136 configured to make the adjust nut 135 project from the adjust collar 134.

The adjust collar 134 is insert-molded in the right lower corner portion 101, and includes a first collar female screw (the female screw of the adjust collar) 134a having a large diameter and opening to the inside, and a second collar female screw 134b having a small diameter.

The adjust nut 135 includes a nut male screw 135a formed to be capable of threadably engaging with the first collar female screw 134a, a nut female screw (the female screw of the adjust collar) 135c formed in a through hole 135b, and a flange 137 formed at the lower end.

When the nut male screw 135a threadably engages with the first collar female screw 134a, the adjust nut 135 engages with the adjust collar 134 so that it can project/retreat.

A shaft portion 138 of the adjust bolt 136 extends so that it can extend through the through hole 135b. The adjust bolt 136 includes a male screw 136a formed at a distal end 138a. The male screw 136a is formed so that it can threadably engage with the nut female screw 135c of the adjust nut 135 and the second collar female screw 134b of the adjust collar 134.

An operation procedure of connecting the right lower corner portion 101 to the projecting piece 52 by the right connecting mechanism 27 will be described next with reference to FIGS. 20A, 20B, 21A, and 21B. As shown in FIG. 20A, the male screw 136a of the adjust bolt 136 is inserted into the nut female screw 135c of the adjust nut 135 from the lower side of the projecting piece 52, as indicted by an arrow A, and the male screw 136a is threadably engaged with the nut female screw 135c, as indicated by an arrow B.

As shown in FIG. 20B, when the male screw 136a of the adjust bolt 136 is threadably engaged with the nut female screw 135c of the adjust nut 135, the adjust nut 135 projects from the adjust collar to the side of the projecting piece 52, as indicated by an arrow C.

As shown in FIG. 21A, when the adjust nut 135 projects, as indicated by the arrow C, the flange 137 of the adjust nut 135 abuts against the projecting piece 52. In this state, the adjust bolt 136 is continuously rotated, as indicated by the arrow B.

As shown in FIG. 21B, the male screw 136a of the adjust bolt 136 is threadably coupled with the second collar female screw 134b of the adjust collar 134. Hence, in a state in which the adjust nut 135 intervenes in a gap S1 between the projecting piece 52 and a lower surface 101a of the right lower corner portion 101, the adjust bolt 136 is connected to the adjust collar 134. The right lower corner portion 101 can thus reliably be connected to the projecting piece 52 by the right connecting mechanism 27.

By abutting the flange 137 of the adjust nut 135 against the projecting piece 52 in this way, the adjust nut 135 can be made to project in correspondence with the gap S1 between the projecting piece 52 and the lower surface 101a of the right lower corner portion 101.

In other words, the right connecting mechanism 27 can be extended in correspondence with the gap S1 between the projecting piece 52 and the lower surface 101a of the right lower corner portion 101. Additionally, in a state in which the right connecting mechanism 27 is extended, the male screw 136a of the adjust bolt 136 can threadably be coupled with the second collar female screw 134b of the adjust collar 134.

Accordingly, the right lower corner portion 101 can reliably be connected to the projecting piece 52 without taking much time only by a simple operation of fastening the adjust bolt 136.

Referring back to FIG. 19, when the right lower corner portion 101 of the bulkhead portion 76 is connected to the projecting piece 52 via the right connecting mechanism 27, the right lower corner portion 101 can be reinforced by the projecting piece 52. The rigidity/strength of the bulkhead portion 76 (that is, the front bulkhead 21) can thus be increased by the projecting piece 52.

Figure 22:
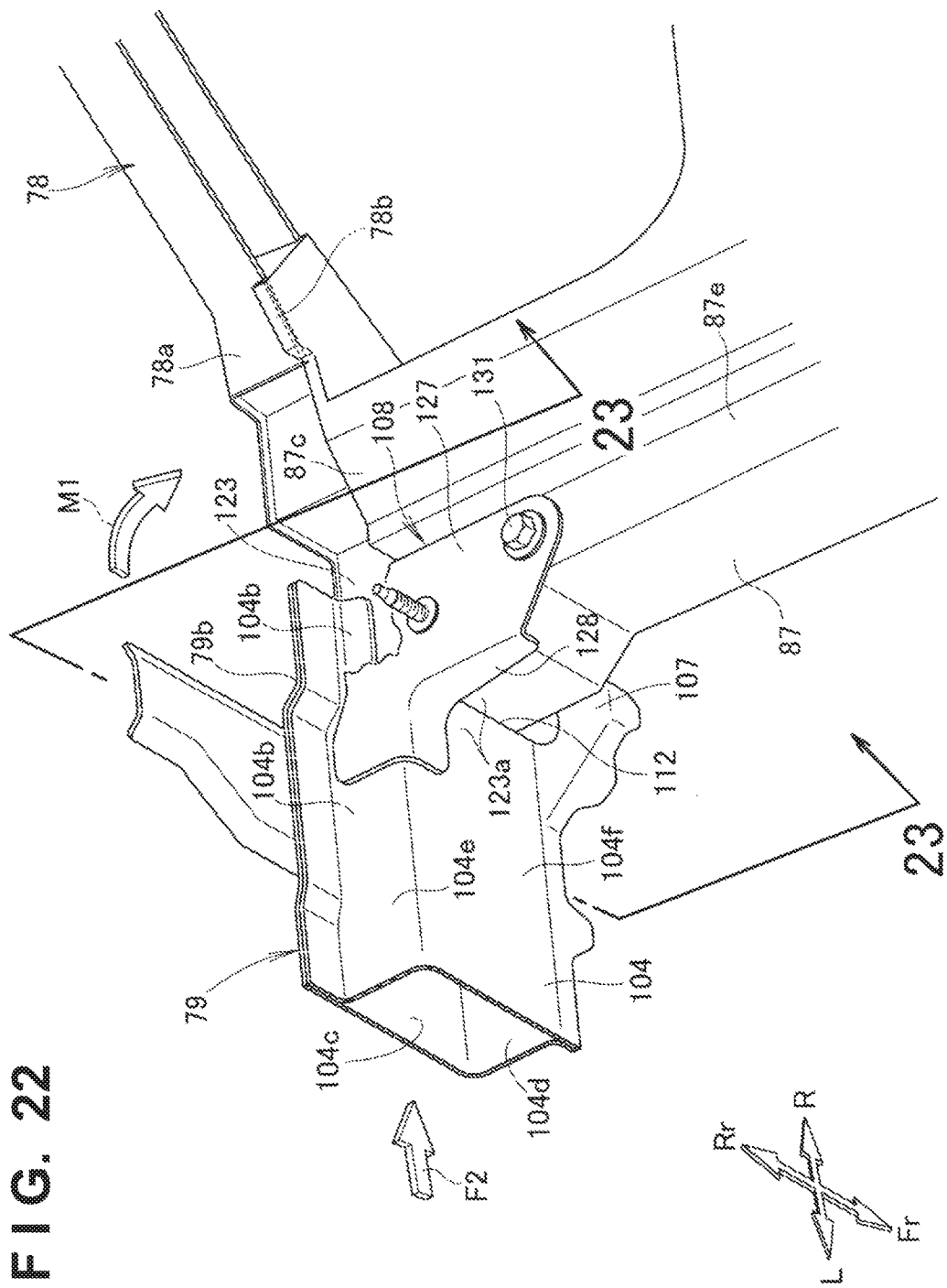
FIG. 22 is a view viewed from the direction of an arrow 22 in FIG. 4.
Figure 23:
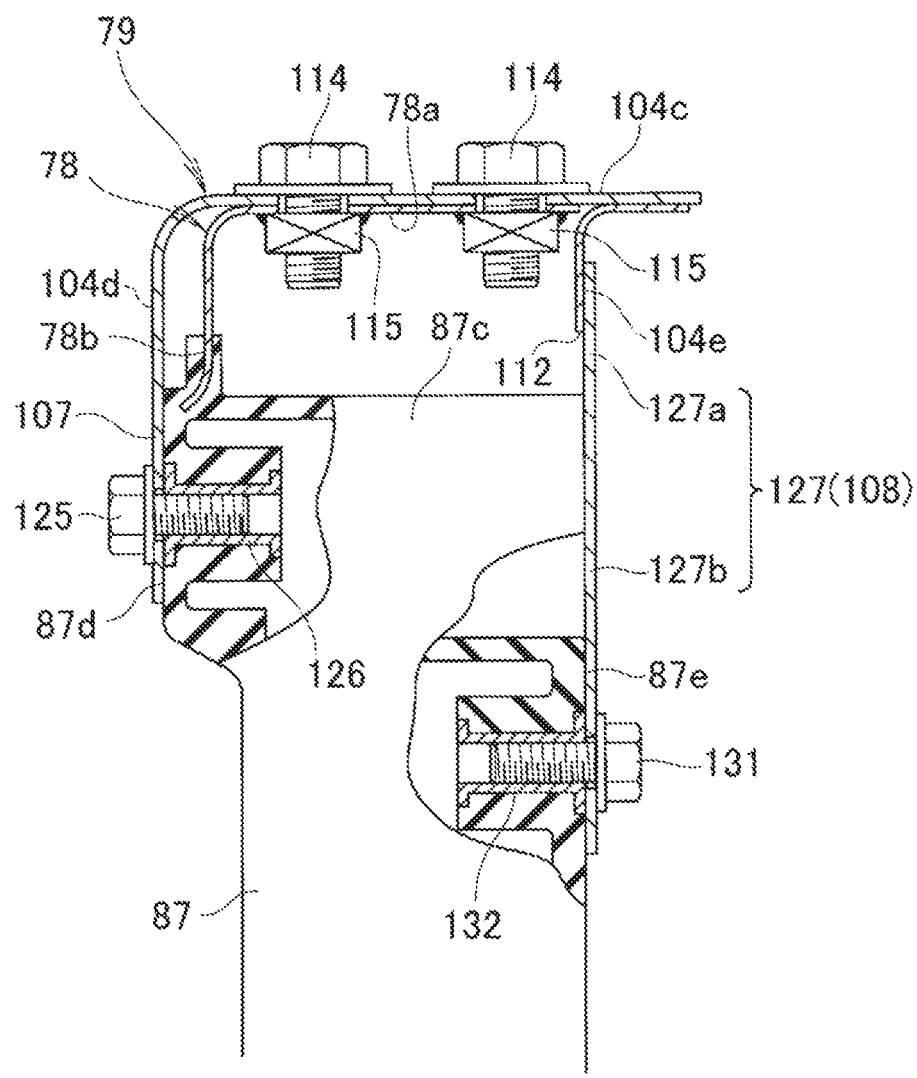
FIG. 23 is a sectional view taken along a line 23-23 in FIG. 22.

As shown in FIGS. 22 and 23, a portion 78b of a front end 78a of the right upper side beam 78 is integrally buried in an upper end 87c of the right side stay 87 by insert molding. Hence, the front end 78a of the right upper side beam 78 is integrally connected to the upper end 87c of the right side stay 87.

As shown in FIGS. 9 and 14, the front end 78a of the right upper side beam 78 is connected to the upper end 87c of the right side stay 87, and the rear end 78c is connected to the right positioning bracket 19. The right upper side beam 78 extends from the front end 78a to the rear side of the vehicle body in the vehicle width direction and is formed into a substantially arc (curved) shape in a planar view. The right upper side beam 78 is formed into a substantially U-shaped section opening downward.

The upper end of the front bulkhead 21 on the right side is formed by the right upper side beam 78. Additionally, as described above, the rear end (that is, the right rear end) of the front bulkhead 21 on the right side is formed by the rear end 78c of the right upper side beam 78.

As shown in FIGS. 10 and 11, the right upper side beam 78 has the upper surface 78d at the rear end 78c, and the attachment hole 85 is formed in the upper surface 78d. As described above, the upper surface 78d is placed on the reference surface 56 (more specifically, the front inner surface 61a of the flat surface 61) of the right positioning bracket 19. In this state, the upper surface 78d is connected to the front bulkhead attachment reference hole 64 by the bolt 68 and the nut 69.

That is, the rear end 78c of the right upper side beam 78 is connected to the front inner surface 61a of the right positioning bracket 19 in a state in which the rear end 78c is positioned in the vertical direction and in the horizontal direction.

Referring back to FIG. 6, the left upper side beam 77 is formed to be substantially bilaterally symmetrical to the right upper side beam 78. Hence, the constituent parts of the left upper side beam 77 are denoted by the same reference numerals as in the right upper side beam 78, and a detailed description thereof will be omitted.

The upper end of the front bulkhead 21 on the left side is formed by the left upper side beam 77. Additionally, the rear end (that is, the left rear end) of the front bulkhead on the left side is formed by a rear end 77b of the left upper side beam 77.

An upper surface 77c of the rear end 77b of the left upper side beam 77 is placed on the front inner surface 61a of the left positioning bracket 18, and connected to the front bulkhead attachment reference hole 64 by the bolt 68 and the nut 69 (not shown).

That is, the rear end 77b of the left upper side beam 77 is connected to the front inner surface 61a of the left positioning bracket 18 in a positioned state.

In this way, the rear end 78c of the right upper side beam 78 made of a metal is connected to the front inner surface 61a of the right positioning bracket 19 in a state in which the rear end 78c positioned in the vertical direction and in the horizontal direction. Similarly, the rear end 77b of the left upper side beam 77 made of a metal is connected to the front inner surface 61a of the left positioning bracket 18 in a state in which the left rear end 77b is positioned in the vertical direction and in the horizontal direction.

Hence, even if the bulkhead portion 76 made of a resin (more specifically, the right side stay 87, the left side stay 86, and the lower beam 88 made of a resin) is thermally deformed, the right upper side beam 78 and the left upper side beam 77 made of a metal are accurately kept at the attachment positions.

As described above, the right upper end of the front bulkhead 21, which is made of a metal, is formed by the right upper side beam 78. In addition, the left upper end of the front bulkhead 21, which is made of a metal, is formed by the left upper side beam 77. That is, the right upper end and the left upper end of the front bulkhead 21 are accurately kept at the attachment positions.

Here, as shown in FIGS. 5 and 12, an upper inner attachment piece 202 of the right headlight 37 is mounted on the right upper side beam 78 made of a metal and attached in this state. Similarly, the upper inner attachment piece 202 of the left headlight 36 is mounted on the left upper side beam 77 made of a metal and attached in this state.

Hence, the right headlight 37 is kept in a state in which it is accurately positioned in the vertical direction by the right upper side beam 78. Similarly, the left headlight 36 is kept in a state in which it is accurately positioned in the vertical direction by the left upper side beam 77.

As described above, the rear end 37a of the right headlight 37 is kept in a state in which it is accurately positioned in the vertical direction by the front outer surface 61b of the right positioning bracket 19. Similarly, a rear end 36a of the left headlight 36 is kept in a state in which it is accurately positioned in the vertical direction by the front outer surface 61b of the left positioning bracket 18.

Referring back to FIG. 1, the gap between the right headlight 37 and the hood right side portion 28c of the hood 28 can thus easily be managed. Similarly, the gap between the left headlight 36 and the hood left side portion 28b of the hood 28 can thus easily be managed.

Figure 24:
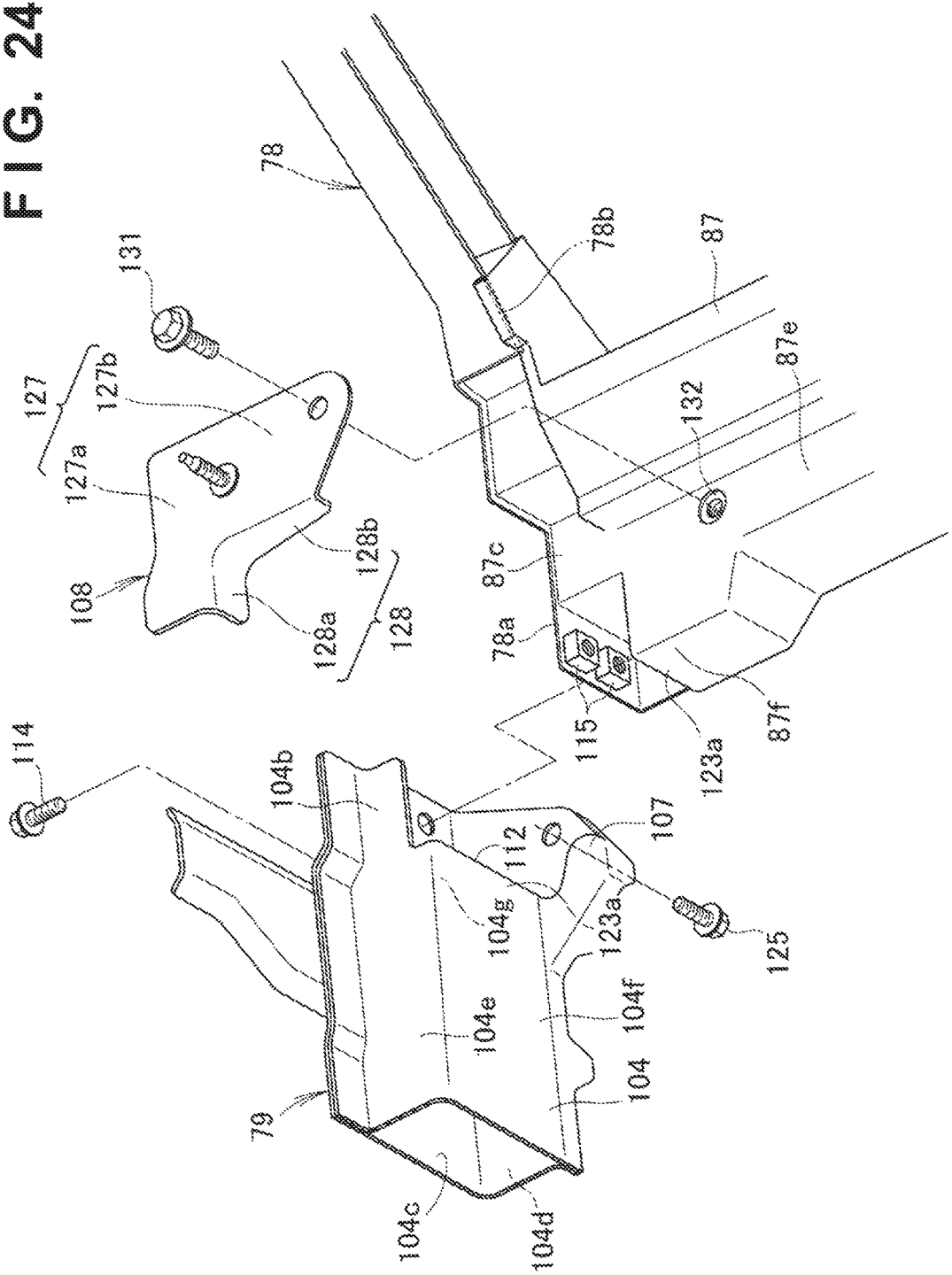
FIG. 24 is an exploded perspective view showing the relationship between a right side stay, the right upper side beam, and an upper beam in FIG. 22.

As shown in FIGS. 14 and 24, a front end 77a of the left upper side beam 77 and the front end 78a of the right upper side beam 78 are connected by the upper beam 79 made of a metal.

The upper beam 79 includes a beam main body 104 extending in the vehicle width direction, a left connecting portion 105 formed on a front surface 104d of a left end 104a of the beam main body 104, a left connecting bracket (not shown) joined to a rear surface 104e at the left end 104a of the beam main body 104, a right connecting portion 107 formed on the front surface 104d of a right end 104b of the beam main body 104, and a right connecting bracket 108 joined to the rear surface 104e at the right end 104b of the beam main body 104.

The left connecting portion 105 and the right connecting portion 107 are substantially bilaterally symmetrical members. The right connecting portion 107 will be described below, and a description of the left connecting portion 105 will be omitted.

The left connecting bracket and the right connecting bracket 108 are substantially bilaterally symmetrical members. The right connecting bracket 108 will be described below, and a description of the left connecting bracket will be omitted.

The beam main body 104 is formed into a substantially rectangular closed section by an upper surface 104c, the front surface 104d, the rear surface 104e, and a lower surface 104f. The beam main body 104 includes a beam concave portion 111 formed at the center in the vehicle width direction, a left opening (not shown) formed at the left end 104a, and a right opening 112 formed at the right end 104b.

Note that the left opening and the right opening 112 are substantially bilaterally symmetrical members. The right opening 112 will be described below, and a description of the left opening will be omitted.

As shown in FIGS. 23 and 24, the upper surface 104c of the right end 104b of the beam main body 104 is overlaid on the front end 78a of the right upper side beam 78 from above on the upper side of the right side stay 87. In this state, the upper surface 104c is detachably connected by bolts 114 and nuts 115.

Additionally, as described above, the portion 78b of the front end 78a of the right upper side beam 78 is integrally buried in the upper end 87c of the right side stay 87 by insert molding. Hence, the right end 104b of the beam main body 104 is detachably connected to the upper end 87c of the right side stay 87 via the front end 78a of the right upper side beam 78.

Referring back to FIG. 14, the upper surface 104c of the left end 104a of the beam main body 104 is overlaid on the front end 77a of the left upper side beam 77 from above on the upper side of the left side stay 86, and in this state, detachably connected by bolts 116 and nuts.

Additionally, a portion of the front end 77a of the left upper side beam 77 is integrally buried in an upper end 86c of the left side stay 86 by insert molding, like the portion 78b (see FIG. 23) of the front end 78a of the right upper side beam 78. Hence, the left end 104a of the beam main body 104 is detachably connected to the upper end 86c of the left side stay 86 via the front end 77a of the left upper side beam 77.

As described above, the right end 104b of the beam main body 104 is detachably connected to the front end 78a of the right upper side beam 78. In addition, the left end 104a of the beam main body 104 is detachably connected to the front end 77a of the left upper side beam 77.

Hence, the upper beam 79 is detachably connected to the front end 78a of the right upper side beam 78 and the front end 77a of the left upper side beam 77.

In addition, the left end 104a of the beam main body 104 is connected to the upper end 86c of the left side stay 86 via the front end 77a of the left upper side beam 77. Similarly, the right end 104b of the beam main body 104 is connected to the upper end 87c of the right side stay 87 via the front end 78a of the right upper side beam 78. In this state, the beam main body 104 is arranged in a state in which it extends in the vehicle width direction.

The beam concave portion 111 is formed at the center of the beam main body 104 in the vehicle width direction.

In the beam concave portion 111, the front surface 104d of the beam main body 104 is formed to be concave backward in the vehicle body, thereby arranging a bottom portion 113 on the rear side of the front surface 104d in the vehicle body. The hood lock device 35 is attached to the bottom portion 113 of the beam concave portion 111.

Hence, the hood lock device 35 is stored in the beam concave portion 111. The hood lock device 35 (more specifically, a device main body 117) is arranged on the rear side of the front surface 104d of the beam main body 104 in the vehicle body.

The hood lock device 35 includes the device main body 117 attached to the bottom portion 113 of the beam concave portion 111, a latch 118 provided on the device main body 117, and an operating lever 119 configured to cancel the lock stated between the latch 118 and a striker 121 (see FIG. 1).

When the striker 121 of the hood 28 is locked in the latch 118, the hood 28 is held at a closing position.

By storing the hood lock device 35 in the beam concave portion 111, the device main body 117 of the hood lock device 35 is attached to the rear side of the front surface 104d of the beam main body 104 in the vehicle body. Hence, when an impact load F1 is input to the upper beam 79 from the front side of the vehicle body, the input impact load F1 can be received by the front surface 104d of the beam main body 104.

When the impact load F1 is received by the front surface 104d of the beam main body 104, it is possible to prevent the input impact load F1 from being concentrated to the hood lock device 35. Accordingly, the striker 121 (see FIG. 1) of the hood 28 is kept in a state in which it is locked in the latch 118 of the hood lock device 35, and it is possible to satisfactorily suppress opening of the hood 28.

As shown in FIGS. 22 and 24, the right opening 112 is formed at the right end 104b of the beam main body 104. In addition, the left opening is formed at the left end 104a (see FIG. 14) of the beam main body 104.

At the right end 104b of the beam main body 104, the right opening 112 is formed in the lower surface 104f of the beam main body 104 and in the lower end of the rear surface 104e. The upper end 87c of the right side stay 87 is stored in the right opening 112.

In a state in which the upper end 87c of the right side stay 87 is stored in the right opening 112, the right end 104b of the beam main body 104 and the upper end 87c of the right side stay 87 are arranged so as to cross each other.

Accordingly, a right upper corner portion 123 is formed by the right end 104b of the beam main body 104 and the upper end 87c of the right side stay 87.

As shown in FIGS. 23 and 24, at the right end 104b of the beam main body 104, the right connecting portion 107 projects downward from the lower side of the front surface 104d. At the upper end 87c of the right side stay 87, the right connecting portion 107 is in contact with a front surface (to be referred to as an upper front surface hereinafter) 87d.

In a state in which the right connecting portion 107 is in contact with the upper front surface 87d, the right connecting portion 107 is connected to the upper front surface 87d by a bolt 125 and a nut 126.

In addition, the right connecting bracket 108 is joined to the rear surface 104e at the right end 104b of the beam main body 104. The right connecting bracket 108 includes a bracket main body 127 configured to connect the right end 104b of the beam main body 104 and the upper end 87c of the right side stay 87, and a corner reinforcing portion 128 formed on the inner side of the bracket main body 127 in the vehicle width direction. The corner reinforcing portion 128 covers an inner surface 123a (see FIG. 22) of the right upper corner portion 123.

The bracket main body 127 includes a bracket upper portion 127a and a bracket lower portion 127b. The bracket upper portion 127a is a portion that can contact the rear surface 104e at the right end 104b of the beam main body 104. The bracket lower portion 127b is a portion that can contact a rear surface 87e at the upper end 87c of the right side stay 87.

The bracket main body 127 is formed into a substantially L shape by the bracket upper portion 127a and the bracket lower portion 127b.

The bracket upper portion 127a is joined to the rear surface 104e at the right end 104b of the beam main body 104 in a state in which they are in contact with each other. In addition, the bracket lower portion 127b is connected, by a bolt 131 and a nut 132, to the rear surface 87e at the upper end 87c of the right side stay 87 in a state in which they are in contact with each other. Hence, the bracket main body 127 is attached to the rear surface of the right upper corner portion 123.

The corner reinforcing portion 128 is formed along the inner side of the bracket main body 127. The corner reinforcing portion 128 includes an upper reinforcing portion 128a and a lower reinforcing portion 128b. The upper reinforcing portion 128a is a portion that contacts a rear lower surface 104g at the right end 104b of the beam main body 104. The lower reinforcing portion 128b is a portion that contacts an inner upper surface 87f at the upper end 87c of the right side stay 87.

The corner reinforcing portion 128 is formed into a substantially L shape by the upper reinforcing portion 128a and the lower reinforcing portion 128b. In addition, the inner surface 123a of the right upper corner portion 123 (see FIG. 22) is formed by the rear lower surface 104g of the beam main body 104 and the inner upper surface 87f of the right side stay 87.

In a state in which the bracket main body 127 is attached to the rear surface of the right upper corner portion 123, the corner reinforcing portion 128 contacts the inner surface 123a of the right upper corner portion 123. That is, the inner surface of the right upper corner portion 123 is covered with the corner reinforcing portion 128 from the inner side in the vehicle width direction.

Hence, as shown in FIG. 22, the right upper corner portion 123 is reinforced by the corner reinforcing portion 128 of the right connecting bracket 108, and the rigidity of the right upper corner portion 123 is increased. Accordingly, if a transverse load F2 is input to the beam main body 104, a bending moment Ml generated in the right upper corner portion 123 is supported by the right upper corner portion 123 and the rigidity of the upper beam 79 is increased.

Here, the transverse load F2 is a load in the vehicle width direction along the beam main body 104.

When the rigidity of the upper beam 79 is increased, the striker 121 of the hood 28 (see FIG. 1) can be kept in a state in which it is locked in the hood lock device 35, and opening of the hood 28 can be suppressed.

As shown in FIGS. 14 and 22, the right connecting portion 107 is connected to the upper front surface 87d of the right side stay 87. In addition, the bracket upper portion 127a of the right connecting bracket 108 is joined to the rear surface 104e at the right end 104b of the beam main body 104. The right connecting bracket 108 is connected to the rear surface 87e at the upper end 87c of the right side stay 87.

A right end 79b of the upper beam 79 is formed by the right connecting portion 107, the right connecting bracket 108, and the right end 104b of the beam main body 104.

Hence, the right end 79b (more specifically, the right connecting portion 107 and the right connecting bracket 108) of the upper beam 79 clamps the upper end 87c of the right side stay 87 in the vehicle body longitudinal direction. In this state, the right end 79b of the upper beam 79 is connected to the upper end 87c of the right side stay 87. The right end 79b of the upper beam 79 is thus firmly supported by the right side stay 87.

Similarly, a left end 79a of the upper beam 79 is firmly supported by the left side stay 86.

Here, the upper beam 79, the left upper side beam 77, and the right upper side beam 78 are made of a metal, thereby ensuring the rigidity of the beams 79, 77, and 78. Hence, as shown in FIG. 4, if the impact load F1 is input from the front side of the vehicle to the front bulkhead 21 (in particular, the upper beam 79), the upper beam 79, the left upper side beam 77, and the right upper side beam 78 can be prevented from being ruptured by the input impact load F1.

This makes it possible to transmit the impact load F1 input to the upper beam 79 to the right upper member 16 via the right upper side beam 78 and also transmit the impact load F1 to the left upper member 16 via the left upper side beam 77.

That is, the impact load F1 input to the upper beam 79 can be supported by the right upper member 16 and the left upper member 16.

By preventing the upper beam 79 from being ruptured by the impact load F1, the striker 121 (see FIG. 1) of the hood 28 can be kept in a state in which it is locked in the hood lock device 35. It is therefore possible to suppress opening of the hood 28 (see FIG. 1) by the impact load F1 input to the front bulkhead 21.

Referring back to FIG. 24, the beam main body 104 and the right connecting bracket 108 are formed by separate members. When the right connecting bracket 108 is divided from the right end 104b of the beam main body 104, the shape of the right connecting bracket 108 can be formed relatively freely. It is therefore possible to extend the right connecting bracket 108 long downward along the right side stay 87 from the right end 104b of the beam main body 104.

By connecting the right connecting bracket 108 to the right side stay 87, the right connecting bracket 108 (that is, the right end 104b of the beam main body 104) can firmly be held by the right side stay 87. It is therefore possible to keep the striker 121 (see FIG. 1) of the hood 28 in a state in which it is locked in the hood lock device 35 and more satisfactorily suppress opening of the hood 28 (see FIG. 1).

As shown in FIGS. 6 and 14, the left end 79a of the upper beam 79 is connected to the left side stay 86, and the right end 79b of the upper beam 79 is connected to the right side stay 87, thereby closing the upper opening of the bulkhead portion 76 by the upper beam 79.

Hence, the front bulkhead 21 is formed into a frame portion having a substantially rectangular shape in a front view by the bulkhead portion 76 and the upper beam 79.

Here, the upper beam 79 is detachably connected to the front end 78a of the right upper side beam 78 and the front end 77a of the left upper side beam 77.

Accordingly, when the upper beam 79 is detached from the front end 78a of the right upper side beam 78 and the front end 77a of the left upper side beam 77, the maintenance checkup of the cooling unit 22 (see FIG. 4) can easily be done.

In addition, the upper beam 79, the right upper side beam 78, and the left upper side beam 77 are made of a metal. Hence, a high heat component such as an exhaust system catalyst can be arranged near the upper beam 79, the right upper side beam 78, and the left upper side beam 77.

It is therefore possible to increase the degree of freedom of design in determining the arrangement of a high heat component such as an exhaust system catalyst.

An operation procedure of attaching the front bulkhead 21 to the left front side frame 11 and the right front side frame 11 using the left positioning bracket 18 and the right positioning bracket 19 will be described next with reference to FIGS. 25 and 26.

Figure 25:
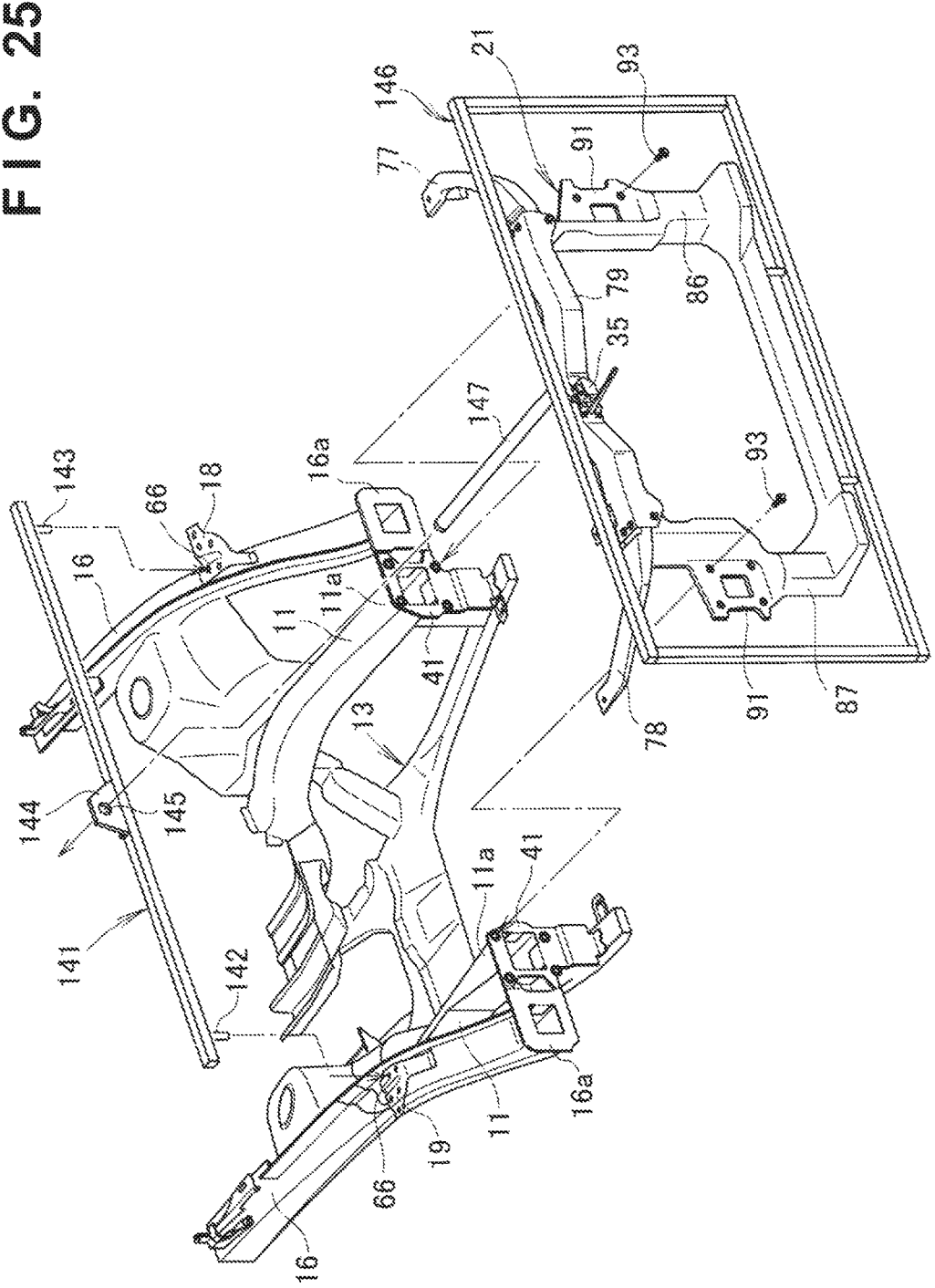
FIG. 25 is a view for explaining an example in which the front bulkhead according to the first embodiment is positioned to left and right front side frames.

As shown in FIG. 25, a right positioning pin 142 of a positioning jig 141 is inserted into the hood attachment reference hole 66 of the right positioning bracket 19. In addition, a left positioning pin 143 of the positioning jig 141 is inserted into the hood attachment reference hole 66 of the left positioning bracket 18.

The positioning jig 141 is thus positioned in the horizontal direction and in the vertical direction. That is, a jig support portion 144 (more specifically, a jig support hole 145 of the jig support portion 144) of the positioning jig 141 is positioned in the horizontal direction and in the vertical direction.

In this state, a connecting rod 147 of a bulkhead jig 146 is inserted into the jig support hole 145 of the jig support portion 144. Accordingly, the bulkhead jig 146 is connected to the jig support portion 144 and positioned in the horizontal direction and in the vertical direction.

Here, the constituent members of the front bulkhead 21 are integrated to form a module. The front bulkhead 21 is supported in advance in a state in which it is positioned by the bulkhead jig 146.

As shown in FIG. 26, the connecting rod 147 of the bulkhead jig 146 is inserted into the jig support hole 145 of the jig support portion 144, thereby positioning the front bulkhead 21 to the attachment position in the horizontal direction and in the vertical direction together with the bulkhead jig 146.

That is, the stay attachment portion 91 of the right side stay 87 is positioned to an attachment position corresponding to the frame attachment portion 41 of the right front side frame 11. In addition, the stay attachment portion 91 of the left side stay 86 is positioned to an attachment position corresponding to the frame attachment portion 41 of the left front side frame 11.

In this state, the four corners of the stay attachment portion 91 on the right side are connected to the four corners of the frame attachment portion 41 (see FIG. 25, too) on the right side by the bolts 93 and the nuts 94. Similarly, the four corners of the stay attachment portion 91 on the left side are connected to the four corners of the frame attachment portion 41 (see FIG. 25, too) on the left side by the bolts 93 and the nuts 94.

The operation procedure of attaching the front bulkhead 21 to the left front side frame 11 and the right front side frame 11 is thus completed.

As described above, the front bulkhead 21 is positioned using the hood attachment reference holes 66 of the right positioning bracket 19 and the left positioning bracket 18. Accordingly, the front bulkhead 21 can be attached to the frame attachment portions 41 of the right front side frame 11 and the left front side frame 11 in an accurately positioned state.

In addition, since the front bulkhead 21 is formed as a module, it can easily be positioned by the bulkhead jig 146.

It is therefore possible to easily assemble the front bulkhead 21 to the frame attachment portions 41 of the right front side frame 11 and the left front side frame 11 (that is, the vehicle body) without taking much time.

Referring back to FIG. 4, the cooling unit 22 is provided on the front side of the front bulkhead 21 in the vehicle body. The cooling unit 22 includes, for example, the radiator 23 and a condenser 24.

The radiator 23 is a heat exchanger configured to cool the coolant of the engine by outside air (air). The condenser 24 cools and liquefies, for example, the coolant gas for an air conditioner.

Figure 27:
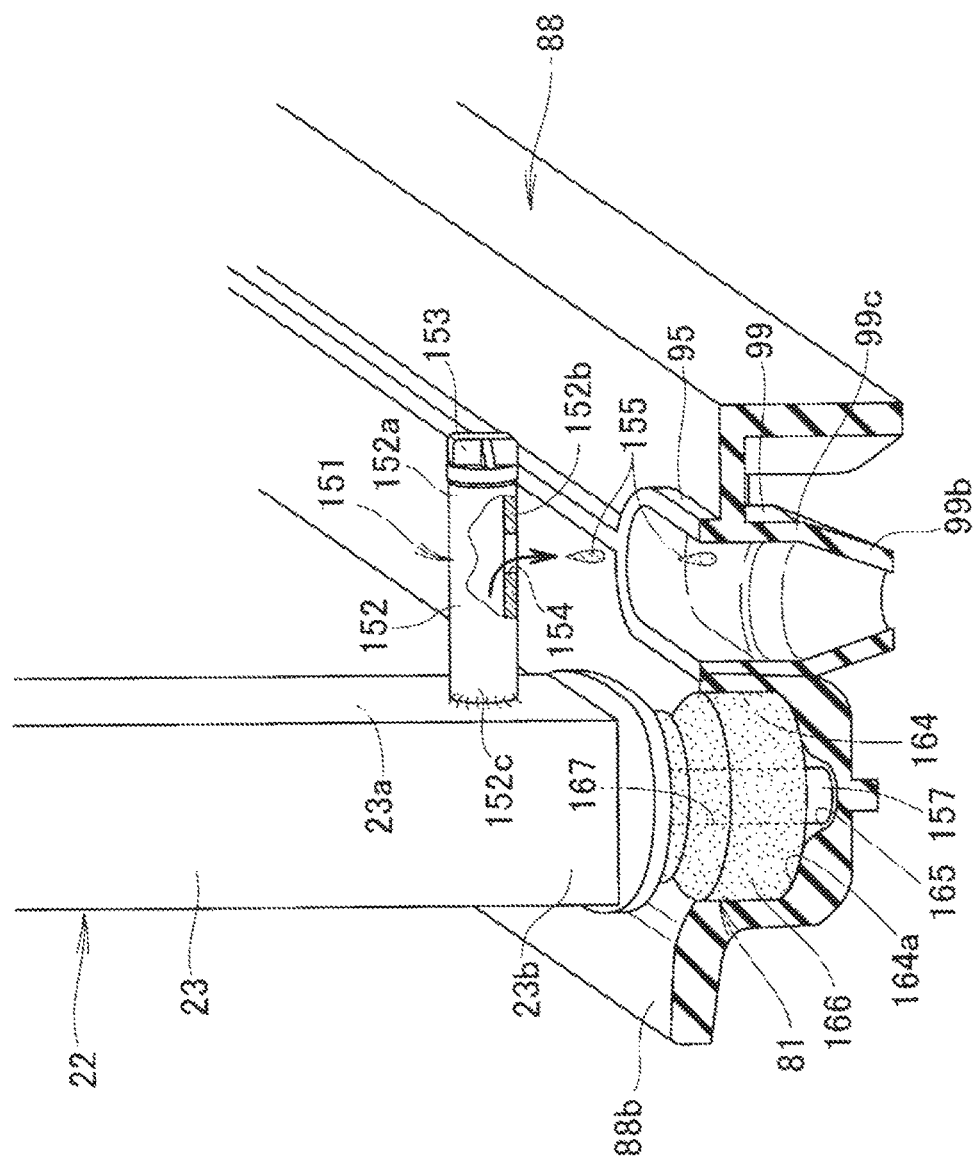
FIG. 27 is a perspective view showing part of a guide concave portion, a guide hole portion, and an exhaust portion according to the first embodiment in a cutaway state.

As shown in FIGS. 16 and 27, the radiator 23 includes an exhaust portion 151 on a left lower back surface 23a. The exhaust portion 151 includes an exhaust pipe portion 152 projecting from the left lower back surface 23a to the rear side of the vehicle body, a cap 153 that closes a rear end 152*a* of the exhaust pipe portion 152, and an exhaust hole 154 formed in a rear lower portion 152*b* of the exhaust pipe portion 152.

A distal end 152*c* of the exhaust pipe portion 152 communicates with the interior of the radiator 23. Accordingly, water (a coolant or a radiator liquid) 155 generated in the radiator 23 at the time of heat exchange by the radiator 23 is discharged to the lower side of the radiator 23 via the exhaust pipe portion 152 and the exhaust hole 154, as indicated by an arrow.

As shown in FIGS. 4 and 15, the radiator 23 includes a left lower rod 157 projecting downward from the left lower portion (the lower end of the cooling unit) 23*b*, a right lower rod projecting downward from a right lower portion (the lower end of the cooling unit) 23*c*, a left upper rod 161 projecting upward from a left upper portion (the upper end of the cooling unit) 23*d*, and a right upper rod 162 projecting upward from a right upper portion (the upper end of the cooling unit) 23*e*.

As shown in FIGS. 14 and 27, the left lower support portion 81 and the right lower support portion 82 are formed integrally with the lower beam 88 of the bulkhead portion 76.

The left lower support portion 81 includes a support concave portion 164 formed in the front portion of the left end 88*b* of the lower beam 88 in the vehicle body, a rod concave portion 165 formed in a bottom portion 164*a* of the support concave portion 164, and a lower mount portion 166 fitted in the rod concave portion 165.

The lower mount portion 166 is a rubber member with a through hole 167 formed at the center. The left lower rod 157 of the radiator 23 is inserted from above into the through hole 167 of the lower mount portion 166, thereby supporting the left lower portion 23*b* of the radiator 23 by the lower mount portion 166.

The right lower support portion 82 is formed to be substantially bilaterally symmetrical to the left lower support portion 81. Hence, the components of the right lower support portion 82 are denoted by the same reference numerals as in the left lower support portion 81, and a detailed description thereof will be omitted.

The right lower portion of the radiator 23 is supported by the lower mount portion 166 of the right lower support portion 82.

That is, the lower end of the radiator 23 is supported by the left lower support portion 81 and the right lower support portion 82.

In addition, the left upper support portion 83 is provided at the left end 104*a* of the upper beam 79 (more specifically, the beam main body 104) of the front bulkhead 21. Similarly, the right upper support portion 84 is provided at the right end 104*b* of the beam main body 104.

Referring back to FIG. 15, the left upper support portion 83 includes a support bracket 171 and an upper mount portion 172. The support bracket 171 is formed into a substantially L shape in a side view by a vertical portion and a horizontal portion. The vertical portion of the support bracket 171 is attached to the front surface 104*d* at the left end 104*a* of the beam main body 104 by a bolt 168 and a nut 169.

An attachment hole is formed in the horizontal portion of the support bracket 171. The upper mount portion 172 is attached to the attachment hole and thus attached to the horizontal portion of the support bracket 171.

The upper mount portion 172 is a rubber member with a through hole formed at the center. The left upper rod 161 of the radiator 23 is inserted from below into the through hole of the upper mount portion 172, thereby supporting the left upper portion 23*d* of the radiator 23 by the upper mount portion 172.

As shown in FIGS. 4 and 14, the right upper support portion 84 is formed to be substantially bilaterally symmetrical to the left upper support portion 83. Hence, the components of the right upper support portion 84 are denoted by the same reference numerals as in the left upper support portion 83, and a detailed description thereof will be omitted.

The right upper portion 23*e* of the radiator 23 is supported by the upper mount portion 172 (not shown) of the right upper support portion 84. That is, the upper end of the radiator 23 is supported by the left upper support portion 83 and the right upper support portion 84.

As shown in FIGS. 14 and 15, the lower end of the radiator 23 is supported by the left lower support portion 81 and the right lower support portion 82. Additionally, the upper end of the radiator 23 is supported by the left upper support portion 83 and the right upper support portion 84. Accordingly, the radiator 23 (that is, the cooling unit 22) is arranged on the front side of the upper beam 79 in the vehicle body (see FIG. 4, too).

Here, as described above, the beam concave portion 111 is formed in the beam main body 104 of the upper beam 79, and the hood lock device 35 is provided in the beam concave portion 111.

Hence, the hood lock device 35 is stored in the beam concave portion 111, and the hood lock device 35 (more specifically, the device main body 117) is attached to the rear side of the front surface 104*d* of the beam main body 104 in the vehicle body. It is therefore possible to arrange the cooling unit 22 close to the side of the upper beam 79 and implement downsizing of the vehicle body front structure 10 (that is, the vehicle body).

In a state in which the radiator 23 (that is, the cooling unit 22) is arranged on the front side of the upper beam 79 in the vehicle body, the exhaust portion 151 (in particular, the exhaust hole 154) of the radiator 23 is arranged on the rear side of the left lower support portion 81 in the vehicle body. The guide concave portion 95 of the lower beam 88 is formed under the exhaust hole 154 (see FIG. 27, too).

Figure 28:
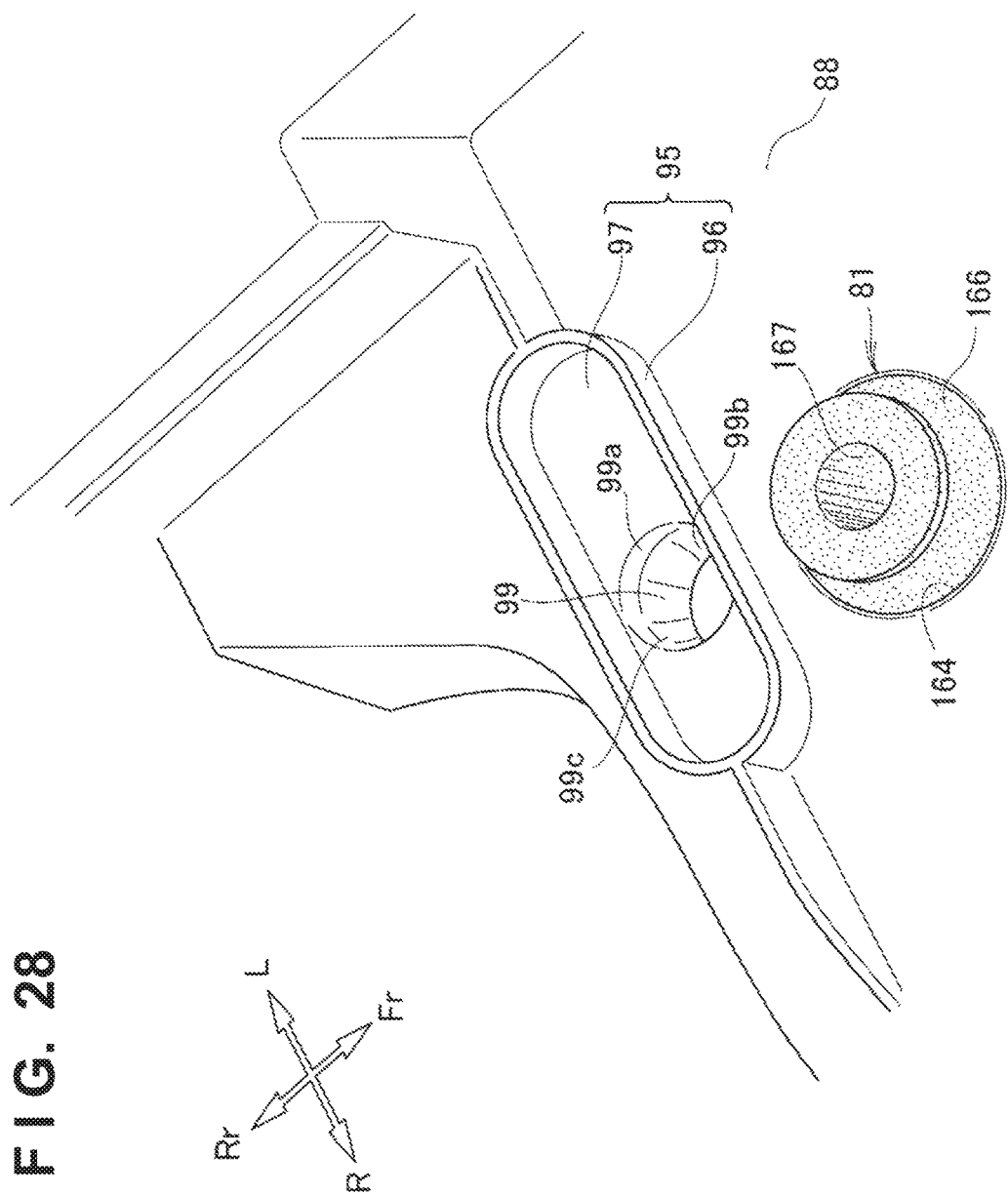
FIG. 28 is a perspective view showing the guide concave portion and the guide hole portion in FIG. 27.

As shown in FIG. 28, the guide concave portion 95 extends in the vehicle width direction, and includes an annular wall 96 formed such that the inside becomes concave to the lower side, and the bottom portion 97 provided at the lower end of the annular wall 96. The guide concave portion 95 is formed into a substantially concave section by the annular wall 96 and the bottom portion 97.

When the guide concave portion 95 is formed by the annular wall 96, the periphery of the guide hole portion 99 is reinforced by the annular wall 96. Even if the guide hole portion 99 is formed in the bottom portion 97 of the guide concave portion 95, the annular wall 96 can suppress a decrease in the strength of the lower beam 88.

The guide hole portion 99 is formed in the bottom portion 97 of the guide concave portion 95.

The guide hole portion 99 is a tubular member extending downward from the bottom portion 97. An upper end 99*a* opens to the bottom portion 97, and a lower end 99*b* opens downward. The guide hole portion 99 is formed into a funnel shape such that the hole diameter gradually decreases substantially from a center 99*c* toward the lower end 99*b* (see FIG. 27, too).

Referring back to FIG. 27, the water (coolant) 155 discharged downward from the exhaust hole 154 of the radiator 23 is received by the guide concave portion 95. The water 155 received by the guide concave portion 95 can be discharged from the guide hole portion 99 to the lower side of the lower beam 88, as indicated by an arrow.

The guide hole portion 99 is formed into a funnel shape such that the hole diameter gradually decreases downward. This can suppress scattering of the water 155 discharged downward from the lower end 99b of the guide hole portion 99 to the periphery of the guide hole portion 99.

As shown in FIG. 16, the guide concave portion 95 is formed to extend in the vehicle width direction (see FIG. 28, too). Hence, the guide concave portion 95 can cope with the cooling unit 22 (more specifically, the radiator 23) having a different shape in the vehicle width direction.

That is, if the radiator 23 having a different shape in the vehicle width direction is supported by the front bulkhead 21, the exhaust hole 154 (see FIGS. 15 and 27) of the radiator 23 moves in the vehicle width direction. On the other hand, the guide concave portion 95 is formed to extend in the vehicle width direction. Accordingly, the exhaust hole 154 moved in the vehicle width direction is arranged above the guide concave portion 95.

Hence, even if the radiator 23 having a different shape in the vehicle width direction is supported by the front bulkhead 21, the water 155 discharged from the exhaust hole 154 of the radiator 23 can be received by the guide concave portion 95 and discharged from the guide hole portion 99 to the lower side of the lower beam 88.

Referring back to FIG. 3, the hood front end 28a of the hood 28 is arranged above the front bulkhead (more specifically, the upper beam 79). The hood 28 is connected to the left upper member 16 and the right upper member 16 by the hinge means 31 such that the hood 28 can be opened/closed.

The hinge means 31 include a left hood hinge (see FIG. 4) provided at the rear end of the left upper member 16, and a right hood hinge 33 provided at the rear end of the right upper member 16.

The hood 28 includes the hood front end 28a arranged above the upper beam 79, the hood left side portion 28b arranged above the left upper side beam 77 and the rear half portion of the left upper member 16, the hood right side portion 28c arranged above the right upper side beam 78 and the rear half portion of the right upper member 16, and a hood rear end 28d arranged above a cowl.

Figure 29:
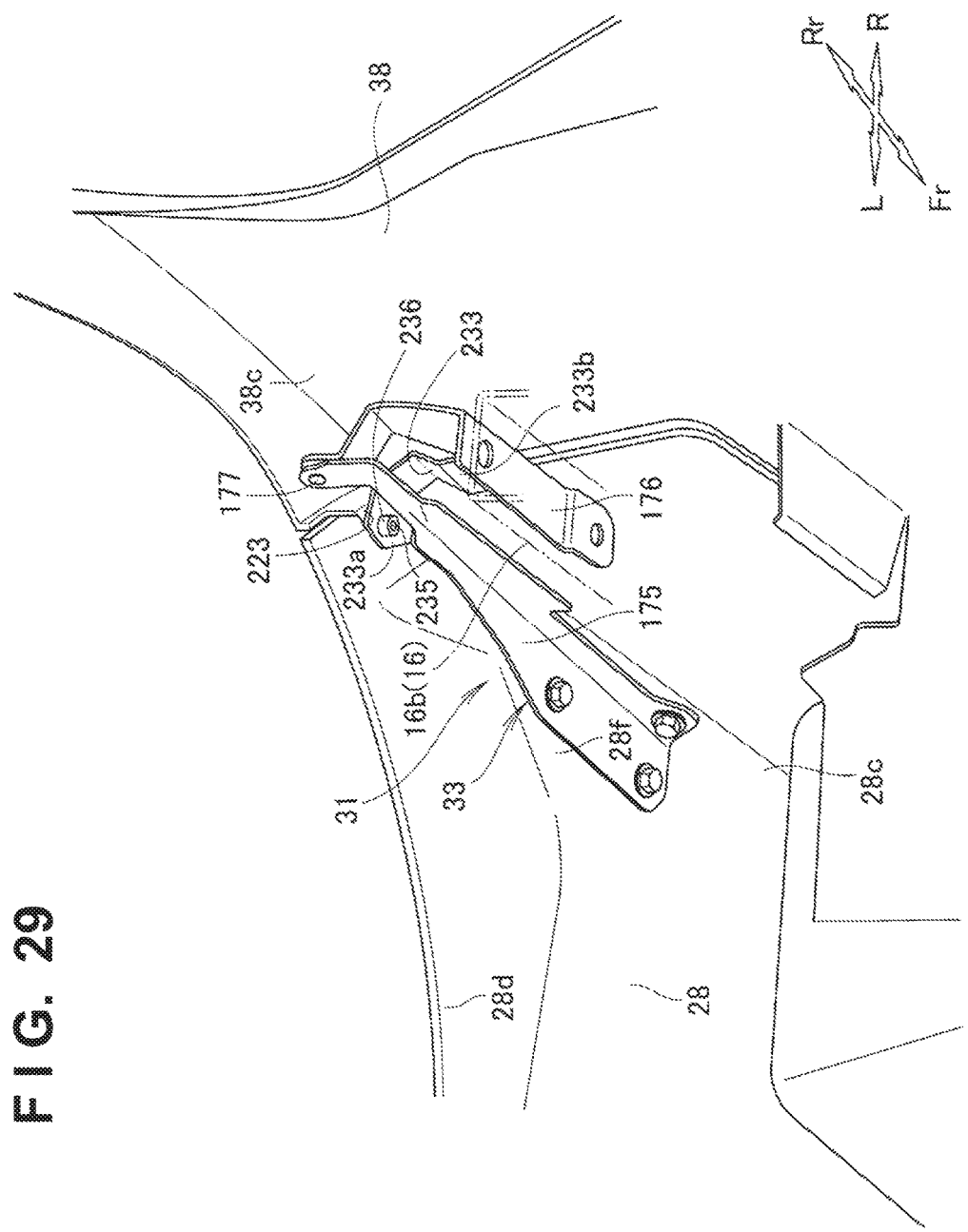
FIG. 29 is a perspective view showing a state in which the right rear end of the hood according to the first embodiment is connected to the rear end of a right upper member by a right hood hinge.

As shown in FIG. 29, a hinge arm 175 of the right hood hinge 33 is attached to a rear end 28f of the hood right side portion 28c. A hinge bracket 176 of the right hood hinge 33 is attached to a rear end 16b of the right upper member 16. The hinge arm 175 is pivotally connected to the hinge bracket 176 via a connecting shaft 177.

As shown in FIGS. 3 and 4, the hinge arm 175 of the left hood hinge 32 is attached to a rear end 28e of the hood left side portion 28b. The hinge bracket 176 of the left hood hinge 32 is attached to the rear end 16b of the left upper member 16. The hinge arm 175 is pivotally connected to the hinge bracket 176 via the connecting shaft 177.

Hence, the hood rear end 28d (more specifically, the rear end 28e of the hood left side portion 28b and the rear end 28f of the hood right side portion 28c) of the hood 28 is pivotally connected to the rear ends 16b of the left upper member 16 and the right upper member 16 via the hinge means 31. The hood 28 is thus supported by the hinge means 31 such that the hood 28 can be opened/closed in the vertical direction.

At the hood front end 28a of the hood 28, the striker 121 is attached at the center of the lower surface in the vehicle width direction. In a state in which the hood 28 is arranged at the closing position, the striker 121 is locked in the latch 118 of the hood lock device 35.

The hood 28 is thus held at the closing position by the hood lock device 35.

An operation procedure of connecting the hood rear end 28d of the hood 28 to the rear ends 16b of the left upper member 16 and the right upper member 16 via the hinge means 31 will be described next with reference to FIGS. 30 and 31.

Figure 30:
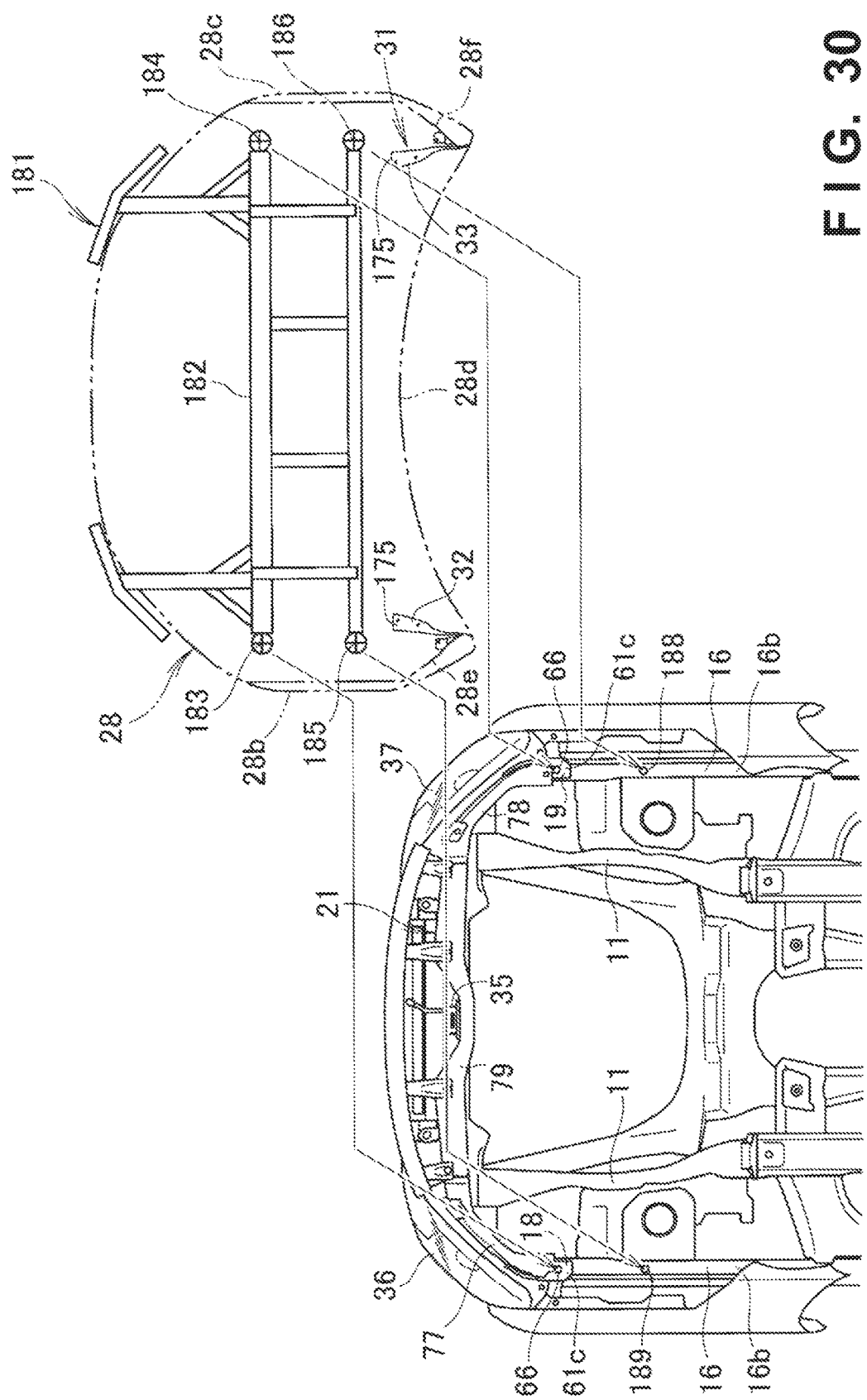
FIG. 30 is a view for explaining an example in which the hood according to the first embodiment is positioned by a hood jig.

As shown in FIG. 30, the hinge arm 175 of the right hood hinge 33 is attached to the rear end 28f of the hood right side portion 28c of the hood 28. In addition, the hinge arm 175 of the left hood hinge 32 is attached to the rear end 28e of the hood left side portion 28b of the hood 28.

In this state, the hood 28 is placed on the hood jig 181. The hood jig 181 includes a jig main body 182 on which the hood 28 can be placed, and a plurality of positioning pins 183 to 186 projecting downward from the jig main body 182.

The plurality of positioning pins 183 to 186 include four positioning pins, that is, the left front positioning pin (first positioning pin) 183, the right front positioning pin (first positioning pin) 184, the left rear positioning pin (second positioning pin) 185, and the right rear positioning pin (second positioning pin) 186.

The right front positioning pin 184 is inserted into the hood attachment reference hole 66 of the right positioning bracket 19. The left front positioning pin 183 is inserted into the hood attachment reference hole 66 of the left positioning bracket 18.

In addition, the right rear positioning pin 186 is inserted into a hood rear positioning hole (another hood attachment reference hole) 188 of the right upper member 16. The left rear position positioning pin 185 is inserted into a hood rear positioning hole (another hood attachment reference hole) 189 of the left upper member 16.

The hood rear positioning hole 188 of the right upper member 16 is formed in the upper surface of the right upper member 16 between the right hood hinge 33 and the hood attachment reference hole 66 of the right positioning bracket 19.

The hood rear positioning hole 189 of the left upper member 16 is formed in the upper surface of the left upper member 16 between the left hood hinge 32 and the hood attachment reference hole 66 of the left positioning bracket 18.

Accordingly, the hood 28 is accurately positioned to the attachment position in the horizontal direction by the four positioning pins 183 to 186 and the reference holes 66, and 188, and 189 at the four points together with the hood jig 181.

In addition, the lower surface of the hood right side portion 28c of the hood 28 is placed on the rear inner surface 61c of the right positioning bracket 19. The lower surface of the hood left side portion 28b of the hood 28 is placed on the rear inner surface 61c of the left positioning bracket 18.

Accordingly, the hood 28 is accurately positioned to the attachment position in the vertical direction by the rear inner surface 61c of the right positioning bracket 19 and the rear inner surface 61c of the left positioning bracket 18.

Figure 31:
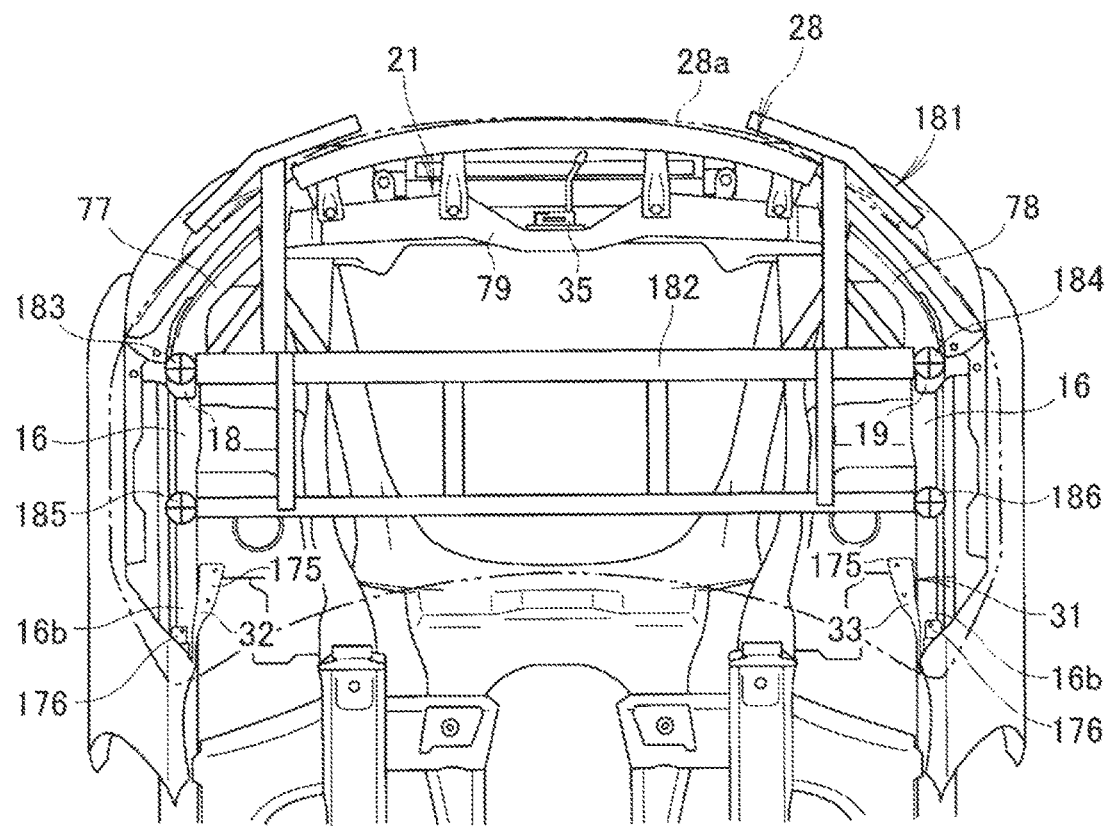
FIG. 31 is a view for explaining an example in which the hood according to the first embodiment is connected to left and right upper members via a hinge means.

As shown in FIG. 31, in a state in which the hood 28 is positioned in the horizontal direction and in the vertical direction, the hinge bracket 176 of the right hood hinge 33 is attached to the rear end 16b of the right upper member 16. Hence, the hinge bracket 176 can accurately be attached to the attachment position of the rear end 16b.

In addition, the hinge bracket 176 of the left hood hinge 32 is attached to the rear end 16b of the left upper member 16. Hence, the hinge bracket 176 can accurately be attached to the attachment position of the rear end 16b.

Accordingly, the hood 28 can be connected to the right upper member 16 and the left upper member 16 in an accurately positioned state.

Referring back to FIG. 3, the upper end (that is, the right upper side beam 78 and the left upper side beam 77) of the front bulkhead 21 is positioned in the vertical direction by the right positioning bracket 19 and the left positioning bracket 18.

It is therefore possible to accurately ensure the interval between the front bulkhead 21 and the hood front end 28a of the hood 28.

The right headlight 37 is attached to the right upper side beam 78. Similarly, the left headlight 36 is attached to the left upper side beam 77. That is, the left headlight 36 and the right headlight 37 are supported by the upper end of the front bulkhead 21.

As described above, the upper end of the front bulkhead 21 is positioned in the vertical direction. Hence, the left headlight 36 and the right headlight 37 are positioned in the vertical direction by the upper end of the front bulkhead 21.

This can facilitate gap management between the left headlight 36 and the hood left side portion 28b and gap management between the right headlight 37 and the hood right side portion 28c.

The upper surface of the right upper side beam 78 is provided with a right hood cushion 192. In a state in which the hood 28 is closed, the right hood cushion 192 intervenes between the upper surface of the right upper side beam 78 and the front end of the hood right side portion 28c (see FIG. 17). Hence, the height position of the hood right side portion 28c is positioned by the right hood cushion 192 with respect to the upper surface of the right upper side beam 78 and defined at a reference position.

The upper surface of the left upper side beam 77 is also provided with a left hood cushion 191, like the upper surface of the right upper side beam 78. Hence, the height position of the front end of the hood left side portion 28b is positioned by the left hood cushion 191 with respect to the upper surface of the left upper side beam 77 and defined at a reference position.

Figure 32:
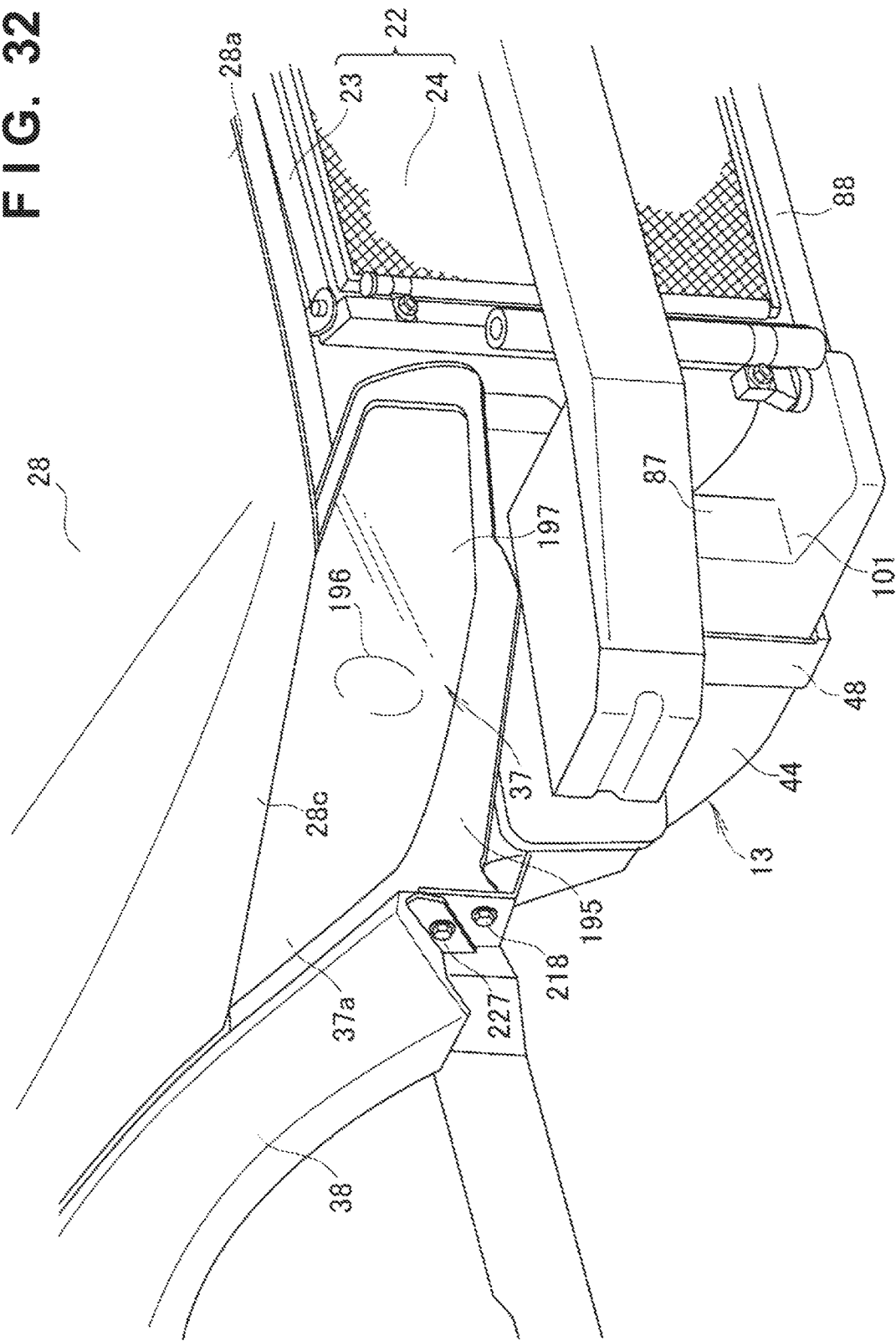
FIG. 32 is an enlarged view of a portion 32 in FIG. 1.

As shown in FIG. 32, the left headlight 36 (see FIG. 3) and the right headlight 37 are arranged under the hood 28 on the front side of the front bulkhead 21 in the vehicle body.

The right headlight 37 and the left headlight 36 are formed to be substantially bilaterally symmetrical. Hence, the right headlight 37 will be described below in detail. The components of the left headlight 36 are denoted by the same reference numerals as in the right headlight 37, and a detailed description thereof will be omitted.

Referring back to FIG. 12, the right headlight 37 includes a light base 195 attached to the right upper side beam 78 and the right positioning bracket 19 of the right upper member 16, an irradiation unit 196 provided in the light base 195, and a lens 197 that covers the irradiation unit 196.

The light base 195 includes the upper outer attachment piece 201 provided on a rear upper portion (the upper portion of the rear end of the headlight) 195b of a rear end 195a, the upper inner attachment piece 202 provided on an inner upper portion (the upper portion on the inner side of the rear end of the headlight in the vehicle width direction) 195c on the inner side of the rear upper portion 195b in the vehicle width direction, and a lower outer attachment piece 203 provided on a rear lower portion 195d of the rear end 195a.

The upper outer attachment piece 201 is a portion extending backward in the vehicle body from the rear upper portion 195b of the light base 195 up to the front outer surface 61b of the right positioning bracket 19 and placed on the front outer surface 61b from above. The attachment hole 205 is formed in the upper outer attachment piece 201.

In a state in which the upper outer attachment piece 201 is placed on the front outer surface 61b of the right positioning bracket 19, the attachment hole 205 of the upper outer attachment piece 201 is arranged to be coaxial with the headlight attachment reference hole 65 of the front outer surface 61b.

The bolt 71 is inserted into the attachment hole 205 and the headlight attachment reference hole 65 and threadably coupled with the nut 72, thereby attaching the upper outer attachment piece 201 to the front outer surface 61b of the right positioning bracket 19 in a positioned state.

The upper inner attachment piece 202 is a portion extending backward in the vehicle body from the inner upper portion 195c of the light base 195 up to an inner upper surface 78e of the right upper side beam 78 and placed on the inner upper surface 78e from above. The inner upper surface 78e of the right upper side beam 78 is a portion located on the inner side of the headlight attachment reference hole 65 in the vehicle width direction of the upper surface of the right upper side beam 78.

A headlight attachment hole 207 is formed in the inner upper surface 78e of the right upper side beam 78. On the other hand, an attachment hole 208 is formed in the upper inner attachment piece 202. The attachment hole 208 is formed to have a larger hole diameter than that of the headlight attachment hole 207. Hence, the upper inner attachment piece 202 is allowed to move in the horizontal direction with respect to the headlight attachment hole 207.

The upper inner attachment piece 202 is placed on the inner upper surface 78e of the right upper side beam 78. In this state, the attachment hole 208 is arranged to be overlaid on the headlight attachment hole 207 of the right upper side beam 78 in the vertical direction.

A bolt 211 is inserted into the attachment hole 208 and the headlight attachment hole 207 and threadably coupled with a nut 212. Accordingly, the upper inner attachment piece 202 is attached to the inner upper surface 78e of the right upper side beam 78.

Here, the attachment hole 208 is formed to have a larger hole diameter than that of the headlight attachment hole 207. Hence, when attaching the upper inner attachment piece 202 to the inner upper surface 78e of the right upper side beam 78, the upper inner attachment piece 202 can be adjusted in the horizontal direction with respect to the headlight attachment hole 207. That is, the light base 195 can be attached in a state in which the upper outer attachment piece 201 is positioned by the headlight attachment reference hole 65.

Accordingly, the right headlight 37 is attached in a state in which the rear end 195a of the light base 195 (that is, the right headlight 37) is accurately positioned in the vertical direction and in the horizontal direction.

In this state, the hood right side portion 28c of the hood 28 and the right fender 38 shown in FIG. 32 are accurately positioned, as described above.

Hence, by accurately positioning the rear end 195a (see FIG. 12) of the light base 195, the fitting of the hood 28 and the right fender 38 to the right headlight 37 (in particular, the rear end 37a of the right headlight 37) can satisfactorily be ensured.

Referring back to FIG. 12 again, the upper inner attachment piece 202 is placed on the inner upper surface 78e (that is, the upper surface) of the right upper side beam 78. Accordingly, the right headlight 37 is attached to the upper surface of the right upper side beam 78 in a state in which the right headlight 37 is accurately positioned in the vertical direction.

Additionally, as shown in FIG. 32, in a state in which the hood 28 is closed, the right headlight 37 is arranged under the hood right side portion 28c. The hood 28 is defined in a state in which the hood right side portion 28c is positioned by the right hood cushion 192 (see FIGS. 3 and 17) with respect to the upper surface of the right upper side beam 78, as described above.

That is, the height position of the right headlight 37 or the hood right side portion 28c is determined based on the upper surface of the right upper side beam 78 (see FIG. 12) serving as a reference. Hence, the gap between the hood right side portion 28c and the outer appearance design line of the right headlight 37 can be made constant, and the outer appearance of the vehicle can be improved.

Figure 33:
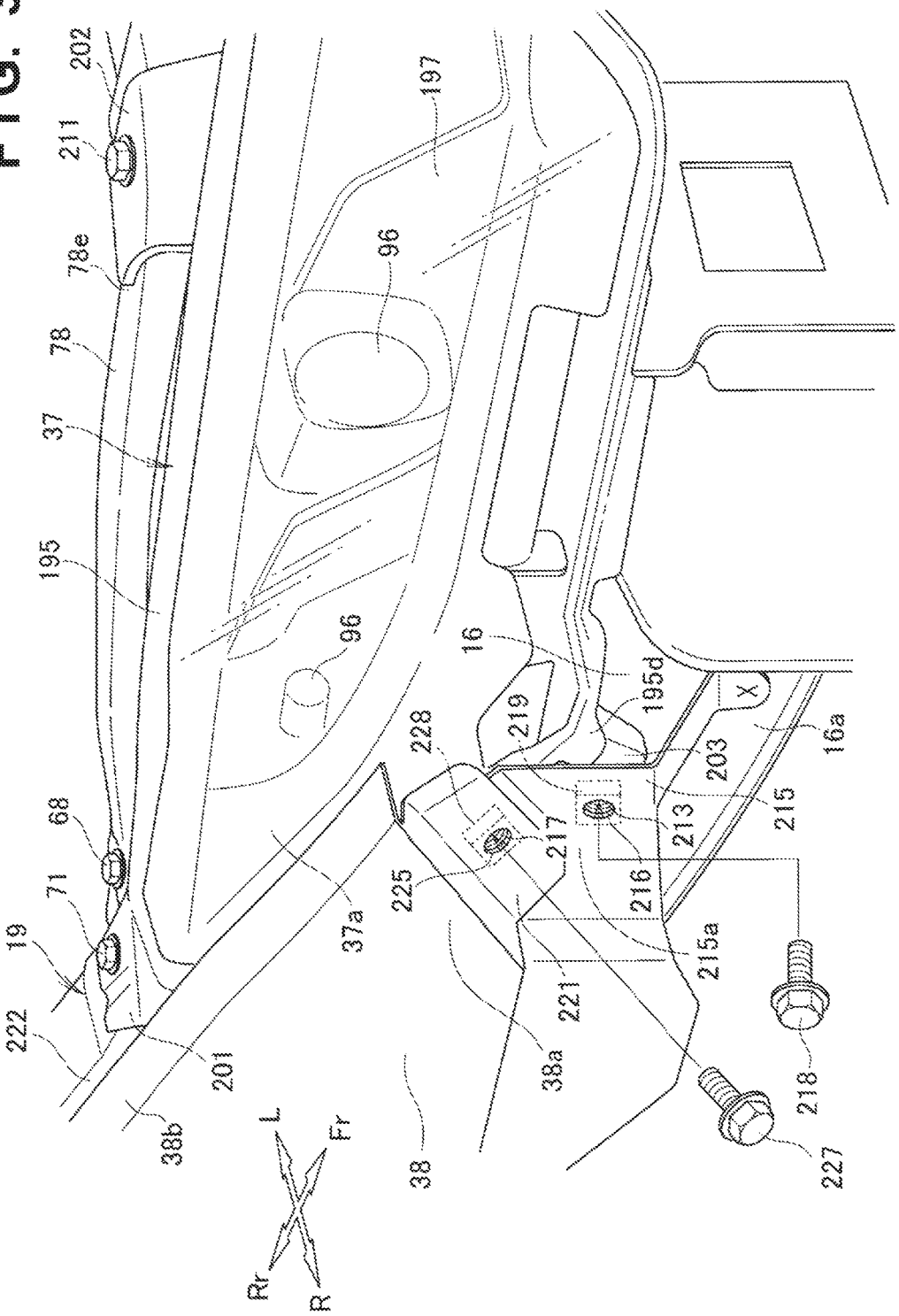
FIG. 33 is a perspective view showing the relationship between a right fender, the right headlight, and a right attachment bracket according to the first embodiment.

As shown in FIG. 33, the lower outer attachment piece 203 extends backward in the vehicle body from the rear lower portion 195d of the light base 195 up to a right attachment bracket 215. An attachment hole 213 is formed in the lower outer attachment piece 203.

The right attachment bracket 215 is a bracket made of a metal (more specifically, steel) and extending from the front end 16a of the right upper member 16 outward in the vehicle width direction. A light attachment hole 216 and a fender attachment hole 217 are formed in an upper portion 215a of the right attachment bracket 215.

The lower outer attachment piece 203 is brought into contact with the right attachment bracket 215 from the inner side in the vehicle width direction. In this state, the attachment hole 213 is arranged to be coaxial with the light attachment hole 216 of the right attachment bracket 215.

A bolt 218 is inserted into the light attachment hole 216 and the attachment hole 213 and threadably coupled with a nut 219. Accordingly, the lower outer attachment piece 203 is attached to the upper portion 215a of the right attachment bracket 215.

Thermal deformation of the right attachment bracket 215 made of a metal is suppressed as compared to a resin member. Hence, the lower outer attachment piece 203 of the right headlight 37 is accurately supported by the right attachment bracket 215.

Figure 34:
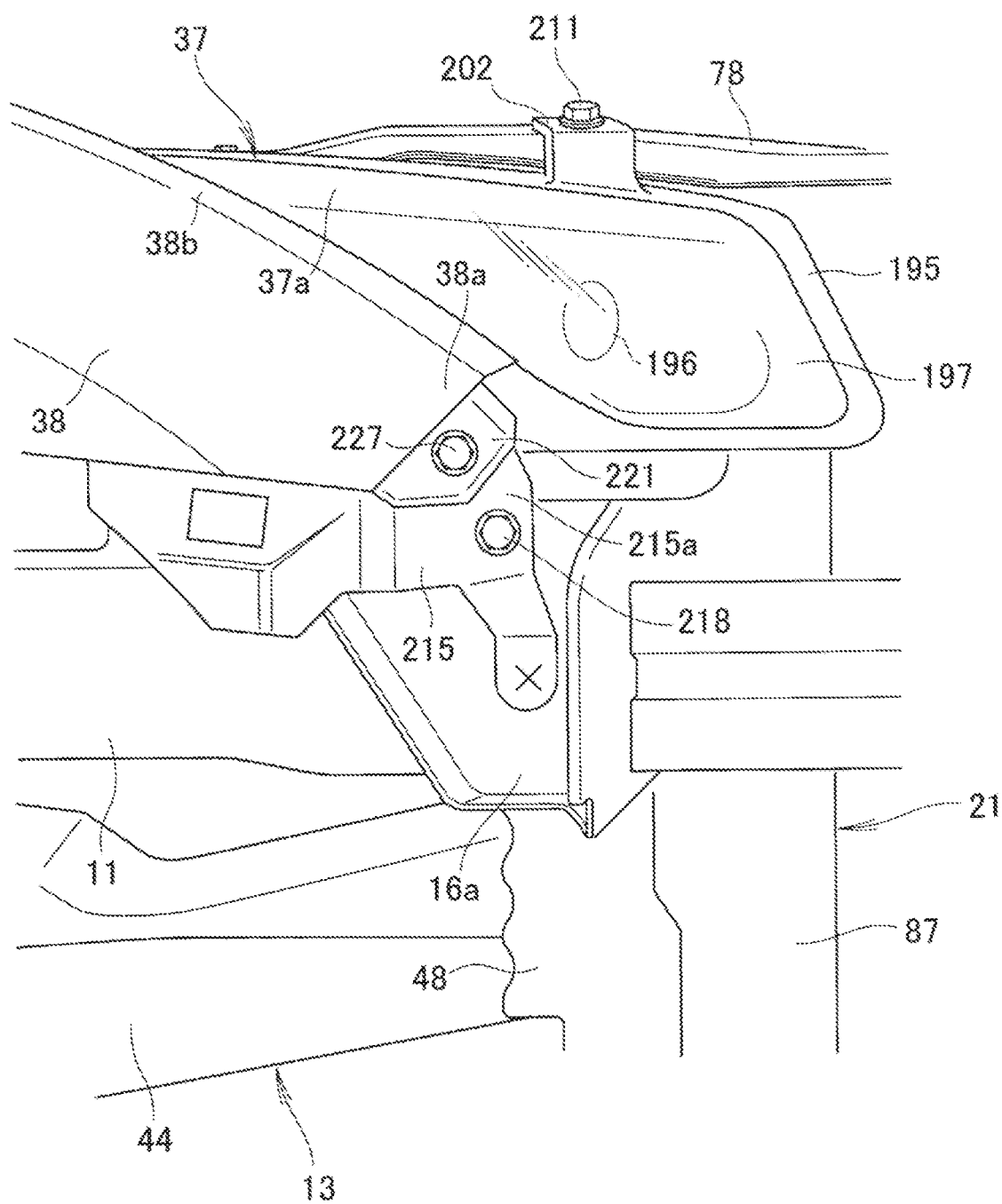
FIG. 34 is a side view showing a state in which the right fender and the right headlight in FIG. 33 are attached to the right upper member via the right attachment bracket.

As shown in FIG. 34, a front end 38a of the right fender 38 is attached to the upper portion 215a of the right attachment bracket 215. The right fender 38 includes a front attachment piece 221 formed at the front end 38a, an upper front attachment piece 222 (see FIGS. 12 and 33) formed on the upper front portion 38b, and an upper rear attachment piece 223 (see FIG. 29) formed on an upper rear portion 38c.

Referring back to FIG. 33, an attachment hole 225 is formed in the front attachment piece 221 of the right fender 38. The front attachment piece 221 of the right fender 38 is brought into contact with the upper portion 215a of the right attachment bracket 215 from the outer side in the vehicle width direction. In this state, the attachment hole 225 is arranged to be coaxial with the fender attachment hole 217 of the right attachment bracket 215.

A bolt 227 is inserted into the attachment hole 225 and the fender attachment hole 217 and threadably coupled with a nut 228. Accordingly, the front attachment piece 221 of the right fender 38 is attached to the upper portion 215a of the right attachment bracket 215 (see FIG. 34, too).

The front attachment piece 221 (that is, the front end 38a) of the right fender 38 is accurately supported by the right attachment bracket 215 made of a metal.

In this state, the front end 38a of the right fender 38 is arranged under the rear end 37a of the right headlight 37.

In this way, the right attachment bracket 215 made of a metal is provided at the front end 16a of the right upper member 16. In addition, the lower outer attachment piece 203 of the right headlight 37 and the front end 38a (more specifically, the front attachment piece 221) of the right fender 38 are supported by the upper portion 215a of the right attachment bracket 215 that is a single member.

It is therefore possible to accurately support the rear end 37a of the right headlight 37 and the front end 38a of the right fender 38. Accordingly, the gap between the rear end 37a of the right headlight 37 and the front end 38a of the right fender 38 can be kept constant.

Additionally, as shown in FIG. 12, the attachment hole 231 is formed in the upper front attachment piece 222 of the right fender 38. The upper front attachment piece 222 is placed on the projecting surface 62 of the right positioning bracket 19 from above. In this state, the attachment hole 231 of the upper front attachment piece 222 is arranged to be coaxial with the fender attachment reference hole 67 of the projecting surface 62.

The bolt 73 is inserted into the attachment hole 231 and the fender attachment reference hole 67 and threadably coupled with the nut 74. Accordingly, the upper front attachment piece 222 (that is, the upper front portion 38b) of the right fender 38 is attached to the projecting surface 62 of the right positioning bracket 19 in a positioned state.

Additionally, as shown in FIG. 29, the upper rear attachment piece 223 (that is, the upper rear portion 38c) of the right fender 38 is supported by a reinforcing bracket 233 of the right hood hinge 33. More specifically, the upper rear attachment piece 223 is attached to an upper end 233a of the reinforcing bracket 233 by a bolt 235 and a nut 236. A lower end 233b of the reinforcing bracket 233 is jointed to the hinge bracket 176 of the right hood hinge 33.

In this way, the upper front attachment piece 222 of the right fender 38 is attached to the projecting surface 62 of the right positioning bracket 19 (see FIG. 12). In addition, the upper rear attachment piece 223 of the right fender 38 is connected to the reinforcing bracket 233 of the right hood hinge 33.

Here, the hood 28 (see FIG. 30) is accurately positioned to the attachment position in the vertical direction by the rear inner surface 61c of the right positioning bracket 19 shown in FIG. 11. In addition, the rear end 28f of the hood right side portion 28c is attached to the hinge arm 175 of the right hood hinge 33 shown in FIG. 29.

Accordingly, the right fender 38 and the hood 28 are attached in an accurately positioned state so as to keep a constant gap between the right fender 38 and the hood right side portion 28c.

Referring back to FIG. 1, the left fender 38 is formed to be substantially bilaterally symmetrical to the right fender 38. Hence, the constituent parts of the left fender 38 are denoted by the same reference numerals as in the right fender 38, and a detailed description thereof will be omitted.

Vehicle body front structures 240 and 250 according to the second and third embodiments will be described next with reference to FIGS. 35 to 37. Note that the same reference numerals as in the vehicle body front structure 10 according to the first embodiment denote the same or similar members in the vehicle body front structures 240 and 250 according to the second and third embodiments, and a detailed description thereof will be omitted.

The vehicle body front structures 240 and 250 according to the second and third embodiments are substantially bilaterally symmetrical structures, like the vehicle body front structure 10 according to the first embodiment. The constituent members on the right side will be described below in detail, and a detailed description of the constituent members on the left side will be omitted.

Second Embodiment

The vehicle body front structure 240 according to the second embodiment will be described.

Figure 35:
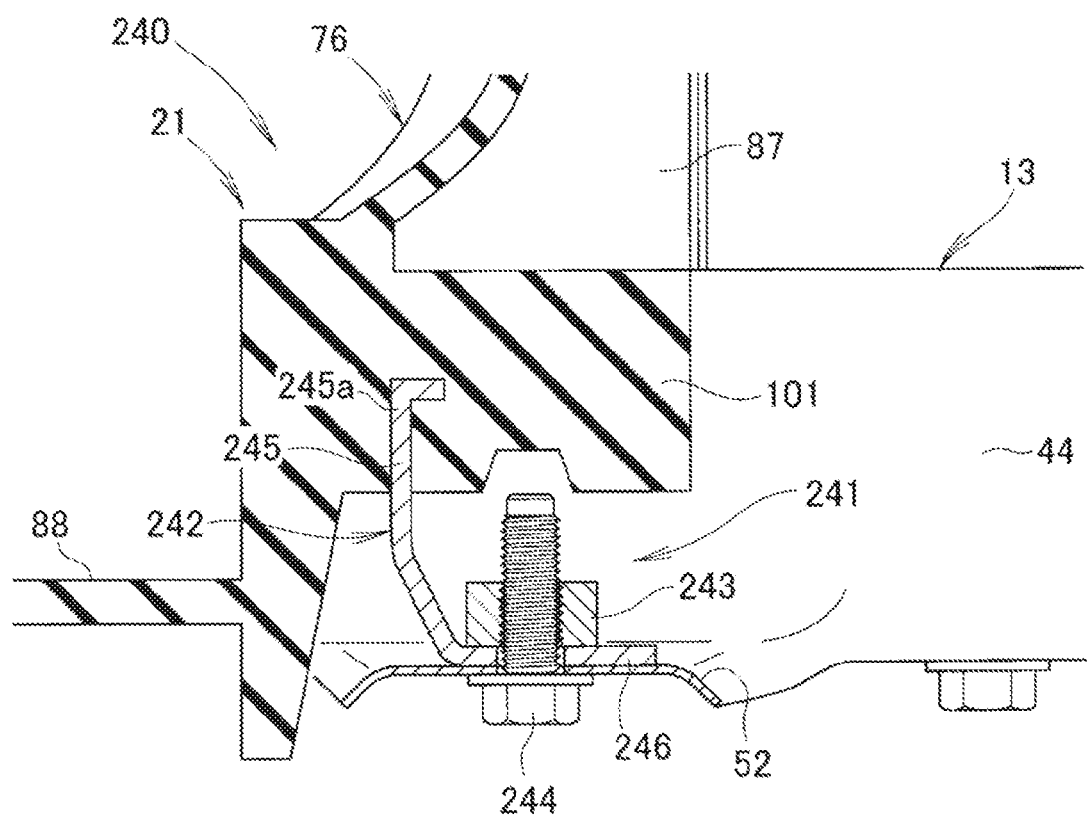
FIG. 35 is a sectional view showing a right connecting mechanism according to the second embodiment of the present invention.

As shown in FIG. 35, the vehicle body front structure 240 includes a right connecting mechanism 241 in place of the right connecting mechanism 27 according to the first embodiment, and the rest of the arrangement is the same as the vehicle body front structure 10 according to the first embodiment.

The right connecting mechanism 241 includes an adjust support plate 242 buried in a right lower corner portion 101 of a bulkhead portion 76 by insert molding, an adjust nut 243 fixed to the adjust support plate 242, and an adjust bolt 244 capable of threadably engaging with the adjust nut 243.

As described above, the right lower corner portion 101 is a portion of a front bulkhead 21, which is made of a resin material.

The adjust support plate 242 is a ductile plate member made of a metal (More specifically, made of steel). The adjust support plate 242 includes a vertical portion 245 arranged vertically and having an upper portion 245*a* buried in the right lower corner portion 101 by insert molding, and a horizontal portion 246 extending in the horizontal direction from a lower end 245*b* (see FIG. 36A) of the vertical portion 245.

The adjust support plate 242 is formed into a substantially L shape by the vertical portion 245 and the horizontal portion 246 (see FIG. 36A), and the adjust nut 243 is fixed (that is, joined) to the upper surface of the horizontal portion 246.

A procedure of connecting the right lower corner portion 101 to a projecting piece 52 by the right connecting mechanism 241 will be described next with reference to FIGS. 36A to 36C.

Figure 36A:
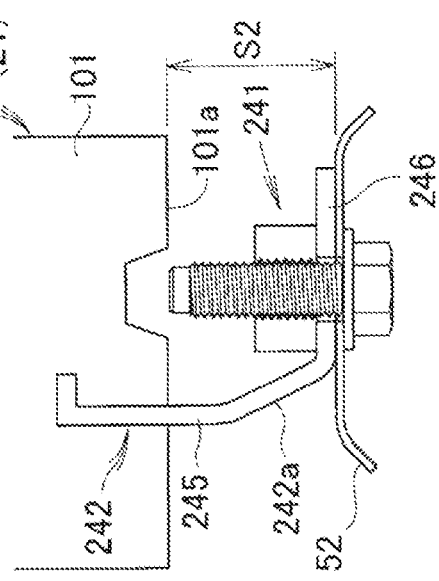
FIGS. 36A to 36C are views for explaining an example in which the right connecting mechanism according to the second embodiment is extended to connect a right lower corner portion to a projecting piece.

As shown in FIG. 36A, a male screw 244*a* of the adjust bolt 244 is inserted into a nut female screw 243*a* of the adjust nut 243 from the lower side of the projecting piece 52, as indicted by an arrow D. In this state, the male screw 244*a* is threadably engaged with the nut female screw 243*a*, as indicated by an arrow E.

Figure 36B:
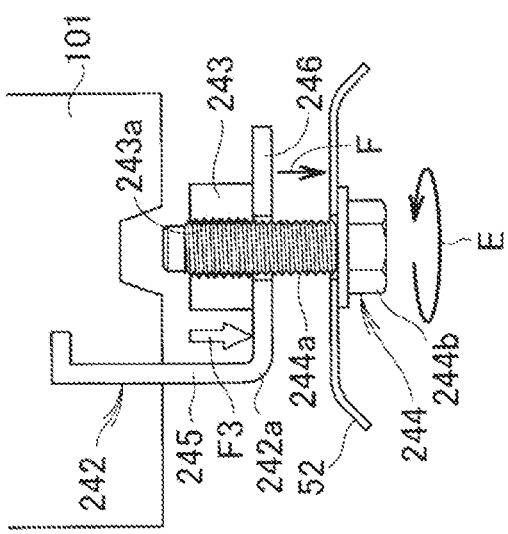

As shown in FIG. 36B, when the male screw 244*a* of the adjust bolt 244 is threadably engaged with the nut female screw 243*a* of the adjust nut 243, a head portion 244*b* of the adjust bolt 244 comes into contact with the projecting piece 52.

When the adjust bolt 244 is continuously rotated in this state, as indicated by the arrow E, a download load F3 acts on the adjust nut 243. A support plate corner portion 242*a* of the adjust support plate 242 is plastically deformed by the load F3, and the horizontal portion 246 of the adjust support plate 242 is displaced to the side of the projecting piece 52, as indicated by an arrow F.

Figure 36C:
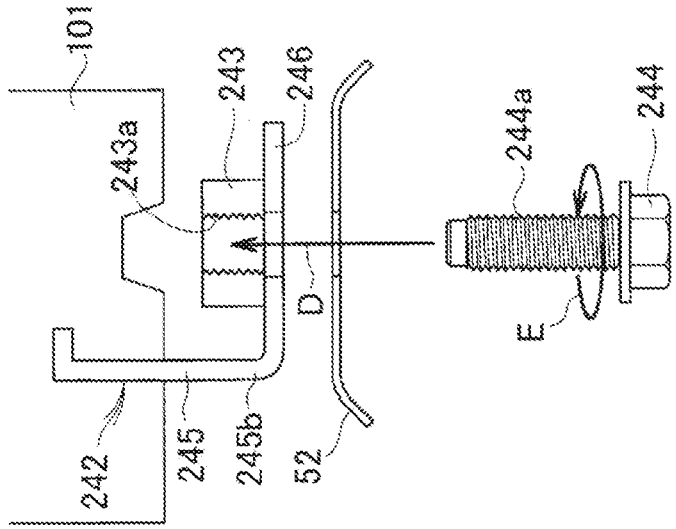

As shown in FIG. 36C, when the horizontal portion 246 of the adjust support plate 242 is displaced to the side of the projecting piece 52, the horizontal portion 246 abuts against the projecting piece 52. Accordingly, if a gap S2 is formed between the projecting piece 52 and a lower surface 101*a* of the right lower corner portion 101, the right connecting mechanism 241 can be extended in correspondence with the gap S2.

As described above, the lower surface 101*a* of the right lower corner portion 101 can reliably be connected to the projecting piece 52 without taking much time using the right connecting mechanism 241.

In addition, when the right lower corner portion 101 of a bulkhead portion 76 is connected to the projecting piece 52 via the right connecting mechanism 241, the right lower corner portion 101 can be reinforced by the projecting piece 52. The rigidity/strength of the bulkhead portion 76 (that is, a front bulkhead 21) can thus be increased by the projecting piece 52.

That is, according to the vehicle body front structure 240 of the second embodiment, the same effect as that of the vehicle body front structure 10 according to the first embodiment can be obtained.

Additionally, according to the vehicle body front structure 240 of the second embodiment, the arrangement can be simplified, as compared of the vehicle body front structure 10 according to the first embodiment, and the cost can be suppressed.

Third Embodiment

The vehicle body front structure 250 according to the third embodiment will be described.

As shown in FIG. 37, the vehicle body front structure 250 includes a right connecting mechanism 251 in place of the right connecting mechanism 27 according to the first embodiment, and the rest of the arrangement is the same as the vehicle body front structure 10 according to the first embodiment.

The right connecting mechanism 251 includes an adjust collar 252 in place of the adjust collar 134 according to the first embodiment, and the rest of the arrangement is the same as the right connecting mechanism 27 according to the first embodiment.

An upper surface 252*a* of the adjust collar 252 is fixed (that is, joined) to a lower surface 101*a* of a right lower corner portion 101 by an adhesive 253.

According to the right connecting mechanism 251 of the third embodiment, the right connecting mechanism 251 can be extended in correspondence with a gap S3 between a projecting piece 52 and the lower surface 101*a* of the right lower corner portion 101 only by a simple operation of fastening an adjust bolt 136, like the right connecting mechanism 27 according to the first embodiment.

Accordingly, the right lower corner portion 101 can reliably be connected to the projecting piece 52 without taking much time only by a simple operation of fastening the adjust bolt 136.

In addition, when the right lower corner portion 101 of a bulkhead portion 76 is connected to the projecting piece 52 via the right connecting mechanism 251, the right lower corner portion 101 can be reinforced by the projecting piece 52. The rigidity/strength of the bulkhead portion 76 (that is, a front bulkhead 21) can thus be increased by the projecting piece 52.

That is, according to the vehicle body front structure 250 of the third embodiment, the same effect as that of the vehicle body front structure 10 according to the first embodiment can be obtained.

Note that the vehicle body front structure according to the present invention is not limited to the above-described embodiments, and can appropriately be modified or improved.

For example, in the first to third embodiments, an example in which the right opening 112 is formed at the right end 104b of the beam main body 104, and the left opening is formed at the left end 104a of the beam main body 104 has been described. However, the present invention is not limited to this, and an opening of another shape such a notch may be formed at each of the ends 104b an 104a.

In the first to third embodiments, an example in which the left connecting bracket and the right connecting bracket 108 are provided on the rear surface 104e of the beam main body 104 has been described. However, the present invention is not limited to this, and the left connecting bracket and the right connecting bracket 108 may be provided on the front surface 104d of the beam main body 104.

In the first to third embodiments, an example in which the adjust collar 134 of the right connecting mechanism 27 is provided on the side of the bulkhead portion 76 has been described. However, the present invention is not limited to this, and the adjust collar 134 may be provided on the side of the right subframe 44.

In the first to third embodiments, an example in which the right fender 38 and the right attachment bracket 215 are formed by individual members has been described. However, the present invention is not limited to this, and the right attachment bracket 215 may be formed integrally with the front end 38a of the right fender 38.

In the third embodiment, an example in which the upper surface 252a of the adjust collar 252 is fixed to the lower surface 101a of the right lower corner portion 101 by the adhesive 253 has been described. However, the present invention is not limited to this, and the upper surface 252a of the adjust collar 252 may be fixed to the lower surface 101a of the right lower corner portion 101 by another joining means such as a rivet or a bolt.

Furthermore, the shapes and structures of the vehicle, the vehicle body front structure, the left and right front side frames, the subframes, the left and right floor frames, the left and right upper members, the left and right positioning brackets, the front bulkhead, the cooling unit, the radiator, the left and right connecting mechanisms, the hood, the left and right hood hinges, the hood lock device, the left and right headlights, the left and right fenders, the right subframe, left and right front support portions, the extended portion, the projecting piece, the curved portion, the reference surface, the front leg portions, the rear leg portion, the flat surface, the front bulkhead attachment reference hole, the headlight attachment reference hole, the hood attachment reference hole, the fender attachment reference hole, the left and right upper side beams, the upper beam, the left and right lower support portions, the left and right upper support portions, the left and right stays, the lower beam, the guide concave portion, the annular wall, the guide hole portion, the left and right lower corner portions, the beam main body, the right connecting bracket, the beam concave portion, the right opening, the striker, the right upper corner portion, the corner reinforcing portion, the adjust collar, the first collar female screw, the adjust nut, the nut female screw, the adjust bolt, the positioning jig, the bulkhead jig, the exhaust portion, the hood rear positioning holes in the left and right sides, the left and right hood cushions, the light base, the upper outer attachment piece, the upper inner attachment piece, the lower outer attachment piece, the headlight attachment hole, the right attachment bracket, the adjust support plate, and the like shown in the first to third embodiments are not limited to those exemplified, and can be changed appropriately.

INDUSTRIAL APPLICABILITY

The vehicle body front structure according to the present invention can suitably be applied to a vehicle including a front side frame, an upper member, a front bulkhead, and the like provided around an engine room as framework members.

REFERENCE SIGNS LIST

Ve . . . vehicle
10 . . . vehicle body front structure
11 . . . left and right front side frame
11a . . . front ends of left and right front side frames
13 . . . subframe
14 . . . left and right floor frames
14a . . . front end of right floor frame
16 . . . left and right upper members
16a . . . front end and right upper member
16b . . . rear ends of left and right upper members
18, 19 . . . left and right positioning brackets
21 . . . front bulkhead
21a . . . right lower end of front bulkhead
22 . . . cooling unit
23 . . . radiator
23d, 23e . . . left upper portion add right upper portion of radiator (upper end of cooling unit)
23b, 23c . . . left lower portion and right lower portion of radiator (lower end of cooling unit)
26, 27, 241 . . . left and right connecting mechanisms
28 . . . hood
28a . . . front end of hood
28d . . . rear end of hood
32, 33 . . . left and right hood hinges
35 . . . hood lock device
36, 37 . . . left and right headlights
37a . . . rear end of right headlight
38 . . . left and right fender
38a . . . front end and right fender
38b . . . upper rear portion of right fender
44 . . . right subframe
44a . . . rear end of right subframe
44b . . . central portion of right subframe
44c . . . front portion of right subframe
49, 48 . . . left and right front support portions
51 . . . extended portion
52 . . . projecting piece (front end of subframe)
54 . . . curved portion
56 . . . reference surface
56a . . . front end of reference surface
56b . . . rear end of reference surface
57 . . . front leg portion
58 . . . rear leg portion
61 . . . flat surface
61a . . . front inner surface (front inner side of positioning bracket)
61b . . . front outer surface (front outer side of positioning bracket)
61c . . . rear inner surface (rear inner side of positioning bracket)
64 . . . front bulkhead attachment reference hole
65 . . . headlight attachment reference hole
66 . . . hood attachment reference hole
67 . . . fender attachment reference hole
77, 78 . . . left and right upper side beam
77a, 78a . . . front ends of left and right upper side beams
77b, 78c . . . rear ends of left and right upper side beams 79 . . . upper beam
79a, 79b . . . left and right ends of upper beam
81, 82 . . . left and right lower support portions
83, 84 . . . left and right upper support portions
86, 87 . . . left and right side stays
86a, 87a . . . lower ends of left and right side stays
86c, 87c . . . upper ends of left and right side stays
86a, 87a . . . lower ends of left and right side stays
88 . . . lower beam
95 . . . guide concave portion
96 . . . annular wall
97 . . . bottom portion of guide concave portion
99 . . . guide hole portion
102, 101 . . . left and right lower corner portions (portions of front bulkhead which are made of resin material)
104 . . . beam main body
104a, 104b . . . left and right ends of beam main body
104d . . . front surface of beam main body
104e . . . rear surface of beam main body
108 . . . right connecting bracket
111 . . . beam concave portion
112 . . . right opening
121 . . . striker
123 . . . right upper corner portion
123a . . . inner surface of right upper corner portion
128 . . . corner reinforcing portion
134 . . . adjust collar
134a . . . first collar female screw (female screw of adjust collar)
135, 243 . . . adjust nut
135c . . . nut female screw (female screw of adjust collar)
136, 244 . . . adjust bolt
141 . . . positioning jig
146 . . . bulkhead jig
151 . . . exhaust portion
155 . . . coolant (water)
189, 188 . . . hood rear positioning holes on left and right sides (other hood attachment reference holes)
191, 192 . . . left and right hood cushions
195 . . . light base
195b . . . rear upper portion (upper portion of rear end of headlight)
195c . . . inner upper portion (upper portion on inner side of rear end of headlight in vehicle width direction)
195d . . . rear lower portion
201 . . . upper outer attachment piece
202 . . . upper inner attachment piece
203 . . . lower outer attachment piece
207 . . . headlight attachment hole
215 . . . right attachment bracket
242 . . . adjust support plate

What is claimed is:

1. A vehicle body front structure in which a pair of front side frames are provided on left and right sides of the vehicle, an upper member is provided on an upper outer side of each front side frame, and a front bulkhead is connected to the pair of front side frames and a pair of upper members,
wherein the front bulkhead comprises:
a side stay made of a resin and connected to a front end of the front side frame;
an upper side beam made of a metal, extending from the side stay to the upper member, and having a rear end connected to the upper member;
an upper beam made of a metal and detachably connected to the side stay in a state in which an end is overlaid on a front end of the front side frame above the side stay; and
a hood lock device provided on the upper beam and configured to lock a striker of a hood,
wherein on the upper beam,
the upper member extends from an upper side of the front side frame to a front side of a vehicle body so as to be curved downward, and a front end of the hood is arranged above the front bulkhead,
wherein the vehicle body front structure further comprises:
a headlight provided under the hood and on the front side of the front bulkhead in the vehicle body; and
a fender with a front end provided under a rear end of the headlight,
wherein a positioning bracket is provided on a convex curved portion extending to be curved downward of the upper beam,
wherein the positioning bracket comprises:
a reference surface arranged substantially horizontally above the curved portion and including a front bulkhead attachment reference hole, a headlight attachment reference hole, a hood attachment reference hole, and a fender attachment reference hole;
a front leg portion extending from a front end of the reference surface downward to the curved portion and joined to the curved portion; and
a rear leg portion formed to be shorter than a leg length of the front leg portion and joined to the curved portion in a state in which the rear leg portion extends from a rear end of the reference surface downward to the curved portion, and
wherein the reference surface is supported above the curved portion by the front leg portion and the rear leg portion.

2. The vehicle body front structure according to claim 1, further comprising hood hinges arranged to a rear end of the hood and rear ends of the pair of upper members so as to pivotally connecting the rear end of the hood to the rear ends of the pair of upper members,
wherein another hood attachment reference hole is formed between the hood hinge and the hood attachment reference hole of the upper member, and
four points corresponding to the pair of hood attachment reference holes and the pair of other hood attachment reference holes serve as references to position the hood.

3. The vehicle body front structure according to claim 1, further comprising a hood cushion intervening between the upper side beam and the hood and configured to define a height of the hood,
wherein a headlight attachment hole is formed in the upper side beam on an inner side of the headlight attachment reference hole in a vehicle width direction,
wherein the headlight comprises:
an upper outer attachment piece extending from an upper portion of the rear end of the headlight up to the headlight attachment reference hole and positioned by the headlight attachment reference hole; and
an upper inner attachment piece extending from an upper portion on an inner side of the rear end of the headlight in the vehicle width direction up to the headlight attachment hole, placed on the upper side beam, and configured to be adjustable with respect to the headlight attachment hole.

4. The vehicle body front structure according to claim 2, further comprising a hood cushion intervening between the upper side beam and the hood and configured to define a height of the hood, wherein a headlight attachment hole is formed in the upper side beam on an inner side of the headlight attachment reference hole in a vehicle width direction, wherein the headlight comprises:

an upper outer attachment piece extending from an upper portion of the rear end of the headlight up to the headlight attachment reference hole and positioned by the headlight attachment reference hole; and an upper inner attachment piece extending from an upper portion on an inner side of the rear end of the headlight in the vehicle width direction up to the headlight attachment hole, placed on the upper side beam, and configured to be adjustable with respect to the headlight attachment hole.

* * * * *